(12) United States Patent
Yutkowitz

(10) Patent No.: US 6,859,747 B2
(45) Date of Patent: Feb. 22, 2005

(54) METHOD AND APPARATUS FOR SELF-CALIBRATING A MOTION CONTROL SYSTEM

(75) Inventor: Stephen J. Yutkowitz, Cincinnati, OH (US)

(73) Assignee: Siemens Energy & Automation, Inc., Alpharetta, GA (US)

(*) Notice: Subject to any disclaimer, the term of this patent is extended or adjusted under 35 U.S.C. 154(b) by 28 days.

(21) Appl. No.: 10/124,003

(22) Filed: Apr. 17, 2002

(65) Prior Publication Data

US 2003/0033105 A1 Feb. 13, 2003

Related U.S. Application Data

(60) Provisional application No. 60/286,834, filed on Apr. 26, 2001.

(51) Int. Cl.[7] ............ G01L 25/00; G06F 19/00
(52) U.S. Cl. ............ 702/105; 702/95; 318/568.1; 318/569; 318/638; 318/571; 700/37; 356/498
(58) Field of Search .......... 702/95, 105; 318/568.1, 318/569, 638, 571, 568.18, 616; 700/37; 356/498

(56) References Cited

U.S. PATENT DOCUMENTS

| | | | |
|---|---|---|---|
| 4,458,321 A | | 7/1984 | Whitney et al. |
| 4,488,242 A | | 12/1984 | Tabata et al. |
| 4,810,945 A | * | 3/1989 | Yoneda et al. .......... 318/571 |
| 4,894,595 A | | 1/1990 | Sogawa et al. |
| 4,945,501 A | * | 7/1990 | Bell et al. .......... 702/95 |
| 4,967,126 A | | 10/1990 | Gretz et al. |
| 4,988,935 A | * | 1/1991 | York .......... 318/568.18 |
| 5,153,490 A | | 10/1992 | Ueta et al. |
| 5,216,342 A | * | 6/1993 | Torii et al. .......... 318/568.1 |
| 5,237,509 A | | 8/1993 | Ueta et al. |
| 5,285,378 A | * | 2/1994 | Matsumoto .......... 700/37 |
| 5,315,222 A | | 5/1994 | Kasagami et al. |
| 5,363,026 A | * | 11/1994 | Currat .......... 318/569 |
| 5,430,948 A | | 7/1995 | Vander Wal, III |
| 5,459,383 A | | 10/1995 | Sidman et al. |
| 5,492,440 A | | 2/1996 | Spaan et al. |
| 5,508,596 A | * | 4/1996 | Olsen .......... 318/569 |
| 5,555,347 A | | 9/1996 | Yoneda et al. |
| 5,570,304 A | | 10/1996 | Mark et al. |
| 5,610,823 A | | 3/1997 | Gregory |
| 5,684,374 A | * | 11/1997 | Chaffee .......... 318/616 |
| 5,684,375 A | * | 11/1997 | Chaffee et al. .......... 318/638 |
| 5,691,897 A | | 11/1997 | Brown et al. |
| 5,791,843 A | | 8/1998 | Dreier |
| 5,794,356 A | | 8/1998 | Raab |
| 5,892,345 A | * | 4/1999 | Olsen .......... 318/571 |
| 5,960,375 A | | 9/1999 | Warrior et al. |
| 6,060,854 A | | 5/2000 | Yutkowitz |
| 6,198,246 B1 | | 3/2001 | Yutkowitz |

(List continued on next page.)

FOREIGN PATENT DOCUMENTS

| | | | | |
|---|---|---|---|---|
| WO | WO 9718436 | | 5/1997 | |
| WO | WO 97 18436 | * | 5/1997 | .......... G01B/5/03 |

OTHER PUBLICATIONS

Firmendruckschrift Benutzer–Handbuch ACCOM, Dr. Johannes Heidenhain GmbH, Oct. 2000, whole document.
PCT International Search Report for PCT/US02/13027 dated Oct. 1, 2002.

*Primary Examiner*—John Barlow
*Assistant Examiner*—Aditya Bhat

(57) ABSTRACT

In one embodiment, a method of and apparatus for self-calibrating a motion control system is provided. The method includes the steps of receiving a test parameter, ensuring a reasonable test can be executed based on the test parameter, generating a part program based upon the test parameter, instructing a user of the motion control system regarding set up of a device capable of acquiring data associated with the test, and executing the test, wherein the part program is executed as part of the test.

46 Claims, 24 Drawing Sheets

U.S. PATENT DOCUMENTS

| | | |
|---|---|---|
| 6,242,879 B1 | 6/2001 | Sagues et al. |
| 6,259,221 B1 | 7/2001 | Yutkowitz |
| 6,269,284 B1 | 7/2001 | Lau et al. |
| 6,498,653 B1 * | 12/2002 | Wang .......................... 356/498 |
| 6,587,744 B1 | 7/2003 | Stoddard et al. |
| 6,615,102 B1 | 9/2003 | Morfino |
| 6,658,375 B1 | 12/2003 | McQuarrie et al. |

* cited by examiner

FIG. 5A

METHOD AND APPARATUS FOR SELF-CALIBRATING A MOTION CONTROL SYSTEM

This application claims the benefit of U.S. Provisional Application No. 60/286,834, filed Apr. 26, 2001, the entire disclosure of which is hereby incorporated by reference.

TECHNICAL FIELD

The present invention relates generally to motion control systems, and more particularly, to a method and system for tuning compensation parameters.

BACKGROUND OF THE INVENTION

The performance of a motion control system is of primary importance. In particular, a control system should be stable, result in acceptable responses to input commands, result in a minimum steady-state error for input commands, and be able to eliminate the effect of undesirable disturbances. Often-times, for optimum performance, adjustments are made to a control system. The alteration or adjustment of a control system in order to provide a desired performance is often referred to as compensation (i.e., compensation is the adjustment of a system in order to make up for deficiencies or inadequacies).

In some cases, an additional component (e.g., a compensator) is included within a motion control system to equalize or compensate for such deficiencies/inadequacies. For example, such compensators can be implemented as one or more parameters whose values are used by a controller to determine how to control a system. Accordingly, to provide optimum performance, appropriate values are determined for such parameters.

The process of adjusting these parameters (e.g., to compensate for system changes) is often referred to as tuning. Recently, techniques for tuning such parameters that involve minimal or no operator involvement have been developed. These techniques are generally referred to as autotuning. For example, autotuning can refer to a process in which a controller automatically determines appropriate values for such parameters.

Currently, in motion control systems such as those utilized with machine tools, relative displacement sensors, such as a telescoping ballbar, are used to provide an electrical output representing a measurement of incremental displacement caused by the motion control system. The electrical output can then be used to "tune" parameters of the motion control systems that account for errors in the motion of the machine(s) it controls. For example, a ballbar can be mounted between the two members of a machine tool that move relative to each other and create feed motion between a tool and a workpiece. More particularly, with respect to a machining center, for example, the ballbar is mounted between a spindle and a work-holding table.

Typically, the range of motion of a commercially available ballbar is limited to just a few millimeters. For example, the machine tool motion during a ballbar measurement is conventionally along a substantially constant radius arc. Measurement of deviation of the arc radius from the ideal constant radius can be used to provide information about the errors associated with the machine tool. This information can, for example, be used to determine certain aspects of positioning (static and dynamic) errors associated with the machine.

With reference to FIG. 1, a conventional use involving a motion control system and a machining center is herein described (where a user of the motion control system manually performs most steps). The center fixture of a ballbar is placed at a desired location on the machine with the setscrew loose. The spindle is then moved such that a magnetic cup in the tool holder of the spindle picks up the steel circle center ball of the ballbar and the setscrew is tightened. The positions of the axes are then recorded by performing a machine position set to redefine the coordinate system, such that the current position is the program system origin (e.g. G92X0Y0Z0).

A user of the motion control system then manually feeds the axes to move the magnetic cup off of the center ball, and creates a part program causing the machine to perform a circular move, an exemplary one of the part programs having a number of characteristics, including the following:

1. The circle center corresponds to the location of the center ball.
2. The circle radius is equal to or slightly less than the nominal length of the ballbar.
3. The circular motion is constrained to lie within a major plane of the machine (e.g., XY, XZ, YZ).
4. The circular arc includes some additional (overshoot) distance at the beginning and end of the move (allows the feedrate to accelerate from zero to full speed and to decelerate from full speed to zero), with the portion of the circle whose data is considered by the analysis being referred to as the data-arc (data collected during the feedrate transients at the beginning and end of the move is not considered during data analysis).
5. The circular motion is preceded by a short (feed-in) move that travels along a circle radial line from a radius greater than the circle radius to the circle start point. Similarly, a short (feed-out) move following the circular motion travels along a circle radial line from the circle end point to a radius greater than the circle radius. These moves can be used to signal conventional software associated with the ballbar when the test begins and ends, and can be used by the software to provide an estimate of the instantaneous circle angle based on the elapsed time since the test start.
6. Two successive sequences with overshoot arcs, a feed-in move, a data-arc, and a feed-out move are present for both clockwise and counter-clockwise directions within the plane.
7. A program stop (M0) block is present prior to the beginning of each (clockwise and counter clockwise) sequence of moves (the program stop providing the operator with an opportunity to arm the trigger in the ballbar software).

The ballbar can then be plugged into a serial port of the computer running the ballbar software, and the ballbar length optionally calibrated (e.g., by placing the ballbar into a calibration fixture of known length and prompting the software to measure the ballbar's output). If the ballbar length is calibrated, the actual ballbar length is computed and stored by the ballbar software. One advantage of a length-calibrated ballbar is that it enables average circle diameter error to be estimated.

The ballbar software is then informed of the specific conditions for the current test by entering values for the following parameters: length of overshoot arcs, data arc start angle, data arc length, feedrate, and circle radius. The trigger in the ballbar software is armed on the machine (e.g., a personal computer) on which it is running, and the test program on the control is executed.

When the program reaches the stop (M0) after the first circular move, and after the data collection is completed, the ballbar software trigger is re-armed, and the machine is cycle started to perform the second circular move. At test completion, the test data is saved to a file and analysis software is run to diagnose error sources.

Accordingly, a method and system to automate and simplify this and other similar procedures is desired. In addition, it would be desirable to apply parametric compensation based on measurements from a ballbar.

SUMMARY OF THE INVENTION

It is an object of at least one embodiment of the present invention to provide an improved method and/or system for tuning compensation parameters of a motion control system.

Additional objects, advantages, and novel features of various embodiments of the invention will be set forth in part in the description of the exemplary embodiments that follows and, in part, will become apparent to those skilled in the art upon examining or practicing the invention.

One embodiment of the present invention is directed towards a method of and an apparatus for self-calibrating a motion control system. The method includes the steps of receiving a test parameter, ensuring a reasonable test can be executed based on the test parameter, generating a part program based upon the test parameter, instructing a user of the motion control system regarding set up of a device capable of acquiring data associated with the test, and executing the test, wherein the part program is executed as part of the test.

Still other advantages of various embodiments will become apparent to those skilled in this art from the following description wherein there is shown and described exemplary embodiments of this invention simply for the purposes of illustration. As will be realized, the invention is capable of other different aspects and embodiments without departing from the scope of the invention. Accordingly, the advantages, drawings, and descriptions are illustrative in nature and not restrictive in nature.

BRIEF DESCRIPTION OF THE DRAWINGS

While the specification concludes with claims particularly pointing out and distinctly claiming the invention, it is believed that the same will be better understood from the following description taken in conjunction with the accompanying drawings in which like reference numerals indicate corresponding structure throughout the figures.

FIGS. 5A–5E are screen shots of various subpages of an adjustment interface according to an exemplary embodiment of the present invention;

DETAILED DESCRIPTION OF EXEMPLARY EMBODIMENTS

Figure 1:
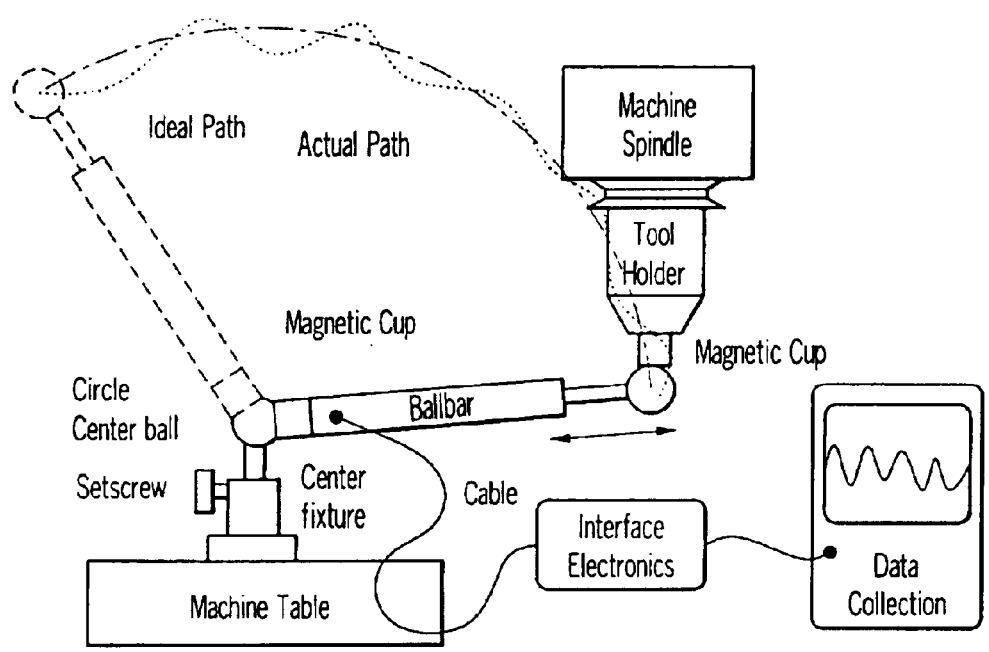
FIG. 1 is a diagram illustrating a ballbar test.

In general, the present invention relates to a motion control system capable of tuning compensation parameters. For purposes of illustration, exemplary embodiments discussed primarily herein relate to test software that runs on the control of a machine tool and, in one embodiment, to such software that allows a machine tool control to self-calibrate its parametric compensation based on measurements from an instrument called a telescoping ballbar. Moreover, in one embodiment, disclosed exemplary software provides the capability to: 1) specify test conditions; 2) automatically create the motion for measurements related to the test condition; 3) initiate the motion; 4) collect the data; 5) analyze the data; and 6) update the compensation of the control based on the data.

Further exemplary embodiments can, for example, be used to:

1. Validate the appropriateness of test setup data.
2. Validate the integrity of collected data.
3. Aid a user in fixture setup by providing prompts of what to do next based, for example, on control state and axis positions.
4. Monitor a control state to coordinate a test sequence.
5. Send messages to control the execution of part programs.
6. Robustly handle error conditions.
7. Process measured data to account for effects such as servo gains and feedforward.
8. When computing proposed changes to compensation, consider the values for compensation that were active during the test execution.
9. Copy updated compensation values into, for example, a database of a control.
10. Activate new compensation (e.g., by issuing a system event).

For example, certain exemplary embodiments of the present invention make use of access to controller internal data, program buffer, and system event services of an associated control to provide at least some of the aforementioned features.

According to one embodiment of the present invention, configuration of certain types of compensation can be automated. Referring specifically by example to an exemplary embodiment involving ballbars, values for the following types of compensation for axes in a machine tool that define a primary machine plane in which a ballbar circle test is performed can be automatically proposed: scale error; squareness error; straightness error; backlash; windup; and/or friction.

Ballbar measurements of radius deviations that occur during major plane circular motion of a machine are the combined result of the simultaneous motion of two axes. In order to attribute the measurements to error sources from a single axis, the analysis can be restricted based on a series of limiting assumptions about the nature of the errors. For example, the errors can be assumed to originate from a limited number of sources with a fixed mathematical relationship between an error source, the axes positions, axes velocities, and the radial error produced.

The particular mathematical relationships included within the model can be chosen based on some physical understanding of the machine structure and servo dynamics, and/or on previous experience with machine tool errors. Accordingly, each error source can be described by a single parameter that quantifies the amplitude and direction of the error. Therefore, data representing such error can be curve fit to extract optimal estimates for each parameter associated with each error type.

An alternative to the parametric model could include a data-based approach. If, for example, the desired goal of the ballbar measurement was the generation of data tables for bidirectional compensation (compensates for backlash and error due to variation in the pitch of a ballscrew) and cross-axis compensation (compensating for axis position as a function of one or more axis positions), then there might be an infinite number of data set combinations for these tables that might exactly account for the errors measured by the ballbar. However, only one of these combinations would be the "correct" one. Meanwhile, an incorrect selection could easily result in larger errors than what might occur on an uncompensated machine (e.g., for any axis motion that differs from the motion experienced during the ballbar measurement).

Although a parametric description of the errors might not exactly describe the measurement, it can allow for the derivation of an optimal combination of parameters that best describes the measurement. Accordingly, association of measured machine errors to a parametric model implies that the compensation for the machine errors can be based on the same parametric model.

In, for example, an A2100 control from Siemens Energy and Automation, Inc., the following types of parametric compensations are available: 1) backlash compensation; 2) windup compensation; 3) pitch (or scale) compensation; 4) squareness compensation; and 5) straightness compensation. Each of these compensations describes the motion of an individual axis or combined effect of two axes within a plane. Each of these error sources can also be described by a single parameter.

A mathematical model can be based on an understanding of the physical effects that often cause machine errors. If an error source exists that is outside of the scope of the mathematical model, then the error might be falsely attributed to one of the error types that is included in the model structure. To help avoid this situation, the scope of the mathematical model can be made larger than the scope of parametric compensations provided.

For example, servo mismatch error can be included within the scope of one of the exemplary models described herein for use with the A2100 control, even though the A2100 control does not have an explicit servo mismatch compensation. Such servo mismatch errors can instead be corrected in other ways based on other types of measurements. In any case, situations might arise where the mathematical model cannot properly describe the data. For example, this could occur if a machine has an error that is outside of the scope of the particular mathematical model, if there are problems with the measurement, such as the ballbar separating from the magnetic cup, or if there are high levels of noise in the measurement. To identify such a situation, statistical measures of the coherence between the model and the measurement can be computed and, for example, displayed to a user of the system (e.g., where a low value for coherence indicates to the user that a closer look at the data might be required).

According to one embodiment of the present invention, parameter estimates are used to describe machine errors within the range of motion that took place during a ballbar test. One potential concern associated with extrapolation of the model to regions outside of the range of motion of the test involves the uncertainty of the parameters in these regions. Therefore, one embodiment of the present invention includes a limitation that it reliably compensates for the region of a plane that is within the range of motion of the ballbar test. For example, for machine planes that have a rectangular (rather than square) range of motion envelope, a single circle test might not produce compensations that are reliable over the full range of motion.

Furthermore, certain error types appear to be more reliably extrapolated than others. For example, backlash, windup, and scale errors appear to be much more uniform over the full range of the axis than a parametric squareness and straightness error. Moreover, parametric compensation of a machine may be inappropriate in situations where the range of motion of the ballbar test used to develop the compensation is significantly less than the range of motion of one or more of the machine axes. In such a situation, parametric compensation based on a ballbar test may be most useful as a supplement to data-based bidirectional-axis- (pitch)-compensation and cross-axis-compensation that covers the full range of axis motion.

In other embodiments involving a ballbar test, the test may be used by the end user to fine-tune the compensation over a limited range of axis motion that represents the range of motion to be employed in an immediately upcoming machining operation. Accordingly, in one embodiment of the present invention, it is recommended that the diameter of the circle test encompass as much of the machining envelope as possible. As can be understood, the ability of the parametric model to exactly describe the motion within the limited region increases as the range of motion (circle diameter) decreases, (the error types are more likely within the scope of the model).

Another consideration that might affect the reliability of the parameters can be the nature of the circular motion itself. For example, sufficiently exciting each error source such that it produces a unique effect on the measurement allows different error sources contained within a model to be distinguished. For an exemplary model described herein, sufficient excitation involves collecting data for both clockwise and counter-clockwise moves. Additionally, in a further exemplary embodiment, the length of the data arc is as large as possible.

In an exemplary embodiment, both clockwise and counter-clockwise data arcs cover 360 degrees. In some cases, however, the mechanical limitations of the machine might not allow for a test that simultaneously covers a 360-degree arc and the maximum machining envelope of one or both of the axes. In such a situation, one embodiment of the present invention might involve using a data arc that is less than 360 degrees to enable the full axis envelope to be covered. In an exemplary embodiment described herein, the data arc is, however, at least 180 degrees, and the clockwise arc covers the same angular range as the counter-clockwise arc.

A statistical value referred to herein as the excitation may also be computed to provide the user with an indication of the sufficiency of excitation for distinguishing effects of different parameters. Two of the exemplary parametric errors, backlash and windup, are typically indistinguishable from each other during a standard (continuous motion) ballbar test, which provides an indication of the total lost motion. In one embodiment of the present invention, a separate backlash test is performed to determine the contribution of the backlash error to the total lost motion indicated by the measurement data from continuous motion test.

According to an exemplary embodiment of the present invention, a user interface, such as one containing four primary modes, can be provided for the system. In one embodiment, these modes include a setup test mode, a run test mode, an analyze data mode, and an adjust compensation mode. For example, each mode can be displayed as a separate page on a user interface.

Figure 2:
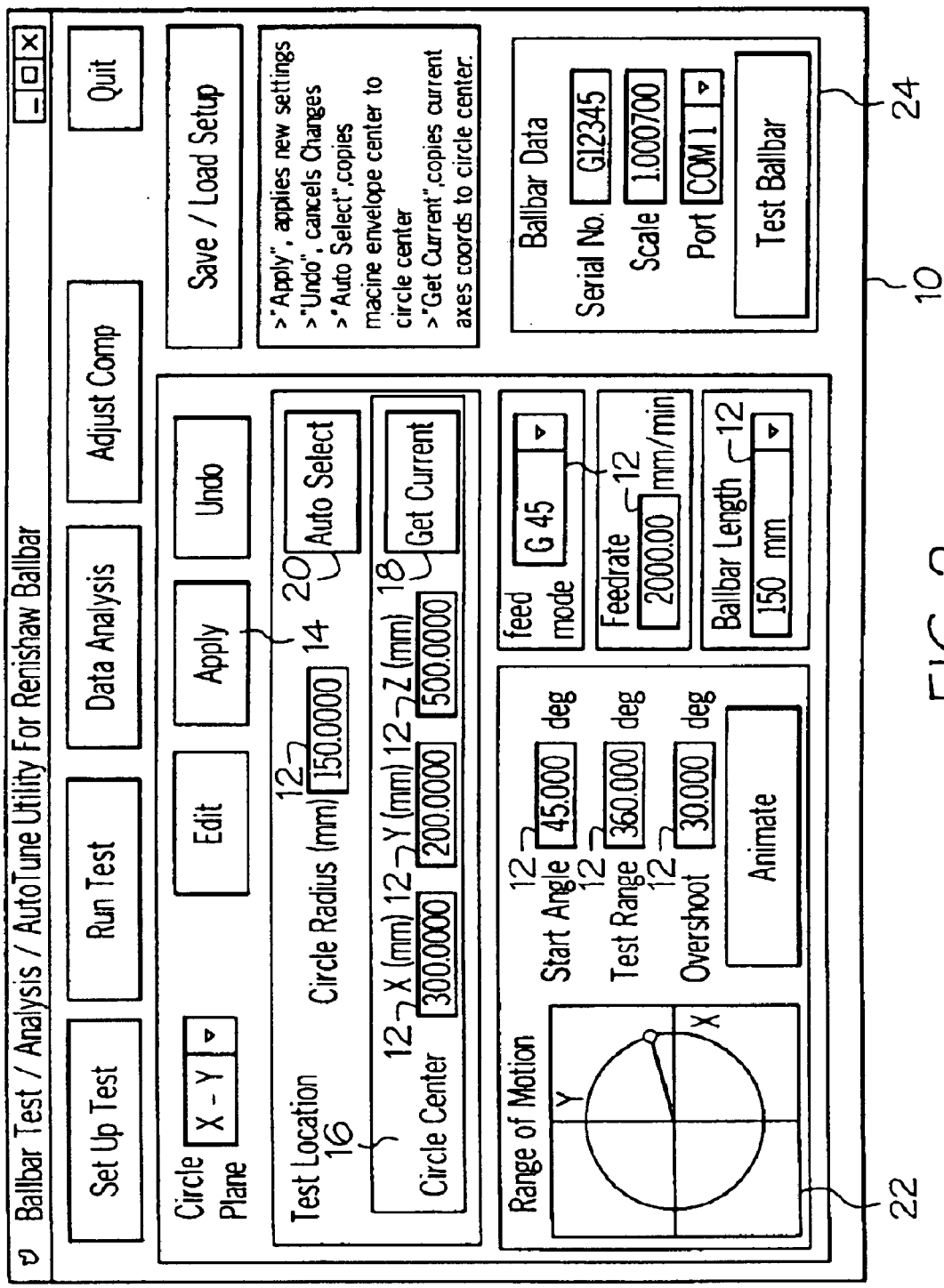
FIG. 2 is a screen shot of a setup interface according to an exemplary embodiment of the present invention.

Referring now to FIG. 2, in one embodiment of the present invention, a test-setup page 10 can be provided that acts as an interface for a user to, for example, either load a set of test condition parameters from a file or to specify such parameters manually. In an exemplary embodiment, the test conditions specified on this page can be used (e.g., by the control) to automatically generate a part program during a test execution stage (such as under the run-test mode that will be later described herein).

According to one exemplary embodiment, the test condition parameters may be specified for one test in each major plane of an associated machine (e.g., XY, XZ, YZ). For example, the user may modify the test condition parameters by entering an edit mode. While in edit mode, fields 12 that contain the test condition parameters could become modifiable.

Once any desired changes have been made, the user can then press an "apply" button 14. In such an embodiment, pressing an apply button 14 can be used to initiate a series of validation checks for the entered test condition parameters. For example, validation checks could be used to ensure that a reasonable test may be developed from an entered combination of test condition parameters. In one exemplary embodiment, if a validation test fails, an alert describing the problem is displayed, the user interface remains in edit mode, and the user is expected to change the test parameters until they represent a valid combination.

In a further exemplary embodiment, a separate group of test condition parameters can be stored for each of the three major planes. The test condition parameters could include the following:

1) circle radius (less than or equal to the ballbar length)
2) circle center (location in X, Y, Z where circle should be centered)
3) data arc start angle (counter clockwise angle from horizontal axis at which to begin data collection)
4) data arc length or test range (arc angle over which data is collected);
5) overshoot arc length (arc angle where data is not collected to allow for transients during acceleration and deceleration; in one embodiment the acceleration overshoot arc and deceleration overshoot arc can both be specified by this parameter)
6) ballbar length (this selection might be limited based on available extension bars);
7) feedrate (programmed feedrate for data-arc, overshoot-arcs, feed-in, and feed-out); and
8) process or feed mode (specifies the group of path parameters (e.g., G45.n) to be used for motion during the test; this may affect path acceleration, path jerk, step velocities, and feedforward status)

In one embodiment of the present invention, a combination of test conditions parameters are validated, such as against the following: 1) Is circle radius appropriate for the ballbar radius; 2) Is axis motion within the machine range?; 3) Is circle center within the machine range?; 4) Are overshoot arcs sufficiently long to enable constant feedrate during data arc?; and 5) Are the data arcs long enough to provide sufficient excitation to distinguish between error types?

In an exemplary embodiment of the present invention, a circle radius is required to be less than or equal to a ballbar radius. According to such an embodiment, if the circle radius is less than the ballbar radius, the length of the ballbar traces a conical surface. In such an embodiment, the circle radius is slightly less than the ballbar radius because the measurements might become overly sensitive to motion in the direction of a third axis (e.g., the axis perpendicular to the major plane). Motion along the direction of the third axis should be substantially indistinguishable from motion of the axes in the plane and can often distort the parameter estimation.

For example, as the angle of the cone increases from 0° (circle radius equal to the ballbar radius) to 45°, the relative contribution to ballbar deflection from motion in the third axis increases from 0% to 100% of the deflection caused by motion in the plane. A respective exemplary validation check requires that the cone angle not exceed 26°. In such an embodiment, at 26°, the relative contribution to ballbar deflection from motion of the third axis is 50% of that of motion within the plane.

The selected values for ballbar length, circle radius, circle center, overshoot arc, data arc start angle, and data arc length can also be evaluated to ensure that the motion produced is everywhere within the range limits of the axes. For example, if it is detected that an axis range limit might be exceeded, a validation check can provide proposals for changing, for example, the circle center to allow the circle to fit within the envelope of the machine (if the motion can be brought to within the machine envelope by shifting the center).

Even if the circular arc is within the machine's range, it can still be possible that the circle center is not within the range of the machine. For example, this can occur when the circle radius is less than the ballbar length. Accordingly, in one embodiment, as a tool tip (e.g., a magnetic cup) should be brought to a circle center ball to locate a centering fixture, the circle center should be within the range of the machine.

Another exemplary embodiment can include requiring collection of data during a period of time when the circle is traversed at a constant feedrate. The frequency response of an axis typically involves distortion of the amplitude and phase as a function of frequency (for a circle, the frequency is proportional to feedrate). At a single feedrate, the amplitude and phase distortion should be constant, the shape of the circle should not be distorted (from individual axis frequency response), and it should be possible to compensate for the effects due to constant amplitude attenuation and phase lag when post processing the data.

An acceleration overshoot arc can be included to help ensure that the machine axes have an opportunity to accelerate to full feedrate before data collection begins. Meanwhile, a deceleration overshoot arc can be included to avoid collecting data during the deceleration from full feedrate to a full stop. While, in one embodiment, the overshoot arcs should be long enough to ensure constant feedrate during the data-arc, it can also be desirable to keep the length of the overshoot arc to be only slightly above its minimum possible value to minimize the total test time.

Length of the acceleration overshoot arc can depend on several factors, including: 1) an end of span speed constraint of a feed-in span preceding the acceleration overshoot arc, 2) a span maximum acceleration and jerk for an overshoot arc span, 3) programmed feedrate, 4) axis Kv gains, 5) axis feedforward levels, and/or 6) whether rate feedforward is activated. Similarly, the length of the deceleration overshoot arc can depend on similar factors. Furthermore, the span data's acceleration, jerk, end-of-span-speed-constraint, and feedforward status can vary depending, for example, on the axis configuration data, path configuration data, feed mode selection, data-arc start angle, and data arc length.

Typically, lengths for the acceleration and deceleration overshoot arcs can be substantially identical. In one embodiment, whether an overshoot arc is acceptably long can be determined by running a sequence of spans in a test move through motion algorithms of the control without directly controlling the machine. In an exemplary embodiment, appropriate subsystems of motion algorithms of the control (e.g., look-ahead and velocity management) are linked to form a limited scope emulation that can run as a callable function in a non real-time environment. The motion can be emulated in much less time than the actual move by, for example, limiting the emulation to small portions of the movement with the correct initial conditions (velocity and acceleration).

The emulated path distance signal can be passed through a filtering function that provides the same phase and amplitude distortion created by the axis Kv and feedforward level. According to one embodiment of the invention, the results of the emulation can be used to indicate whether or not the overshoot arcs are long enough. If the arcs are not long enough, then a conservative approximation can be used to develop a proposed value for overshoot arc length to provide to the user. This new estimate can also be validated against the actual motion.

With respect to one exemplary embodiment, an estimate of total lost motion for both axes in a plane can be obtained by including at least one reversal for each axis during the motion. This implies a minimum range of motion of somewhat greater than 90° if the data is aligned with one of the circle quadrants. In order to accommodate any data arc start angle, data arc length can be set somewhat greater than 180° to help ensure the occurrence of at least one reversal for each axis. Additionally, 180° of motion can help afford the ability to reasonably distinguish between squareness and straightness errors. Thus, in such an exemplary embodiment, a minimum allowable data arc is 180° and an excitation parameter exceeds a minimum defined threshold.

Setup test page 10 can also add additional content to increase overall usability. For example, a setup test page 10 can include a "Get Current" button 18 that, when pressed, copies current machine coordinates of the axes to the circle center coordinates for the current plane. It can also contain an "Auto Select" button 20 that sets the circle center as the middle of the machine's maximum range envelope and sets the circle radius equal to the ballbar length. In one embodiment, the "Get Current" and "Auto Select" buttons 18, 20 are enabled when in edit mode.

Setup test page 10 can further contain a graphical and/or animated representation 22 of the data arc and/or overshoot arc. Additional capabilities could include an ability to revert to the original test condition parameters that were present prior to any changes that were made during the current edit session (e.g., such as from within an edit mode). It can also include the ability to save the current test condition parameters (e.g., for each of three planes) to a file and/or to load new test condition parameters (e.g., for three planes) from a file. Still further, setup test page 10 can include the ability to assign the currently active test condition parameters as the default setup that is present when the user interface is opened.

In certain embodiments, setup test page 10 can contain content to assign data associated with, for example, a ballbar device itself. For example, a serial number of the ballbar can be copied to the header of a measurement data file for the purpose of creating a permanent record of the particular ballbar used to generate that data set. A ballbar scale factor can be used to adjust the measurements to account for the unique characteristics of the specific ballbar (typically printed on the side of the ballbar). Still further, a COM port to which the ballbar is attached can be specified on this page. There can also be a button that is used to debug ballbar problems.

Figure 3A:
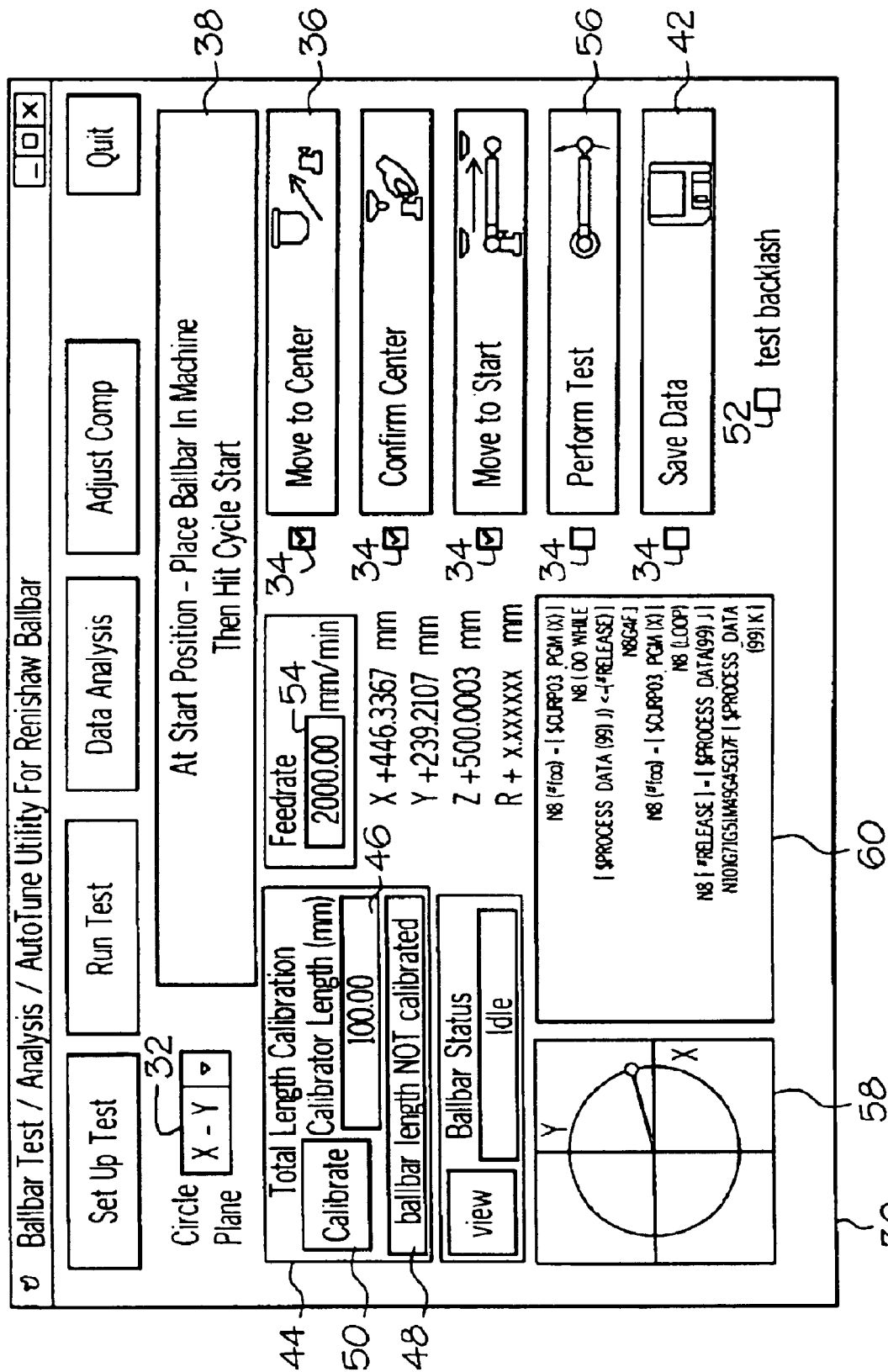
FIGS. 3A and 3B are screen shots of a test interface according to an exemplary embodiment of the present invention.

Referring now to FIG. 3A, a run-test page 30 can be included, such as one that provides an interface to aid a user in setting up a fixture (e.g., a ballbar) and executing a test (e.g., a ballbar test). For example, such a run-test page 30 can comprise a drop-down list 32 for selecting a test (e.g., of three major plane tests) to perform. In one embodiment involving a ballbar test, for each of the major planes, five sequential tasks (or visible states) in the overall process of obtaining and saving a measurement are provided.

According to such an embodiment, when a major plane is selected, test setup data associated with that major plane is employed in the execution of the test. If a new major plane is selected, the state returns to its starting point in the test sequence. A finite state machine (FSM) that recurrently polls control and acquired data can coordinate the progression through these states. For example, such a test coordination FSM can contain more states than those that are made visible as a task. A detailed discussion of one embodiment of such a FSM involving a ballbar test is further discussed later herein.

According to an exemplary embodiment of the present invention, progress towards the completion of the tasks is indicated with a display on a screen. For example, each task can have an associated checkbox 34 that becomes checked when a corresponding task has been completed. A user can also be provided with the ability to, at any point in the process, go back any number of tasks by, for example, pressing a button associated with that task. Additionally, if a task fails to complete properly, the ability to automatically back up to the nearest previous state or task possible can also be provided.

In one embodiment, throughout a sequential process, a user can be provided with a text description of what to do next to progress through the sequence. For example, control data can be used to determine when the requirements for a state transition to the next state in the sequence (of tasks) have been fulfilled. In an exemplary embodiment, a user can avoid the manual intervention involved in completing the process by performing all operations using, for example, a pendant or panel of the control. One advantage associated with such an exemplary embodiment could include allowing the user to accomplish tasks at a machine without having to return to the control.

In one embodiment of the present invention involving a ballbar test, primary tasks in the process of completing the ballbar test include 1) MoveToCenter, 2) ConfirmCenter, 3) MoveToStart, 4) perform the test, and 5) save data associated with the test. A high level description of each of these tasks according to an exemplary embodiment is given below.

The state associated with the MoveToCenter task can be entered by, for example, pressing a Move to Center button 36 on run-test page 30. According to one embodiment, when the MoveToCenter state is entered, the recurrent polling for transition stimuli begins (if it has not already begun). Accordingly, when the MoveToCenter state is entered, a sequence of part program blocks to cause the axes to move to the circle center is created and loaded into, for example, a part program Manual Data Interface (MDI) buffer. A prompt text 38 can then be updated to inform the user to, for example, ensure that the path to the circle center is free of obstructions and then hit cycle start to begin the move. When it is detected that the final block in the move-to-center program has been completed and the control-state has transitioned from in-cycle to at end of program (eop) (described later herein), the FSM can transition to states associated with a ConfirmCenter task.

At the ConfirmCenter state, the FSM can update prompt 38 to ask the user to, for example, locate the center ball in the magnetic cup of the tool holder, tighten the set screw, and hit cycle start. Upon entering ConfirmCenter, the MDI program buffer can be loaded with some non-motion blocks and dwell blocks whose purpose is to message the FSM as the blocks are executed. Accordingly, when the FSM detects that the user has hit cycle start to confirm the center, the FSM can capture the current axis positions and store them as the circle center for the current test.

One advantage of such an embodiment can include facilitating the use of a slightly different circle center than the one defined in the test setup data. This can be useful because it can allow the test setup data to contain values for the circle center coordinates that are slightly offset from the plane of the center ball. Accordingly, the move to center can be performed with a high degree of confidence that the tool tip will not collide with the center ball. When the center has been confirmed, prompt 38 can be updated to, for example, suggest that the magnetic cup be power-fed or handwheeled off of the center ball.

The state associated with the MoveToStart task can be entered (e.g., from the ConfirmCenter task) when the FSM detects that the axes have been moved off of the center ball. As the state associated with MoveToStart is entered, the MDI buffer can be loaded with program blocks to move the axes to the start position for the test move and prompt 38 can be updated to, for example, suggest ensuring a safe path to the circle start point and hitting cycle start. The program blocks can move the axes to the position from which the initial feed-in move originates.

In one embodiment, when the FSM detects that the move to the start position has completed, it can generate a continuous motion ballbar test program and load it into, for example, the MDI buffer. If the user had indicated that a backlash test was also to be performed, the FSM can also include backlash test blocks in the program loaded into the MDI buffer. The display prompt can be updated to suggest that the user place the ballbar into the machine and hit cycle start to begin the test.

Figure 3B:
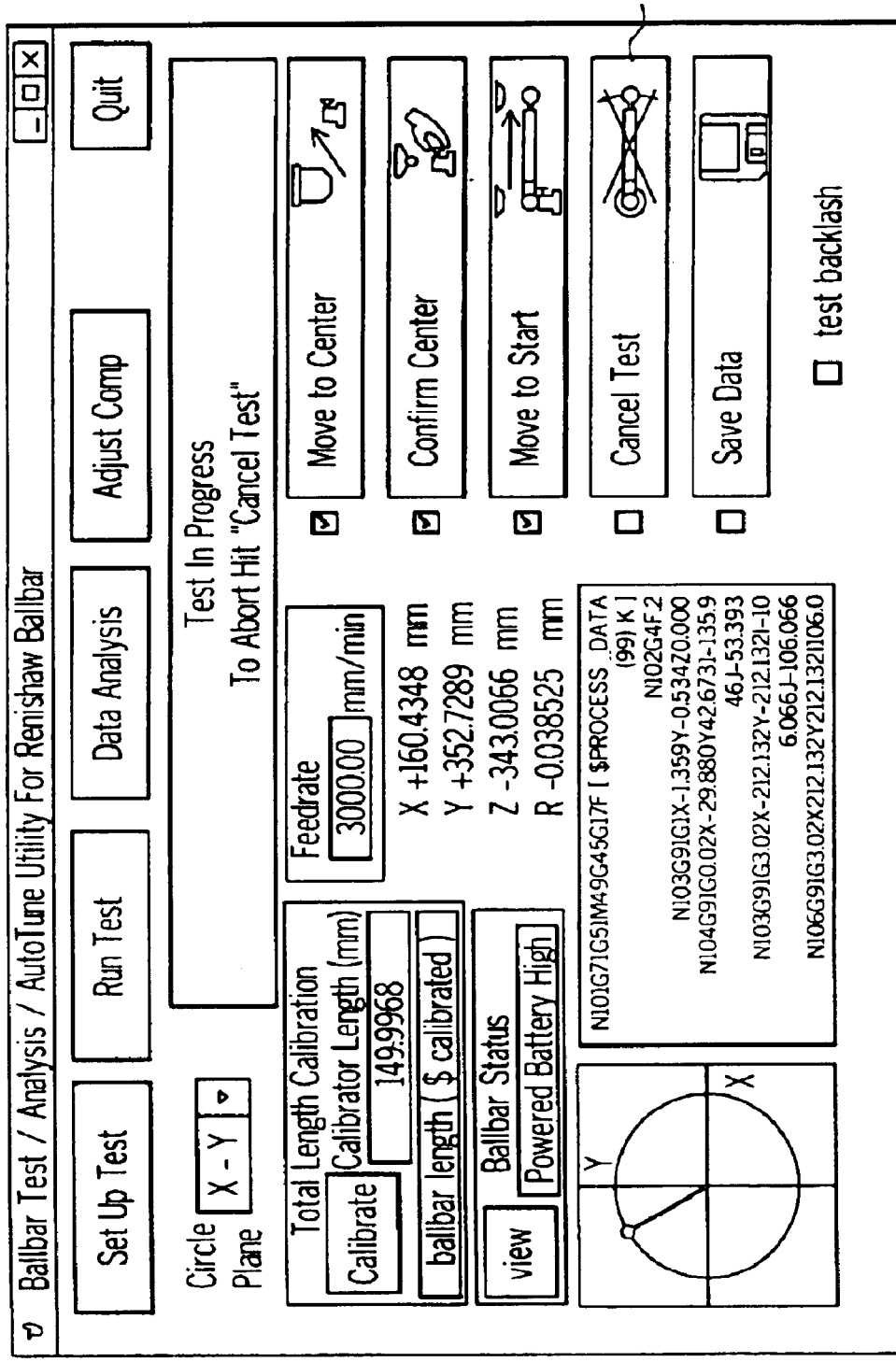

When the FSM detects that the ballbar test program execution has reached a certain point (e.g., prior to any motion), the FSM can cause program execution to temporarily suspend (e.g., using a technique to be described in a later section) and attempt to initialize the ballbar device. If the ballbar is successfully initialized, a button (e.g., "Cancel Test" button 40 of FIG. 3B) to enable the user to manually abort the test can be created and displayed, program execution can be allowed to continue, and the FSM can begin polling the ballbar position to detect the initial feed in the first (e.g., counter-clockwise) move.

After detecting initial feed-in, the FSM can begin, for example, storing ballbar measurements, checking for error conditions, measuring elapsed test time (e.g., based on the number of periodic ballbar measurements obtained), and testing for a feed-out move. In an exemplary embodiment, the program becomes suspended after the feed-out move. When the feed out move occurs, the data arc can be extracted from the total data set and validity checks (to be described later) can be performed. Assuming that the validity checks indicate no problems, the FSM can release the program from its suspended state and prepare to detect the initial feed-in from the second (e.g., clockwise) move.

In an exemplary embodiment, the sequence of events that occur during the second move is analogous to that of the first move. In one embodiment, once the second move completes and the validity check indicates a successful test, the program can begin to execute a backlash test (described later). Once testing is complete and validity checks are successful, the data can be extracted and stored in, for example, a temporary file.

A save data task can be initiated by, for example, the user pressing a save data button 42 after a valid test has been completed. In an exemplary embodiment, save data button 42 is enabled when a test has been completed and validated. For example, pressing save data button 42 can bring up an interactive dialog box (e.g., a window) used to assign a name for the file and to provide the user the opportunity to enter other information pertinent to the test (such as the machine type, serial number, etc). The data file can contain raw data and a header to describe the test conditions. In one embodiment, the save dialog initially contains a default file name that is created based on, for example, the test plane, machine serial number, calendar date, and number of data files with the same properties already present on the disk.

From the perspective of a user, the performance of a ballbar test according to an exemplary embodiment of the present invention could have the following sequence. The user selects a test plane from a drop down list 32, indicates a move to center (e.g., via button 36) on a user interface and indicates cycle start (e.g., via a pendant). An associated machine moves to a circle center.

The user manipulates a center fixture and uses a handwheel to make small adjustments to axis positions until a magnetic cup "picks up" a center ball. At that point, the user tightens a setscrew of the center fixture and hits cycle start. The user power feeds the axes off of the center ball, hits cycle start and the axes move to a start position. The user places the ballbar in the machine, hits cycle start, and the machine performs the test. When the test is complete, the user indicates that the data should be saved (e.g., via a save-data button 42) and the data is stored into a file.

In addition to its ability to perform the aforementioned steps, run-test page 30 can also provide some additional capabilities. For example, run-test page 30 can include an interface 44 for performing calibration of a test device (e.g., a length of a ballbar). Run-test page 30 can also provide an ability to select whether, for example, a backlash test is performed in addition to a continuous motion test. In still further embodiments, run-test page 30 can provide the ability to perform multiple tests at, for example, multiple feedrates without having to repeat the move-to-center, confirm-center and move-to-start tasks, and without having to return to, for example, setup-test page 10.

As previously alluded to, a length calibrated ballbar can enable a determination of an absolute axis scale error (a scale mismatch between axes can also be determined, even if the ballbar length is not calibrated). Accordingly, in one embodiment of the present invention, run test page 30 contains an interface 44 that enables device calibration, such as ballbar calibration. For example, such an interface 44 can include a numeric field 46 where the user can enter the length of a calibration fixture, an indicator (e.g., display 48) of whether the ballbar is currently length-calibrated, and a button 50 to request that calibration begin.

In an exemplary embodiment involving a ballbar calibration, to calibrate a ballbar length, a user first enters a calibrator length (e.g., as printed on the calibration fixture). The entered value is checked (e.g., by software) to ensure that it is reasonable given the configured ballbar nominal length. Whenever a valid new calibration length is entered, an internal state can transition from calibrated to uncalibrated. At that point, display 48 can indicate that the ballbar is not calibrated and the user can press calibration button 50.

According to one embodiment, pressing button 50 initiates a sequence where the ballbar initializes, powers on, collects data for a short period, and powers off. The data can then be checked for constancy and the reading used to determine an offset to add to the ballbar measurement to obtain an absolute ballbar length reading. This value can be stored and used when processing later measurements. Length calibration can be performed, for example, during the primary tasks described above, with the exception of the perform-test task. In an exemplary embodiment, the test coordinator FSM disables the calibration controls when the state is inappropriate for calibration.

With respect to ballbar testing, a backlash test can be an additional test. For example, a backlash test might be used to distinguish between windup and backlash components of the total lost motion measured by a continuous motion test. The term backlash is used herein to describe a type of lost motion that continues to persist after an axis has come to a stop. The term windup is used to describe a type of lost motion that occurs while an axis is in motion.

In an exemplary embodiment implementing a backlash test, the user can indicate that the performance of a backlash test is desired by checking a "backlash test" check box 52 at some point prior to the move to start task. Such a backlash test can be used, for example, to measure the persistent lost motion of each axis in a plane by performing ballbar measurements before and after single axis moves that end in a full stop. One exemplary backlash test part program is operative to move the axes along arcs to each of four circle quadrant boundaries (that are within the range specified in setup data). At each quadrant boundary, the part program and FSM can effect a sequence of events by incorporating schemes for messaging between the program and FSM.

In an exemplary embodiment, at each quadrant boundary, the following sequence takes place:

1. Perform a single axis move toward the circle center along a radial.
2. Stop axis motion, pause, and collect a first ballbar measurement.
3. Feed the axis further toward the circle center along a radial.
4. Stop axis motion, pause, and collect a second ballbar measurement.
5. Feed the axis back towards the previous point along the radial.
6. Stop axis motion, pause, and collect a third measurement.

According to one embodiment of the present invention, for every ballbar measurement, a validity check is performed to ensure that the ballbar is at a constant deflection for the duration of the measurement. Accordingly, the difference between the first and third measurement is the axis backlash. The second measurement can be used to check validity. The average measured backlash for each measurement point for an axis can be stored as the axis backlash. Meanwhile, axis windup can be computed by, for example, subtracting the axis backlash from the estimate of the axis's total lost motion from the continuous test's data.

Run test page 30 can also contain a numeric field 54 that enables the user to modify a feedrate. Such an embodiment might be useful in that it could allow the user to run multiple tests without having to return to, for example, test setup page 10. For example, each time the feedrate is changed, a validity test on the length of the overshoot angles can be performed. If the overshoot angles are not sufficiently long, an alert message can be displayed with a suggested value. In an exemplary embodiment, to perform a new test after having just successfully completed a test, the user can simply enter a new feedrate (if desired) and press a perform-test button 56. In a further exemplary embodiment, each successive test is stored in its own data file, such that every data file contains, for example, exactly one counter-clockwise result and one clockwise result.

With respect to the performance of a validity test on data acquired using a ballbar, such a validity test can be used to compare a number of data points collected through, for example, a data pipe of the ballbar, between a feed-in move and feed-out move to an expected value. If the number of data points deviates from the expected number of data points by more than a tolerated amount, the total test time is different than expected and the data can be considered invalid. An advantage associated with such a validity check can be that, if there is a significant deviation between the expected time and actual time, the estimate of circle angle based on elapsed time might not be reliable and the reliability of the data analysis might be questionable.

Among the many conceivable situations that can cause the actual test time to differ from the expected time, are: 1) incorrect feedrate, 2) circularity or center-offset errors that are so large that the deviations cause a stop-trigger to occur in the middle of the circle, and 3) lightly damped servo dynamics that result in overshoot or undershoot during the feed-in and feed-out moves. The expected total time between feed-in and feed-out triggers can be determined in advance by, for example, using motion control subsystem emulation (e.g., similar to the look-ahead/velocity manager/Kv emulation previously mentioned). The tolerance for comparing the measured time to the estimated time can be based on the uncertainty about the initial ballbar deflection prior to the feed-in move and the final ballbar deflection following the feed-out move. In one embodiment, the time to execute the emulation may be minimized, as it measures the elapsed time and distance covered during acceleration transients. The expected total time can also be used by, for example, the test coordinator FSM during test execution to detect an error condition where a feed-out trigger failed to occur when expected.

Run-test page 30 can also include numeric displays that indicate axis positions and, for example, an instantaneous ballbar measurement. It can also contain a graphical display 58 capable of indicating, for example, an instantaneous ballbar location. Such a display 58 might be useful for tracking the progress during the motion. Still further, another embodiment of run-test page 30 can include a display 60 of the part program blocks (e.g., those currently in a MDI buffer).

Figure 4:
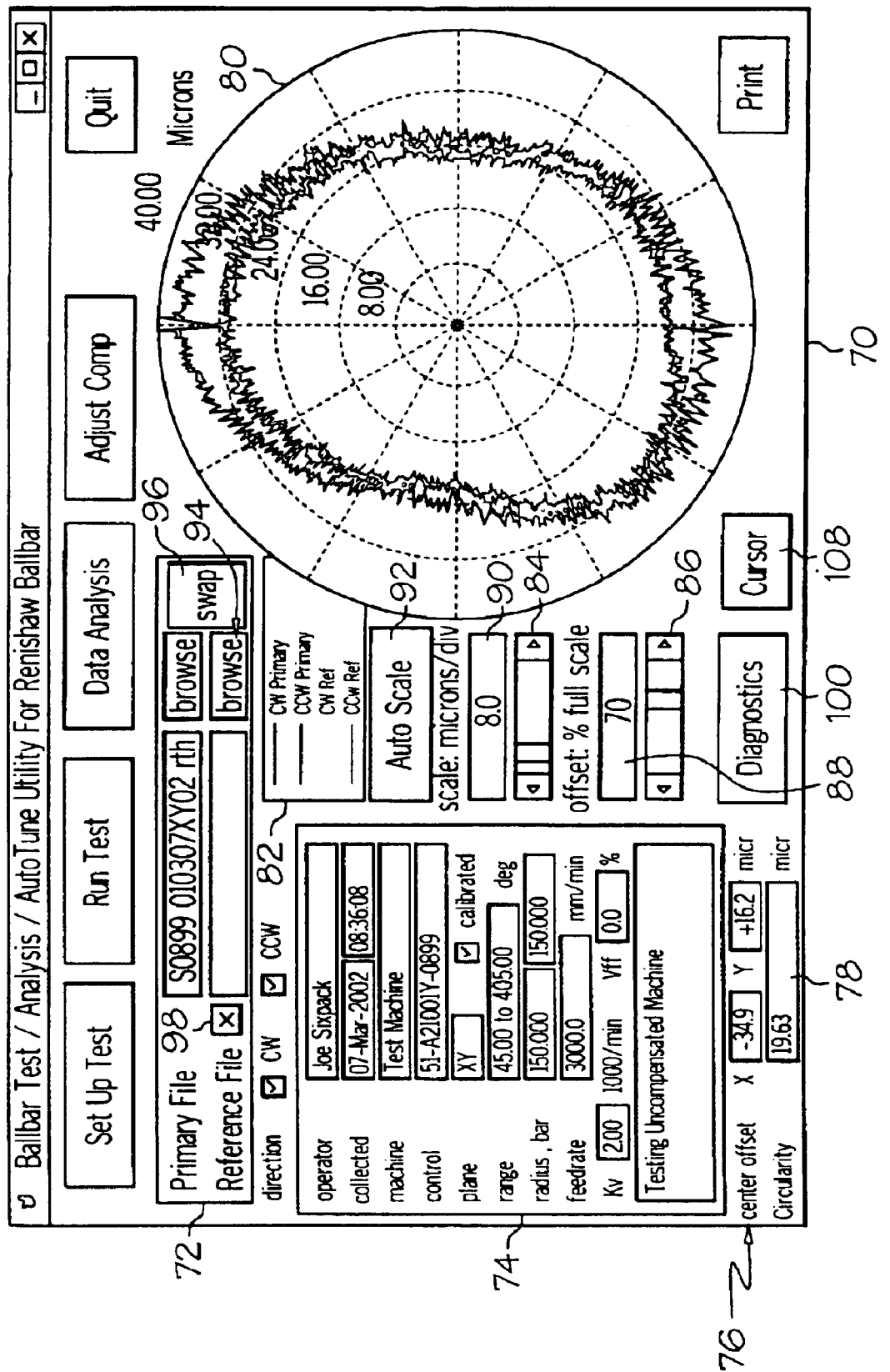
FIGS. 4 and 4A are screen shots of an analysis interface according to an exemplary embodiment of the present invention.

Referring now to FIG. 4, an analyze-data page 70 can be used to provide an interface for a user to view and manipulate an analyzed measurement. For example, a raw measurement can be stored in a data file that contains a header that describes the test conditions and relevant machine configuration at the time of the test. Analyze-data page 70 can have a file load/browse interface 72 that enables the user to load and perform analysis on a previously developed data file.

In an exemplary embodiment, when a test run is successfully completed, a data file developed during the run is automatically loaded, so that when the user switches from, for example, run-test page 30 to analyze-data page 70, the recently collected data is already loaded and analyzed. In one embodiment, whenever a raw data file is loaded, the data undergoes analysis processing. Data manipulation tasks performed for a file load according to one embodiment of the present invention involving ballbar testing are shown in the following list, and described further herein:

1. Convert ballbar deflection to circle radius deflection (for cases where the circle radius differs from the nominal ballbar length).
2. Estimate the circle angle for each data point.
3. Estimate the circle center offset and circularity error (center offset errors could have been created when the center set screw was tightened, or by a servo drift).
4. Estimate the error parameters and their statistical significance.
5. Compute the model coherence statistic.
6. Compute the relative contribution of each error type to the overall circularity error.

In an exemplary embodiment, some of the contents of analyze data page 70 associated with ballbar testing include: 1) displays 74 to reflect the test conditions reported in the file header, 2) an indication 76 of the center offset error, 3) an indication 78 of the circularity error, 4) a polar-error plot 80 of a center-corrected measurement, and 5) a legend 82 to identify traces on the polar-error plot 80. Polar error plot 80 can display, for example, the radius deviation from a reference circle as a function of circle angle. In one embodiment, error amplification is specified as the plot scaling (e.g., the number of microns per radial division on the polar plot's axes). The trace on polar plot 80 can be offset from the polar origin by some amount to make the plot readable. In an exemplary embodiment, the offset is specified as the percent of plot full range that defines the radius on the axes that should correspond to the average radius of the center-corrected measurement.

In still further exemplary embodiments, analyze-data page 70 contains slider controls 84, 86 and numeric-field edit boxes 88, 90 to enable a user to manipulate the scaling and offset used to generate the plot. The page can also contain an auto-scale button 92 that, for example, applies a standard offset and computes (and applies) a maximum amplification (minimum scaling) that results in a plot that is within the range of the display. According to one embodiment of the present invention, when a file is initially loaded, plot 80 is auto-scaled.

Analyze-data page 70 can also include the capability to simultaneously display plots of the results from two separate measurements (e.g., two separate data files) for comparison purposes. For example, two data sets can be classified as primary and reference data. A separate group of controls 94 for data file browse and load capability can be provided for the reference file, while statistics and error diagnostics can be displayed for the primary data. A swap button 96 can also be provided to allow for exchanging the primary and reference files. Furthermore, a button 98 to clear the reference file from the display can also be provided.

Figure 4A:
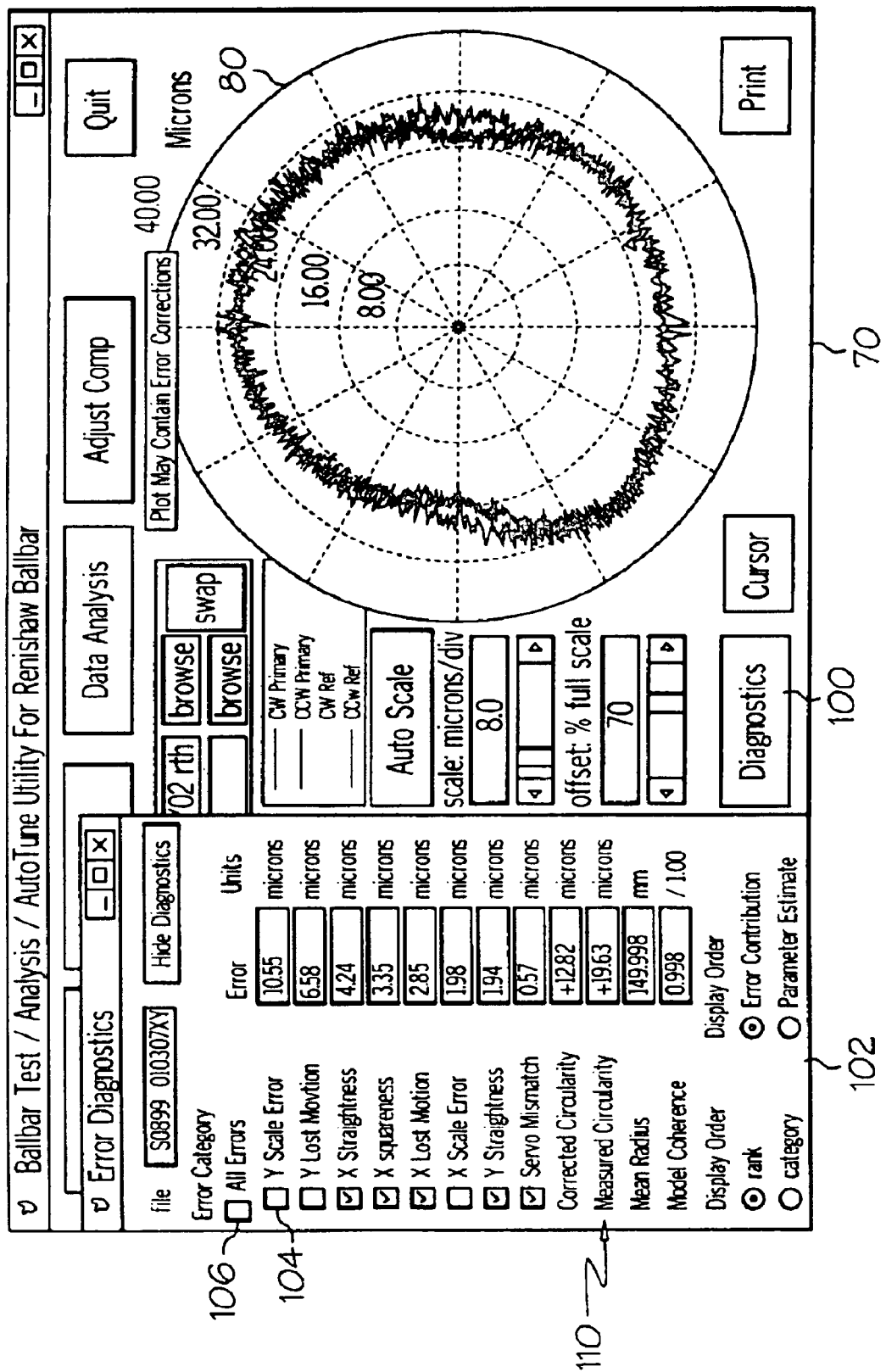

Referring now to FIG. 4A, in an exemplary embodiment, analyze-data page 70 contains a diagnostics button 100 that, when pressed, causes a new (e.g., diagnostics) window 102 to appear. Such a window 102 can contain, for example, a listing of error sources, their estimated values, and a checkbox for each error source. For example, checkboxes (e.g., checkbox 104) can be used to indicate whether polar error plot 80 should contain a contribution from the corresponding error source. In one embodiment of the present invention, the checkboxes are initially checked. Accordingly, unchecking such a checkbox (or several checkboxes) causes the estimated effect(s) of the error(s) to be removed from the measurement, and polar error plot 80 can be updated to reflect the adjusted measurement data. Diagnostics window 102 can also contain a checkbox 106 capable of enabling a user to select (or deselect) all the individual error components with a single click.

The described capability can, for example, allow a user to predict the degree to which applying compensation for one or more error types might improve the performance of the associated machine. One associated advantage could include determining which optional compensation capabilities to activate in a control.

Referring now to FIG. 4, in a further exemplary embodiment, analyze-data page 70 contains a cursor facility (such as one activated by pressing button 108) that aids a user in the task of manually assessing various aspects of the radial errors. The capability can be used to allow the user to place a polar cursor at any point on a trace on polar-error plot 80. Displays that indicate the angle and the deviation from the mean radius for the cursor point can also be provided.

Such a cursor may be controlled by, for example, a slider bar that increases or decreases the angular location, entering values into a numeric field for circle angle, touching (or clicking) a location on plot 80, or by pressing arrow keys on a keypad to increase or decrease the angular location. For example, when the cursor is moved by a slider control or arrow keys, it may be moved at either a slow speed (where the cursor-jump interval is a single measurement point) or at a high speed (where the cursor jump interval is a fixed amount of degrees (e.g., 5 degrees)).

Such a cursor facility might be useful when used in combination with a diagnostics capability for manually diagnosing cyclic errors that appear on, for example, ballbar plot 80. For example, cyclic errors can be isolated by using diagnostics window 102 to remove the effects of all the estimated error types. The amplitude and period of the remaining errors can then be manually identified with aid of a cursor.

Once again referring to FIG. 4A, in certain embodiments of the present invention, diagnostic window 102 can also be provided with the following functionality: 1) the ability to choose the order in which errors are displayed (e.g., either ranked based on relative contribution to overall error or grouped logically based on category), and/or 2) the ability to specify whether a numeric error value display should indicate either an error parameter or a contribution of that error to a total circularity error. Diagnostics window 102 can also contain readouts 110 for a measured circularity (e.g., a circularity error of the original (center-corrected) data), a corrected circularity (e.g., a circularity error of adjusted data that has error sources of the types whose checkboxes are checked), and/or a model coherence (e.g., a measurement of the ability of the error model to account for the content of the measurement data).

Figure 5A:
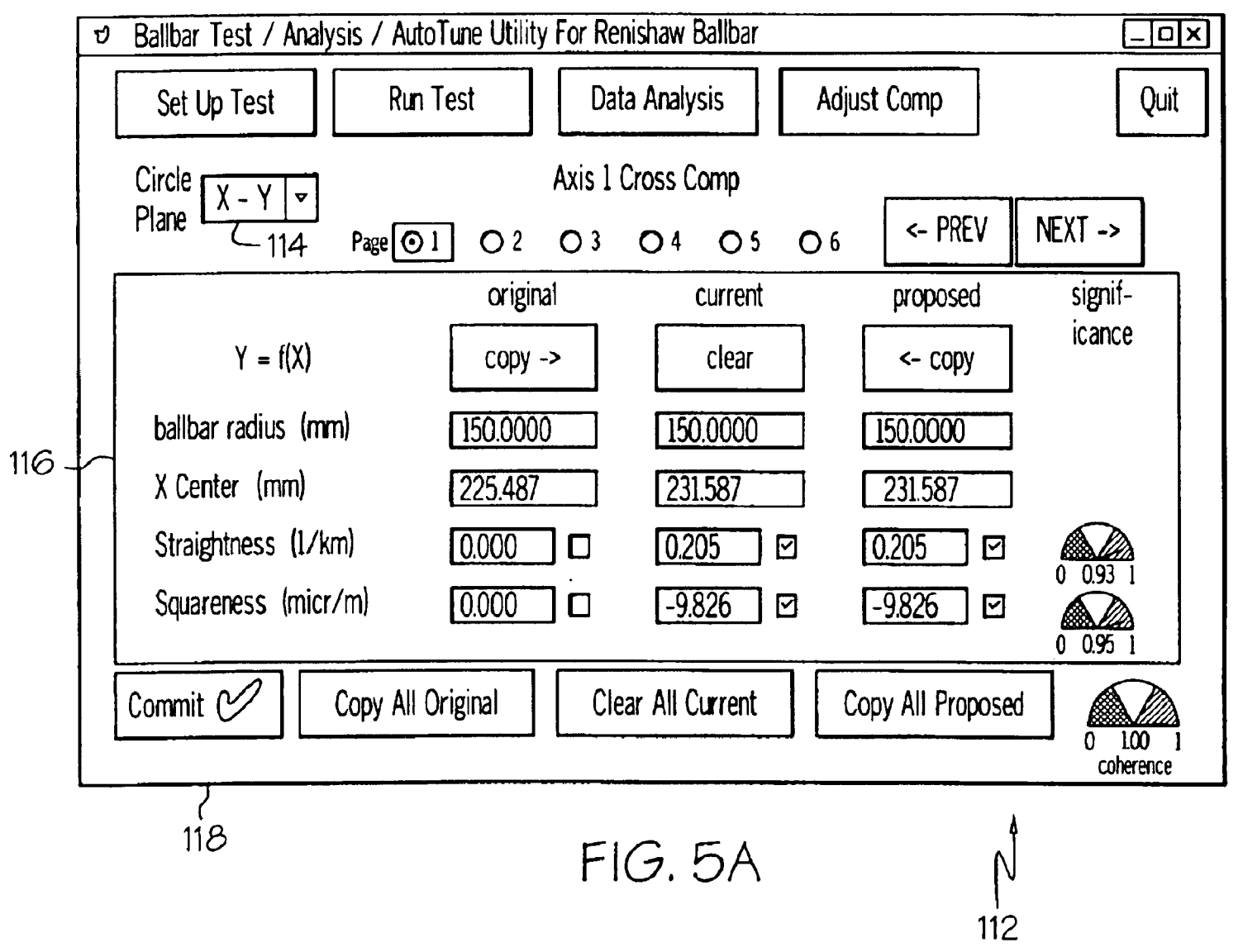

Referring now to FIG. 5A, an adjust-compensation page 112 can also be included that provides an interface for a user to change configuration data, such as that associated with, for example, certain types of axis compensation that have an effect on a ballbar measurement. For example, such a page 112 can contain a pull-down menu 114 for selecting a major plane (e.g., XY, XZ, YZ). Within such an adjust-compensation page 112, there can also be sub-pages associated with a particular type of compensation (e.g., six categories of compensation are described below).

In an exemplary embodiment of the present invention, within each category of error, a configuration data display 116 is provided that is limited to the axes involved in the major-plane circular move. The configuration data can be applied uniformly to all physical connections to the indicated logical axis (a detailed description of how cross-axis associations can be created for multiple physical connections to a logical axis is further provided herein). In the descriptions, the horizontal (H) and vertical (V) axes are defined differently depending on the major plane: {XY: H=X, V=Y}; {XZ: H=X, V=Z}; {YZ: H=Y, V=Z}). The displays can be used to indicate which axis is horizontal and which is vertical.

A horizontal axis cross-comp sub-page 118 such as that depicted in FIG. 5A can be included that contains configuration data to specify, for example, a straightness and squareness compensation that compensates a V-axis position as a function of a H-axis position. In one embodiment, the specific logical axes that form the association are indicated on the page header (e.g. Y=f(X)). Configuration items that can be on this page include: 1) squareness coefficient, 2) straightness coefficient, 3) H-coordinate of compensation origin, and 4) straightness compensation's range of applicability expressed in terms of ±displacement from the compensation origin.

Similarly, a vertical axis cross-comp sub-page can be included that contains configuration data to specify a straightness and squareness compensation that compensates, for example, an H-axis position as a function of the V-axis position. In an exemplary embodiment, the configuration items on this page mirror those on the horizontal axis cross-comp page discussed above and shown in FIG. 5A, except that they apply to the V-axis rather than the H-axis.

Figure 5B:

Referring now to FIG. 5B, a horizontal axis scale-error-comp sub-page 120 can be included that contains configuration data that is used to specify, for example, pitch-error or scale-error compensation of the H-axis. For example, such a page can indicate which axis is the H-axis for the particular major plane selected. The pitch or scale compensation can be achieved by creating an association for squareness/straightness compensation where the axis is associated to itself, the squareness compensation coefficient is the pitch-error coefficient, and the straightness compensation is disabled. In an exemplary embodiment, such a page also contains fields for pitch-error-comp coefficient and a compensation origin for the H-axis.

Figure 5C:
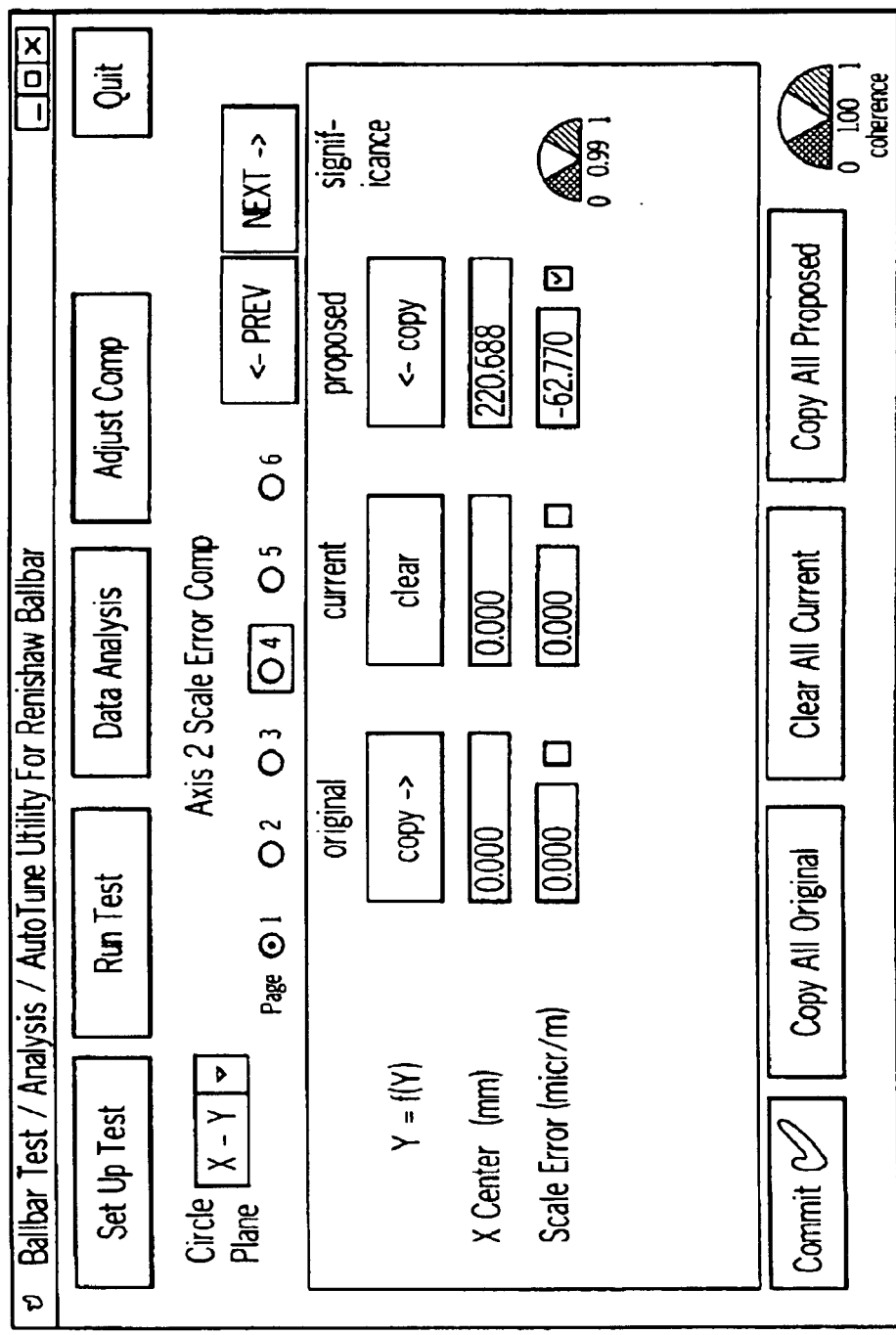

Meanwhile, referring now to FIG. 5C, a vertical axis scale-error-comp sub-page 122 can be included that contains configuration data that is used to specify scale-error-compensation for a V-axis. In an exemplary embodiment, such a page mirrors that of the horizontal axis-scale-error-comp page as described above, except that it compensates for scale errors in the V-axis instead of the H-axis.

Figure 5D:
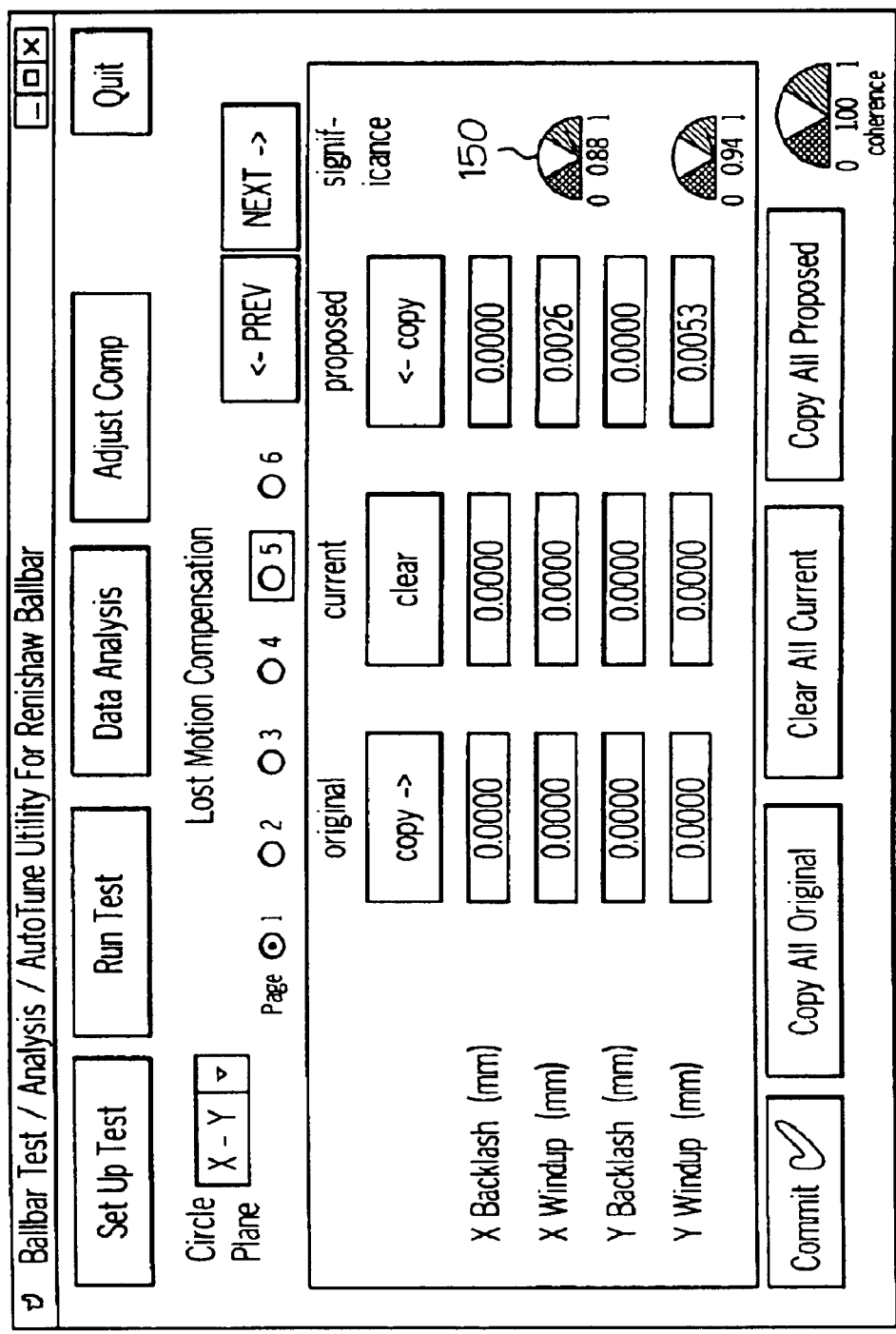

Referring now to FIG. 5D, a lost motion compensation sub-page 126 can be further included that contains configuration data items for backlash compensation and windup compensation for the H and V-axes involved in the major plane circular move. In an exemplary embodiment, the specific logical axes associated with the H and V axes are indicated in a display.

Figure 5E:
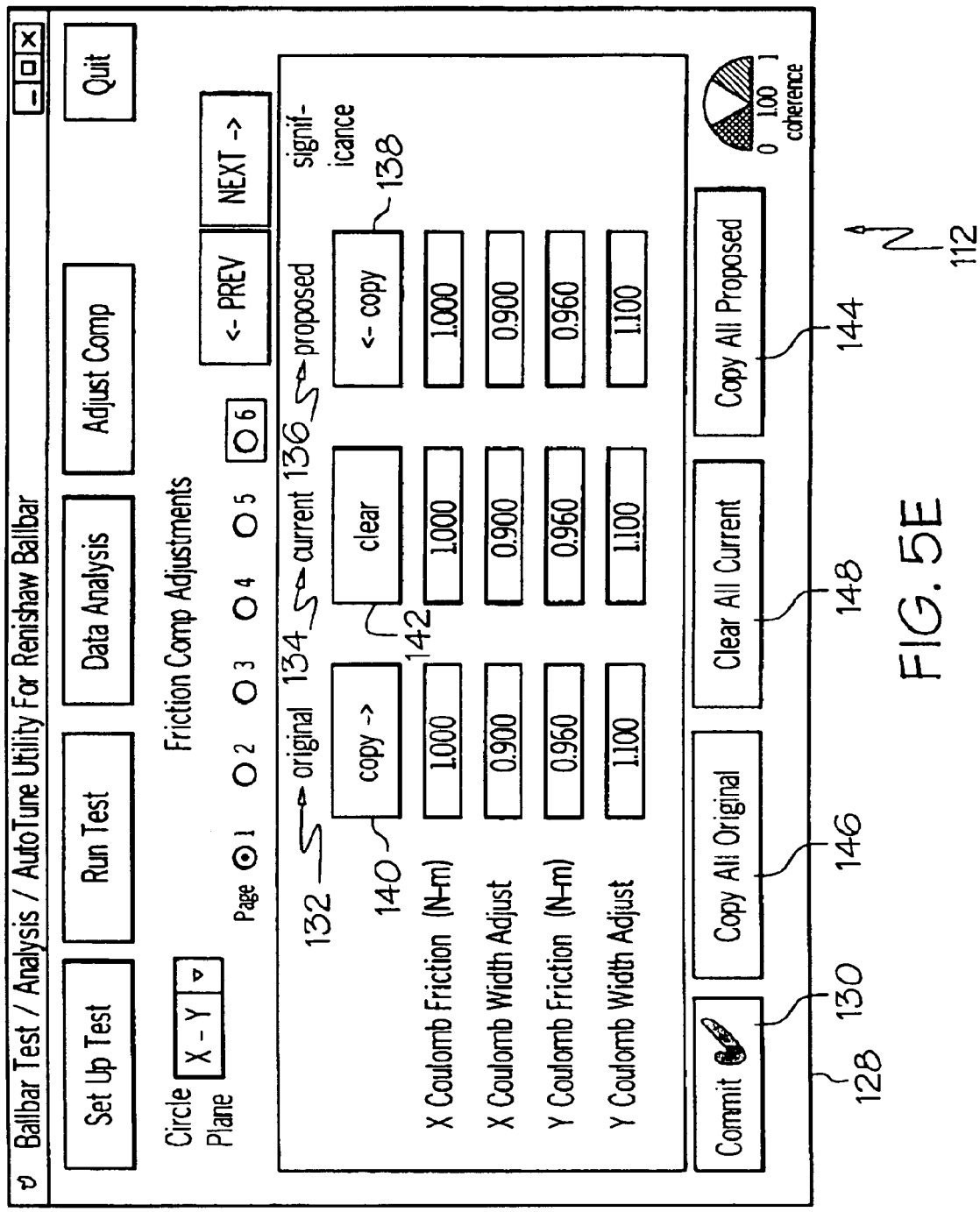

Furthermore, and referring now to FIG. 5E, a friction comp adjustments sub-page 128 can be included that contains configuration data items for Coulomb-friction-feedforward parameters for the H and V-axes involved in the major plane circular move, for example. In an exemplary embodiment, specific logical axes associated with the H and V axes are indicated in a display.

In further exemplary embodiments, adjust-compensation page 112 can also contain a commit button 130 that copies the values from the (current-values) numeric fields to, for example, a database associated with the control and then, for example, issues a configuration-change system event to update the configuration data.

Adjust-compensation page 112 can also provide suggested values for changing existing compensation parameters. For example, each configuration parameter can be represented by three fields on the page: an original value field 132, a current value field 134, and a proposed value field 136. In an exemplary embodiment, each configuration item's current-value field is the source of that configuration item's value that is copied to a database when commit button 128 is pressed.

In one embodiment, the current-value field 134 is typically displayed. Meanwhile, in such an embodiment, the original-value and proposed-value fields 132, 136 can be displayed when parameter estimates for a primary file have been obtained from the most recent measurement and when the current database values for the compensation parameters are the same as those present during the most recent test. One associated advantage could be that this ensures that the compensation is adjusted using the appropriate data. One approach to accomplishing this involves displaying the original-value and proposed-value fields 132, 136 when each of the following two conditions are satisfied: 1) a primary file actively loaded (e.g., on analyze-data page 70) has a file-reference-number that matches a data-reference-number (a unique numeric string constructed at the beginning of test execution based on the test's major plane, date, and time) associated with the most recent test performed on the machine, and 2) the major plane selected on adjust-comp page 112 is the same as the major plane of the primary file.

According to such an embodiment, the file-reference-number can be extracted from a data file header when the file is loaded. When the file is originally created, the data-reference-number for the test can be copied to the file's header. The existing parametric compensation for the machine plane can also be captured at the beginning of the execution.

In an exemplary embodiment, when the currently loaded primary file is the result of the most recent measurement, and the selected major plane on adjust-comp page 112 corresponds to the plane of the most recent measurement, then fields 132, 136 for original and proposed values for each configuration item are displayed. In one embodiment, the numeric contents of these fields are not modifiable by the user. According to such an embodiment, the original value represents the value for the compensation parameter that was active when the data was collected. It can be copied from the snapshot of configuration that was taken at the beginning of test execution.

Meanwhile, the proposed value can be the value that was determined to be the correct adjustment to compensation. The proposed value can be computed based on the original value and the value for the associated error parameter as estimated from the measurement data. In an exemplary embodiment, adjust-comp page 112 provides the ability to copy the contents of the proposed value fields into the current value fields, to copy the contents of the original value fields to the current value fields, and to clear and disable the compensation for the current value fields. For example, buttons 138, 140, an 142 can be provided that are capable of respectively initiating each of these tasks when selected. In one such embodiment, each of these buttons could perform its operations for the fields on the current sub-page. Three additional buttons (e.g., buttons 144, 146, and 148) that perform these operations on all sub-pages can also be provided.

In addition to the development of the proposed values, the measured data can also be used to determine a measure of statistical significance for each of the proposed compensation parameters. As used herein, significance is a measure of whether an estimated error parameter is "significant" relative to the estimate for that error parameter's variance. Mathematics behind the development of the significance measure are further discussed herein.

Referring back to FIG. 5D, the significance for each of the proposed values can be displayed graphically, such as by a meter 150. In such an embodiment, a value that causes a needle of meter 150 to be high indicates that the proposed change to the compensation parameter is significant, while a value that causes the needle to be low indicates that the proposed change to the compensation parameter is insignificant.

In one embodiment of the present invention, the proposed value for a compensation parameter is determined by adding the (negative of the) latest estimated value for the error parameter to the compensation parameter that was active when the data was collected. Detailed descriptions of how the proposed values for each compensation parameter are developed are further provided herein.

A detailed analysis of the processing involved in an exemplary embodiment of the present invention involving ballbar testing is now provided. As part of the detailed description of the same by way of example, certain aspects of exemplary embodiments disclosed herein may be specific to a particular commercially available ballbar (the QC10 ballbar sold by Renishaw) and a particular motion control system (the A2100). One skilled in the art will, however, appreciate that embodiments of the present invention can be applied to, for example, other devices (including other ballbars) and control systems. In particular, certain of the embodiments to be further described herein relate to application software currently called Ballbar Autotuning for Parametric Compensation (ATB) and currently designed for use with the A2100 control, a detailed description of which will be provided herein as an illustrative example.

As an introductory matter, the QC 10 ballbar outputs its data to a standard RS232 serial port. Certain exemplary embodiments to be discussed herein involve data collection and analysis running entirely within an operating system such as, for example, one currently sold under one of Microsoft Windows trademarks. In some of these embodiments, the real time measurement data from the ballbar is acquired at a constant sample rate and piped into memory accessible through the operating system. In this way, a contiguous data set may be obtained on a non-real time operating system.

Thus, with such an approach, ballbar data is not exactly synchronized to, for example, the real time internal data of the control. The type of analysis performed by certain embodiments of an exemplary embodiment as disclosed herein does not require synchronization of the ballbar data and internal control data. However, other embodiments of auto tuning might involve such synchronization.

With respect to the analysis of measured data in an exemplary embodiment of the present invention, the raw measurement data can undergo significant processing. For example, raw data can first be corrected for offsets between the center of rotation of the ballbar and the center of the circle. The circularity-error (a measure of the combined effect of all errors) can be extracted from the center-corrected data.

Next, estimates for the error parameters can be extracted from the data. During the parameter estimation, the coherence of the data can be determined. Once estimates for error parameters are obtained, individual effects of each error can be determined and the effect of the error may be removed from the data in response to, for example, user manipulation of the checkboxes of diagnostics window 102. Similarly, the relative impact of each error type on the overall circularity may be assessed.

Much of the data analysis involved in this specific example employs "curve-fitting" methods to extract parameters from the raw data. As used herein, the term "curve fitting" describes a process where the measured data is used to determine the parameters for a mathematical model of an assumed structure or framework. Ideally, curve fitting determines the values for the set of parameters in the mathematical model that have the maximum likelihood of having created the measured data.

For the parametric machine errors detected by an exemplary embodiment of the present invention, the curve fitting process involves a least-squares optimization. A least squares estimator can be a maximum likelihood estimator if each measurement error is normally distributed and each measurement error has the same variance. This might be untrue for the present case, but the least squares estimator can be used anyway because it tends to provide a decent result and there is no readily available alternative given the available a-priori information about the data. A relatively straightforward linear least-squares approach may be employed because the assumed structure of the radial error involves a linear combination in the model parameters.

A linear least squares formulation can be based on an overdetermined system where a linear combination of basis functions scaled by the model parameters yields the measurement. In this specific case, the basis functions can be functions of the (constant) nominal circle radius and the (varying) circle angle. The measurement can be a function of the radius measurements. The formulation may be written in matrix form as follows, where $\{P\}$ is the m-element parameter vector, $\{f(r(t))\}$ is the n element vector where each element is a function of measured ballbar radius at time t, and $[A(R,\theta(t))]$ is the n x m matrix whose columns are basis functions developed from the circle angle and nominal circle radius.

$$\{f(r(t))\} = [A(R,\theta(t))]\{P\} \qquad (1)$$

If n>m, Equation (1) represents an overdetermined system where there are more knowns than unknowns. This equation can be solved using the least squares technique which minimizes the sum of the squares of the errors between the modeled f(r) and the measured f(r).

$$\Sigma e^2 = \{[A]\{P\} - f(r)\}^T \cdot \{[A]\{P\} - f(r)\} \qquad (2)$$

The solution for the parameter vector $\{P\}$ that minimizes this quantity includes the least squares solution and can be written using the so-called normal equations.

$$\{P\} = [[A]^T[A]]^{-1}[A]^T \cdot \{f(r)\} \qquad (3)$$

The solution involves inversion of the matrix $[[A]^T[A]]$. This matrix has the properties of being real, symmetric, and positive-definite. These properties can be taken advantage of when finding a technique for inverting the matrix. The matrix inverse can be computed using Jacobi's method for finding the eigenvalues and eigenvectors of a real symmetric positive definite matrix.

Briefly stated, Jacobi's method involves successively applying rotation transformations to portions of the matrix until it is diagonalized. A fill explanation of Jacobi's method is given in "Numerical Recipes in C" by Press, Flannery, Teukolsy and Vettering, which is hereby incorporated herein by reference. The Jacobi technique should work as long as the matrix is invertible. Another advantage of using Jacobi's technique for solving the normal equations is that it provides the eigenvalues of $[A]^T[A]$. These eigenvalues can be used to determine the condition number of the matrix [A]—a factor related to the excitation provided by the axis motion.

The topics that follow related to the development of the equations that describe the effects of each parametric machine error on a ballbar radius measurement. Each of these equations can be combined into an individual overdetermined system formulation in such a way that the error parameters are estimated simultaneously. This approach minimizes possibility of incorrectly attributing measurement aspects to the wrong error type.

The equations can be developed in such a way to enable a description of the effect of each error type in terms of the measured ballbar radius. The following equations are developed for the case of the X-Y plane. These results are equally applicable to the XZ and YZ planes. The x and y designators used in this development may be interpreted to mean the horizontal and vertical axes of the circle-plane rather than the machine tool axes.

It is often the case that the circle center is not coincident with the center ball of the ballbar base fixture. These differences can occur if the center ball shifts when the set screw is tightened, if the servo offsets drift with time, the axis has a significant straightness error (discussed later), or any number of other reasons. In order to properly analyze the measurement, the effect of center offset can be considered along with other parametric error effects.

In an exemplary embodiment, center offset is not considered to be a machine error; it is considered to be an error associated with measurement. The formulation of the least squares equations for determining center offset can be developed by considering the equations for the length of the vector from the centering fixture location to a point on the ideal circle as a function of circle angle. The situation can be depicted graphically as shown in FIG. 6A. A polar error plot for the ballbar measurement with a center offset error contains a "kidney bean" signature of the type shown in FIG. 6B.

Examination of FIG. 6A leads to the development of the following equation for the measured radius r as a function of the circle angle $\theta$, where R is the average circle radius that may differ from the programmed radius if the axes have scaling errors (discussed later).

$$(R\cos(\theta) - E_{CTR\_X})^2 + (R\sin(\theta) - E_{CTR\_Y})^2 = (r(\theta))^2 \qquad (4)$$

The equation can be expanded to the following form.

$$R^2 - 2RE_{CTR\_X}\cos(\theta) - 2RE_{CTR\_Y}\sin(\theta) + E_{CTR\_X}^2 + E_{CTR\_Y}^2 = (r(\theta))^2 \qquad (5)$$

For the case of multiple measurements, the previous equation can be represented in the matrix form to accommodate the least squares solution.

$$\begin{bmatrix} -2\cos(\theta(t_1)) & -2\sin(\theta(t_1)) & 1 \\ -2\cos(\theta(t_2)) & -2\sin(\theta(t_2)) & 1 \\ \vdots & \vdots & \vdots \\ -2\cos(\theta(t_n)) & -2\sin(\theta(t_n)) & 1 \end{bmatrix} \begin{Bmatrix} RE_{CTR\_X} \\ RE_{CTR\_Y} \\ R^2 + E_{CTR\_X}^2 + E_{CTR\_Y}^2 \end{Bmatrix} = \qquad (6)$$

-continued $$\begin{pmatrix} (r(t_1))^2 \\ (r(t_2))^2 \\ \vdots \\ (r(t_n))^2 \end{pmatrix}$$

The previous equation may be "solved" using equation (3) to obtain the parameter vector where the matrix to the left is [A], the 3×1 vector is P and the n×1 vector is f(r). The equation used to determine the circle center offsets also provides an average circle radius R. Three desired parameters, R, $E_{CTR\_X}$, and $E_{CTR\_Y}$ may be extracted from the vector P by an iterative technique.

A first approximation of setting the quantity $E_{CTR\_X}^2 + E_{CTR\_Y}^2$ to be zero allows the parameters for the first iteration to be extracted directly. Typically, the center offset is very small relative to the circle radius and iterations are not needed. However, for the sake of robustness, an iterative algorithm can be made available in case it is needed. The iterative algorithm described below converges to the correct result as long as the ballbar center is inside the circle.

$P = [A^T A]^{-1} A^T r^2$ $R_{est} = (P_3)^{0.5}$, $R_{est\_prev} = 0$ $E_{CTR\_X} = P_1/R_{est}$, $E_{CTR\_Y} = P_2/R_{est}$ Do Forever $R_{est} = (P_3 - (E_{CTR\_X})^2 - (E_{CTR\_Y})^2)^{0.5}$ If $|R_{est} - R_{est\_prev}| > 0.01\ \mu$, Then, Break $E_{CTR\_X} = P_1/R_{est}$, $E_{CTR\_Y} = P_2/R_{est}$ $R_{est\_prev} = R_{est}$;

Continue

Once the values for the circle center offsets are known, they can be used in manipulation of the raw ballbar radius data $r_{raw}$ to remove the effects of center offsets from the data. The center offset effects can be removed when computing the circularity statistic. An approximate equation for removing the effects of the center offsets can be obtained by examination of FIG. 6 and making the assumption that the angle of the ballbar relative to the horizontal axis is the same as the circle angle.

$$r_{ctr\_adj}(\theta) = \sqrt{(r_{raw}(\theta) \cdot \cos(\theta) + E_{CTR\_X})^2 + (r_{raw}(\theta) \cdot \sin(\theta) + E_{CTR\_Y})^2} \quad (7)$$

Figure 6:
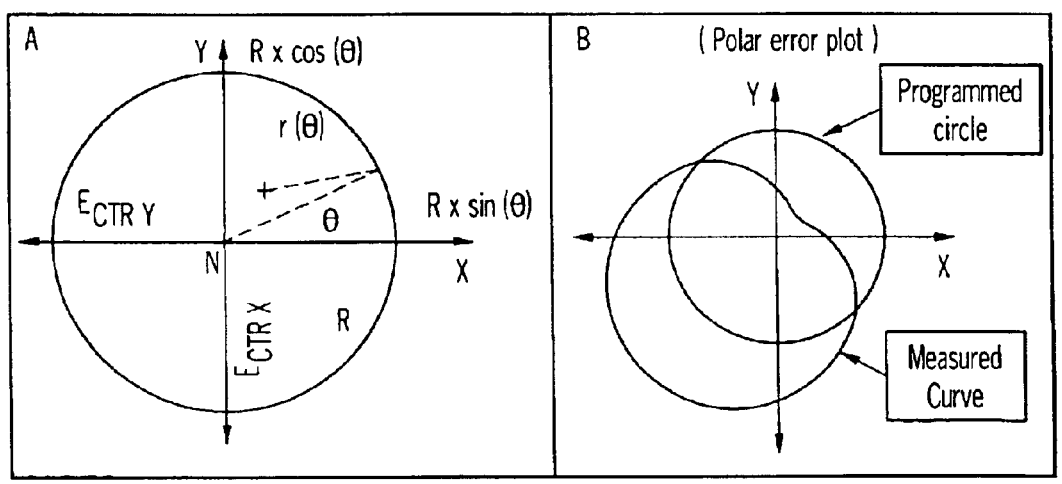
FIGS. 6A and 6B are plots illustrating formulation of circle center error and the polar error plot signature resulting from a circle center error.

An equation for adjusting the measured radius for center offsets can be obtained by examining FIG. 6 and employing the law of cosines where the $x_{ce}$ and $y_{ce}$ designate the estimates for center offsets $E_{CTR\_X}$, $E_{CTR\_Y}$.

$$[r_{ctr\_adj}(\theta)]^2 - (2\sqrt{x_{ce}^2 + y_{ce}^2} \cos(\tan^{-1}(y_{ce}, x_{ce}) - \theta)) \cdot [r_{ctr\_adj}(\theta)] + (x_{ce}^2 + y_{ce}^2 - r_{raw}^2(\theta)) \quad (8)$$

A solution for the center-adjusted radius is the positive root of the previous quadratic equation. The roots should be real as long as the center is inside of the circle. The circularity-error or circularity is a measure of the maximum deviation of the out-of-roundness of the circle. It can be defined as the maximum center-adjusted radius minus the minimum center adjusted radius.

$$\text{circularity} = \max(r_{ctr\_adj}(\theta)) - \min(r_{ctr\_adj}(\theta)) \quad (9)$$

In an exemplary embodiment, the computed circularity from the measurement is displayed. The circularity for data that has been mathematically manipulated in such a way that the effects of a combination of user-selected parametric errors can be removed can also be computed and/or displayed.

The most common machine tool design involves an arrangement where linear motion within a plane is effected by coordinating the motion of two individual linear displacement actuator mechanisms (axes) that are perpendicular to each other, i.e., the axes are square. The machine tool manufacturing process may result in a squareness error where the axes are not precisely perpendicular to each other as is intended. This deviation from perpendicularity is known as the squareness error or simply squareness.

Figure 7:
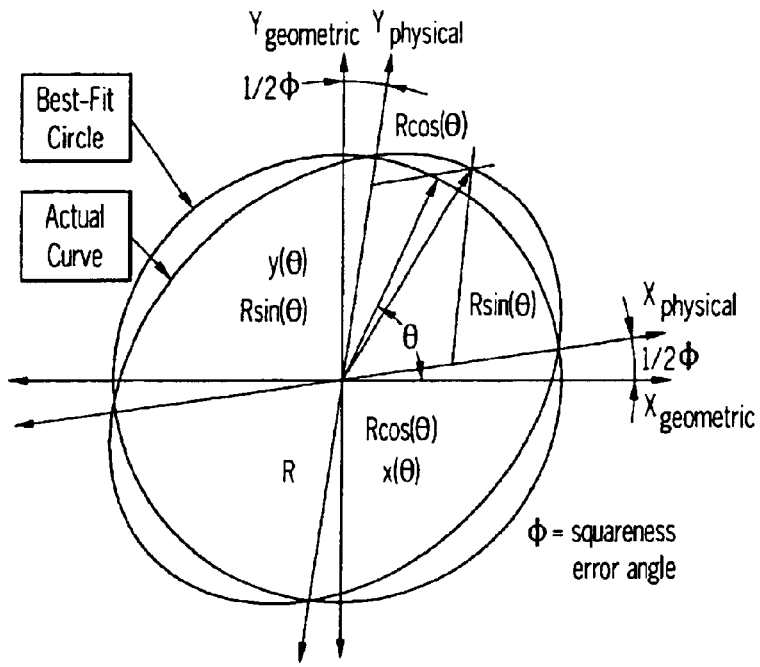
FIG. 7 is a plot illustrating an effect of squareness error on radius.

The squareness error describes a relationship between the two axes in the plane with one squareness error per major plane. Individual proposed values for squareness compensation for each axis in the plane can also be developed by equally distributing the total squareness compensation among the two axes. The equation for the effect of a squareness error on the circle radius can be developed based on FIG. 7.

The coordinates of a point on the actual (non-circular) curve as a function of circle angle θ can be described by the following equations where R is the average radius which may differ from the programmed radius if the machine also has a scale error.

$$x(\theta) = R\cos(\theta) + R\sin(\theta)\sin(\tfrac{1}{2}\phi) - R\cos(\theta)\sin(\tfrac{1}{2}\phi) \quad (10)$$

$$y(\theta) = R\sin(\theta) + R\cos(\theta)\sin(\tfrac{1}{2}\phi) - R\sin(\theta)\sin(\tfrac{1}{2}\phi) \quad (11)$$

In these equations, the final terms on the right that involve the quantity $\sin(\tfrac{1}{2}\phi)\tan(\tfrac{1}{2}\phi)$ are insignificantly small for small values of $\phi$. This is a valid assumption for the amplitude of squareness errors found on most machine tools. The ballbar radius as a function of circle angle is the desired result and can be developed by computing the sum of the squares of the x and y components of the point on the curve and employing the aforementioned simplifying assumption.

$$r^2(\theta) = x^2(\theta) + y^2(\theta) \quad (12)$$

$$r^2(\theta) = R^2(\cos^2(\theta) + \sin^2(\theta))(1 + \sin^2(\tfrac{1}{2}\phi)) + 2R^2\sin(\theta)\cos(\theta)\sin(\tfrac{1}{2}\phi) \quad (13)$$

For small $\phi$, the term $\sin^2(\tfrac{1}{2}\phi)$ becomes insignificant and the previous equation may be simplified to the following $$r^2(\theta) R^2(1 + 2\sin(\theta)\cos(\theta)\sin(\tfrac{1}{2}\phi)) \quad (14)$$

The parameter that describes the squareness error in the X-Y plane can be defined as the unitless proportionality factor $\sin(\tfrac{1}{2}\phi)$. Analogous parameters can be obtained for the X-Z and Y-Z planes.

$$E_{SQR\_XY} = \sin(\tfrac{1}{2}\phi) \quad (15)$$

The following matrix equation is for an overdetermined system of equations represented as a linear combination of terms in the squareness parameter.

$$\begin{pmatrix} (r(t_1))^2 \\ (r(t_2))^2 \\ \vdots \\ (r(t_n))^2 \end{pmatrix} = \begin{bmatrix} 2\sin(\theta(t_1))\cos(\theta(t_1)) & 1 \\ 2\sin(\theta(t_2))\cos(\theta(t_2)) & 1 \\ \vdots & \vdots \\ 2\sin(\theta(t_n))\cos(\theta(t_n)) & 1 \end{bmatrix} \begin{Bmatrix} R^2 E_{SQR} \\ R^2 \end{Bmatrix} \quad (16)$$

The axis squareness error is most often described as the perpendicular deviation in units of parts-per-million or equivalently microns/meter or inches/mil. This is the way the squareness compensation is represented and the way the squareness error can be displayed, such as on a screen. The conversion from the unitless squareness parameter to parts-per-million squareness can be obtained by multiplying the unitless parameter by 1 million.

$$\text{squareness} = 1{,}000{,}000 \cdot E_{SQR} \ (\mu/m) \quad (17)$$

A conventional linear motion machine tool axis includes an accurate feedback measurement to move to the correct position. Axis scale errors can be created by an inaccurate feedback mechanism or an inaccurate parameter for converting a feedback measurement from, for example, a rotary device to linear displacement. One common linear axis mechanism involves a rotary motor that drives a ballscrew. A ball-nut converts the rotary motion to linear motion. The axis position may be estimated by measuring the motor angle and computing the axis position based on an assumed value for screw pitch. Alternatively, the axis position may be measured using a linear displacement sensor such as a glass scale, for example.

In the first case, differences between the assumed and actual pitch of the ballscrew can cause the axis to travel an incorrect distance due to this pitch error. In the second case, errors in the scale itself, due to factors such as thermal growth, for example, can cause the axis to travel to an incorrect position due to the scale error. Pitch error and scale error can cause an axis to travel a distance that is different than desired.

This type of error also appears on other axis mechanisms, such as rack-and-pinion and linear motor driven axes. The fundamental type of error experienced with these types of mechanisms is a position error that is linearly proportional to the distance traveled. The constant of proportionality may be represented using units such as parts-per-million (equivalent to microns/meter or mils/inch).

Figure 8:
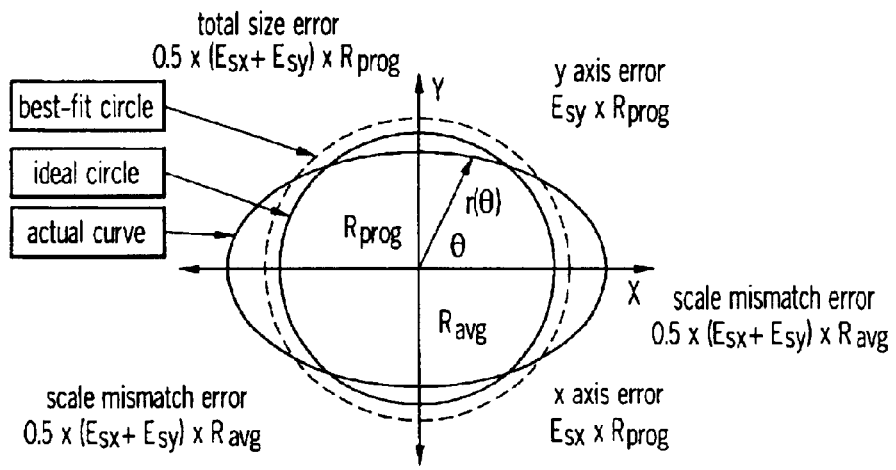
FIG. 8 is a plot illustrating effects of axis scale errors.

Effects of axis linear-scale-errors on circular motion in a plane are shown in FIG. 8. The figure shows the actual circle (not a polar error plot) for a case where the scale errors are very large relative to the radius. The figure shows how the two scale errors from each axis act together to create two effects: 1) a relative scale mismatch between the axes that causes the circle to be stretched or compressed in a direction parallel to the axis, and 2) an overall enlargement or reduction in the average (best-fit) radius of the (distorted) circle. The specific example shown in FIG. 8 is for a case where the scale error on the X axis is positive (the axis moves further than desired) and the scale error on the Y axis is negative (the axis moves a smaller distance than is desired). Since the (positive) X axis scale error is larger than the (negative) Y axis error, the average circle radius (best-fit-circle) is larger than the ideal circle radius.

The equations for the effect of each scaling error on the measured circle radius can be developed by first considering the x and y axes separately.

$$x(\theta) = R_{prog} \cos(\theta)(1 + E_{SCL\_X}), \ y(\theta) = R_{prog} \sin(\theta)(1 + E_{SCL\_Y}) \quad (18)$$

The square of the instantaneous radius is the sum of the squares of the x and y vector components. With the (valid) assumption that the square of the error parameters are insignificant, the following relation can be obtained.

$$r^2(\theta) = R_{prog}^2 + 2R_{prog}^2 E_{SCL\_X} \cos^2(\theta) + 2R_{prog}^2 E_{SCL\_Y} \sin^2(\theta) \quad (19)$$

The above equation can be reconstructed as a n×2 matrix equation. This can be done if the ballbar is length calibrated such that the difference between $r^2(\theta)$ and $R_{prog}$ is meaningful.

In an exemplary embodiment, differences between x and y scaling errors are accounted for even if the ballbar is not length-calibrated. One approach involves transforming the individual X and Y scale errors into a scale mismatch error and an average radius. If the ballbar is not length-calibrated, then the estimate for average radius can be discarded. If the ballbar is length-calibrated, then the estimate for average radius can be used to extract the individual axis scaling errors from the scale mismatch error. The parameters in the new formulation have the following definitions:

$$E_{SCL\_XY} = \frac{E_{SCL\_X} - E_{SCL\_Y}}{2}, \quad (20)$$

$$R_{avg} = R_{prog}\left(1 + \frac{E_{SCL\_X} + E_{SCL\_Y}}{2}\right)$$

If the scaling error is small enough to make the square of the error terms insignificant, then the following equations for the x and y locations on the curve may be used. These equations assume that the circle is stretched in the x-direction; if the circle is actually stretched in the y-direction, then the scale mismatch parameter $E_{Smismatch}$ will be a negative number.

$$x(\theta) = R_{avg} \cos(\theta)(1 + E_{SCL\_XY}), \ y(\theta) = R_{avg} \sin(\theta)(1 - E_{SCL\_XY}) \quad (21)$$

The sum of each component squared in the previous equation yields the expression for the instantaneous ballbar radius (where the error term squared can be once again ignored).

$$r^2(\theta) = R_{avg}^2 + 2R_{avg}^2(\cos^2(\theta) - \sin^2(\theta))E_{SCL\_XY} \quad (22)$$

The previous equation can be represented in the following matrix form for measurements at corresponding times.

$$\begin{pmatrix} (r(t_1))^2 \\ (r(t_2))^2 \\ \vdots \\ (r(t_n))^2 \end{pmatrix} = \begin{bmatrix} 2(\cos^2(\theta(t_1)) - \sin^2(\theta(t_1))) & 1 \\ 2(\cos^2(\theta(t_2)) - \sin^2(\theta(t_2))) & 1 \\ \vdots & \vdots \\ 2(\cos^2(\theta(t_n)) - \sin^2(\theta(t_n))) & 1 \end{bmatrix} \begin{Bmatrix} R_{avg}^2 E_{SCL\_XY} \\ R_{avg}^2 \end{Bmatrix} \quad (23)$$

If the ballbar is not length calibrated, then the estimate for $R_{avg}$ is meaningless and the individual axis scale errors cannot be extracted from the scale mismatch errors. In this case, values for the individual axes' scale errors can be computed by assuming that each axis contributes equally toward the observed scale mismatch.

$$E_{SCL\_X} = E_{SCL\_XY}, \ E_{SCL\_Y} = -E_{SCL\_XY} \quad (24)$$

If the ballbar is length calibrated, then the individual axis scale errors may be extracted using the following equations.

$$E_{SCL\_X} = \frac{R_{avg}}{R_{prog}} - 1 + E_{SCL\_XY}, \quad (25)$$

$$E_{SCL\_Y} = \frac{R_{avg}}{R_{prog}} - 1 - E_{SCL\_XY}$$

The individual axis scale errors and the scale mismatch errors in the previous equation are unitless factors of proportionality. It is common, however, to represent these factors in parts-per-million units, also described as microns/meter or mils/inch. The conversion of a scale error ($E_{SCL\_X}$, $E_{SCL\_Y}$, $E_{SCL\_XY}$) from a unitless factor to a parts-per-million factor can be simply a matter of multiplying the scale error term by a factor of $10^6$.

In the preceding discussions, it has been assumed that an axis' linear scale error is the phenomenon that can cause the average circle radius to differ from the ideal radius. The other parametric error types considered do not appear to affect the average circle radius. Specifically, the average circle radius does not appear to be affected by squareness errors, straightness errors, lost-motion errors, and servo mismatch errors.

There is, however, one phenomenon in addition to scale errors that does appear to affect the average circle radius. The dynamic characteristics of a position controller can result in amplitude attenuation (or amplification) that varies according to circle radius and feedrate. Position controllers have a low-pass frequency characteristic, and some may exhibit amplification at certain frequencies. Since the circle frequency is the per-second-feedrate divided by the radius, the frequency increases with increases in feedrate or reductions in nominal radius. For cases where the ballbar is length calibrated, an adjustment can be made to the estimate of average radius to account for the expected behavior of the position loop's dynamic response.

The expected behavior of the position loop response can be based on a number of approximating assumptions. The assumptions are expected to be reasonable for circle frequencies that are below the cutoff frequency of the position loop. Even the highest feedrate ballbar tests are expected to correspond to frequencies that are within the bandwidth of the axes for even the lowest gain controllers. For example, an axis with a Kv gain of 1.0 and no feedforward has a cutoff frequency of approximately 2.7 Hertz; for a circle radius equal to the minimum ballbar length of 100 mm, the feedrate associated with the cutoff frequency is 100,000 mm/min—a value beyond the capability of most machines and higher than what would typically be used during a ballbar test. The assumptions about the dynamic response of the axes can be as follows:

1. Both axes that actuate motion in the circle plane have identical values for Kv and VFF.
2. Both axes have identical amplitude response up to the cutoff frequency.
3. The effective Kv is identical to the nominal Kv adjusted by the $Kv_{adjust}$.
4. The axis dynamics are approximated as a continuous time system with an infinite bandwidth velocity loop.

Figure 9:
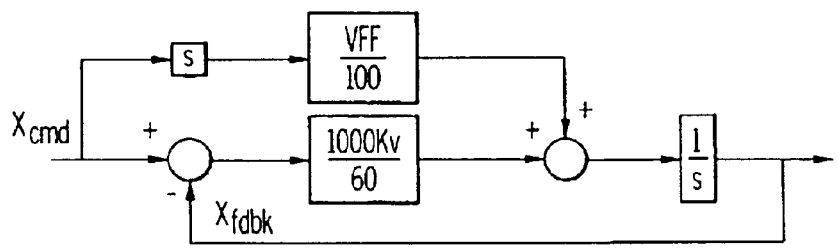
FIG. 9 is a block diagram illustrating assumed axis position loop dynamics for estimating radius distortion as influenced by position loop band width according to an exemplary embodiment of the present invention.

Based on these assumptions, the effect of axis dynamic response on the average radius can be developed from the system shown in FIG. 9. A transfer function of this simplified model for a position controller is shown below.

$$\frac{x_{fdbk}}{x_{cmd}}(s) = \frac{\left(\frac{VFF}{100}\right)s + \left(\frac{1000Kv}{60}\right)}{s + \left(\frac{1000Kv}{60}\right)} \tag{26}$$

The amplitude scaling for a sinusoidal input of angular frequency ω can be determined by evaluating the magnitude of the transfer function at s=jω.

$$\left\|\frac{x_{fdbk}}{x_{cmd}}(s=j\omega)\right\| = \sqrt{\frac{\left(\frac{VFF_X}{100}\right)^2 \omega^2 + \left(\frac{1000Kv_X}{60}\right)^2}{\omega^2 + \left(\frac{1000Kv_X}{60}\right)^2}} \tag{27}$$

For a constant feedrate circular move, the axis motion can be sinusoidal where ω=Feedrate/(60R). Since both axes are assumed to have identical responses, the radius amplitude scaling is identical to the axis amplitude scaling. Performing the substitution for ω, yields the final result for the radius scaling due to the position loop dynamic response.

$$R_{avg\_dyn} = R_{prog} \cdot \sqrt{\frac{\left(\frac{VFF}{100}\right)^2 \left(\frac{Feedrate}{R_{prog}}\right)^2 + \left(\frac{1000Kv}{60}\right)^2}{\left(\frac{Feedrate}{R_{prog}}\right)^2 + \left(\frac{1000Kv}{60}\right)^2}} \tag{28}$$

The dynamic response can be factored into the estimate of the axis scale errors by measuring the overall scaling relative to the expected radius, given the programmed circle radius and the model for dynamic response.

$$E_{SCL\_X} = \frac{R_{avg}}{R_{prog}} \sqrt{\frac{\left(\frac{Feedrate}{R_{prog}}\right)^2 + (1000Kv)^2}{\left(\frac{VFF}{100}\right)^2 \left(\frac{Feedrate}{R_{prog}}\right)^2 + (1000Kv)^2}} - 1 + E_{SCL\_XY} \tag{29}$$

$$E_{SCL\_Y} = \frac{R_{avg}}{R_{prog}} \sqrt{\frac{\left(\frac{Feedrate}{R_{prog}}\right)^2 + (1000Kv)^2}{\left(\frac{VFF}{100}\right)^2 \left(\frac{Feedrate}{R_{prog}}\right)^2 + (1000Kv)^2}} - 1 - E_{SCL\_XY} \tag{30}$$

An axis straightness error is a linear displacement error in a direction perpendicular to the axis containing the straightness error. Straightness errors can be treated in a similar way as squareness errors such that the linear displacement errors that have a direction that is parallel to the direction of one of the machine's linear axes (e.g., x, y, and z) are considered. In other words, the straightness errors can be considered for one machine major-plane at a time.

Straightness errors can be distinguished from squareness errors in that the relationship between the error in the direction of the perpendicular-axis relative to the position of the axis containing the error is non-linear. In the present discussion, the non-linear relationship is restricted to the case of a symmetric parabolic curve where the axis of symmetry passes through the location of the center of the circle in the ballbar test. The assumed structure for the straightness error of the X axis in the direction of the Y axis can be defined by the following equation, where the deviation caused by straightness errors is ΔY, $X_0$ is the x coordinate of the center of the test circle, and $E_{STR\_X\_Y}$ is the X-axis straightness error factor for the Y directed component of straightness error.

$$\Delta y_{STR}(x) = E_{STR\_X\_Y}(x-x_0)^2 \tag{31}$$

The assumption that a straightness error is reasonably approximated by a parabolic curve can be based on experience with machine tools that has shown that axis guideways often have a fundamental straightness error that involves a bowing shape. Limiting the straightness error to include the fundamental component prevents the analysis from accounting for errors where the guideway has multiple bows or wiggles. Straightness errors that are more complex than a fundamental component can be handled using a data-based approach, such as developing tables based on laser measurements and employing the cross-axis error compensation.

The assumption that the parabola is symmetric about a line parallel to the perpendicular axis can be a reasonable one because the squareness error should account for the presence of any linear trend. The assumption that the parabola's axis of symmetry passes though the center of the test circle $x_o$ is not based on any physical insight about the machine, since the location of the circle center is arbitrary and may change from test to test. This restriction can be included because it greatly simplifies the analysis, enabling the error parameters to be estimated from a single evaluation of the least-squares normal equations. This restriction does not limit the ability to identify error sources within the range of the ballbar test because an expansion of equation (31), shown below in equation (32), reveals that the choice of $x_0$ may be arbitrary since it is a factor in: 1) the linear trend accounted for by the estimate for squareness error and 2) a y-component of center offset accounted for by the estimate of center offset error.

$$E_{STR\_X\_Y}(x-x_0)^2 = (E_{STR\_X\_Y}) \cdot x^2 - (2E_{STR\_X\_Y} x_0) \cdot x + (E_{STR\_X\_Y} x_0^2) \quad (32)$$

The choice for $x_0$ may be arbitrary in the sense that the least squares approach should provide an optimal result by providing an estimate for squareness and y-center offset that accommodates the particular choice of $x_0$ for straightness. However, the arbitrary choice for $x_0$ makes extrapolation of the error model outside the range of the test invalid. Application of compensation based on the estimate to locations outside of the range of the test can easily cause larger errors to occur in these regions than those that might have occurred without any compensation.

The presence of the linear trend constant terms in equation (32) implies estimating the squareness error and center offset errors at the same time as the straightness error. Accordingly, in an exemplary embodiment, the center correction is not applied to the raw data prior to performing the diagnostics. This can be potentially important for data arcs that cover less than 360 degrees.

Figure 10:
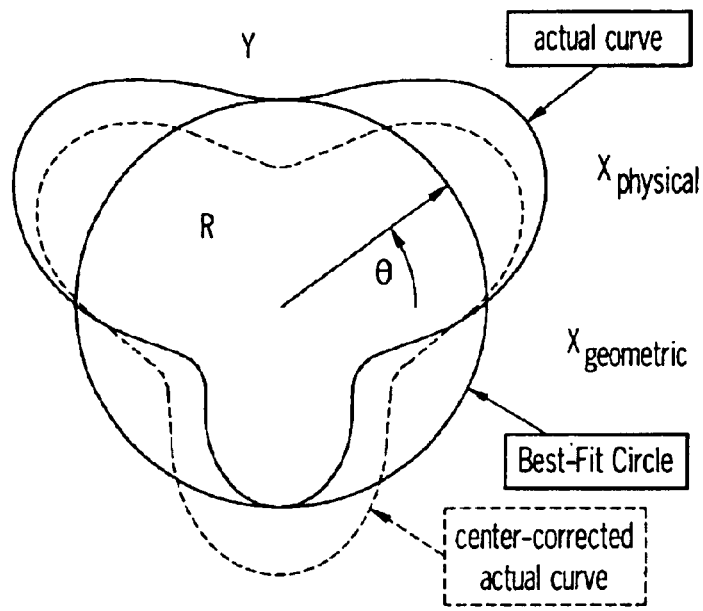
FIG. 10 is a polar error plot illustrating an effect of a parabolic straightness error.

An example of a situation in the X-Y plane where the Y-axis has no straightness-error and the X-axis has a straightness error that complies with the assumptions is shown in FIG. 10. The plot shows how a straightness error might affect the shape of a curve on a polar error plot with a high degree of amplification. The equation for the distorted curve can be developed by applying the error from equation (31) to the equation for a circle where R is the actual best-fit circle radius that may differ from the nominal radius due to a scale error.

$$x = R \cdot \cos(\theta), \; y = R \cdot \sin(\theta) + E_{STR\_X\_Y} \cdot (R \cdot \cos(\theta))^2 \quad (33)$$

The square of the radius is the sum of the squares of the x and y coordinates of the curve. If terms involving the square of the straightness coefficient are ignored by assuming that the straightness error is small, then the following equation for circle radius as a function of angle can be derived.

$$r^2(\theta) = R^2 + 2E_{STR\_X\_Y} R^3 \sin(\theta)\cos^2(\theta) \quad (34)$$

An analogous equation for the impact of a Y-axis straightness error on the instantaneous circle radius may be derived in a similar manner. An equation for the effect of the Y-axis straightness error $E_{STR\_Y\_X}$ is shown below.

$$r^2(\theta) = R^2 + 2E_{STR\_Y\_X} R^3 \cos(\theta)\sin^2(\theta) \quad (35)$$

The combined effect of both planar straightness errors is shown below with the equations written for multiple measurements in matrix form.

$$\begin{Bmatrix} \langle r(t_1) \rangle \\ \langle r(t_2) \rangle \\ \vdots \\ \langle r(t_n) \rangle \end{Bmatrix} = \begin{bmatrix} 2\sin(\theta(t_1))\cos^2(\theta(t_1)) & 2\cos(\theta(t_1))\sin^2(\theta(t_1)) & 1 \\ 2\sin(\theta(t_2))\cos^2(\theta(t_2)) & 2\cos(\theta(t_2))\sin^2(\theta(t_2)) & 1 \\ \vdots & \vdots & \vdots \\ 2\sin(\theta(t_n))\cos^2(\theta(t_n)) & 2\cos(\theta(t_n))\sin^2(\theta(t_n)) & 1 \end{bmatrix} \cdot \begin{Bmatrix} R^3 E_{STR\_X\_Y} \\ R^3 E_{STR\_Y\_X} \\ R^2 \end{Bmatrix} \quad (36)$$

As mentioned previously, the estimation of straightness errors can be performed simultaneously with the estimation of squareness and center offset; thus, in an exemplary embodiment, the previous matrix equation is not used directly. A global matrix equation that simultaneously estimates the parameters is further provided herein.

A servo mismatch error is an error created due to a difference in the dynamic response between the two axes of the circle plane. The dominant effect of servo mismatch is a phase mismatch. A previous discussion herein described how the amplitude response of an axis is expected to be flat beyond the highest conceivable circle frequency, even for low Kv gains. This means that the Kv gains may be mismatched without creating a mismatch in the amplitude response.

However, this is not the case for the phase response which, for a position loop without feedforward, begins to roll off immediately. For any given circle-frequency, i.e., feedrate/radius, the phase difference between the sinusoids for the x and y axes is desired to be 90 degrees, but may differ from this ideal amount by some constant deviation. The constant deviation should vary with circle frequency, and, in most cases, the deviation is more likely to be significant as the circle frequency is increased (but the relationship is not necessarily monotonic).

The phase deviation can be caused by mismatches in the effective position loop gain, velocity loop response, or both. It is not conventionally possible to diagnose the source of the phase mismatch with a single ballbar measurement—which can be accomplished by performing frequency response measurements for each axis individually. Even though no attempt to propose a compensation for an observed servo mismatch error is made, a servo-mismatch error can be computed because it informs the user that such an error is present, prevents servo mismatch errors from being falsely attributed to other error types, and allows the user to gauge the servo-mismatch error's impact on the circularity and to predict the improvement that might be accomplished if the error were removed.

The combined phase error between the two axes during a constant feedrate circle may be represented by the following equation where the total phase error $\phi$ is equally divided among the two axes by assuming a half $\phi$ lead on the X axis and a half $\phi$ lag on the Y-axis. For a counter-clockwise move, the circle angle $\theta$ increases with time (i.e., the frequency $d\theta/dt = \omega$ is positive). For clockwise moves, the reverse is true—the frequency is negative. Equations for these two cases can be shown below.

$$X_{CCW}(t) = R \cdot \cos\left(\omega t + \frac{1}{2}\phi(|\omega|)\right), \quad (37)$$

$$Y_{CCW}(t) = R \cdot \sin\left(\omega t - \frac{1}{2}\phi(|\omega|)\right)$$

-continued $$X_{CLW}(t) = R \cdot \cos\left(-\omega t + \frac{1}{2}\phi(|\omega|)\right), \quad (38)$$

$$Y_{CLW}(t) = R \cdot \sin\left(-\omega t - \frac{1}{2}\phi(|\omega|)\right)$$

In these equations, ω is the per-second feedrate divided by the programmed radius and, as mentioned, φ is expected to be constant for a given fixed value of |ω|. The analysis will proceed first for the counter-clockwise (positive-frequency) case. The results for the clockwise case can be derived in an analogous manner. The square of the radius for the counter-clockwise case is the sum of the squares of the axis locations. In the following equation, the term ωt is replaced by the circle angle θ.

$$r^2_{CCW}(\theta) = R^2 \cdot \left(\cos^2\left(\theta + \frac{1}{2}\phi(|\omega|)\right) + \sin^2\left(\theta - \frac{1}{2}\phi(|\omega|)\right)\right) \quad (39)$$

The previous equation can be simplified by employing some trigonometric identities to the following form.

$$r_{CCW}{}^2(\theta) = R^2 + R^2 \cdot 2 \sin(\theta)\cos(\theta)\sin(\phi) \quad (40)$$

Now returning to the clockwise case, the equation (38) can be reformulated by changing the sign of the arguments of the sine and cosine functions.

$$X_{CLW}(t) = R \cdot \cos\left(\omega t - \frac{1}{2}\phi(|\omega|)\right), \quad (41)$$

$$Y_{CLW}(t) = -R \cdot \sin\left(\omega t + \frac{1}{2}\phi(|\omega|)\right)$$

These equations can be used to obtain the following result for the instantaneous radius of the clockwise circle.

$$r_{CLW}{}^2(\theta) = R^2 - R^2 \cdot 2 \sin(\theta)\cos(\theta)\sin(\phi) \quad (42)$$

Figure 11:
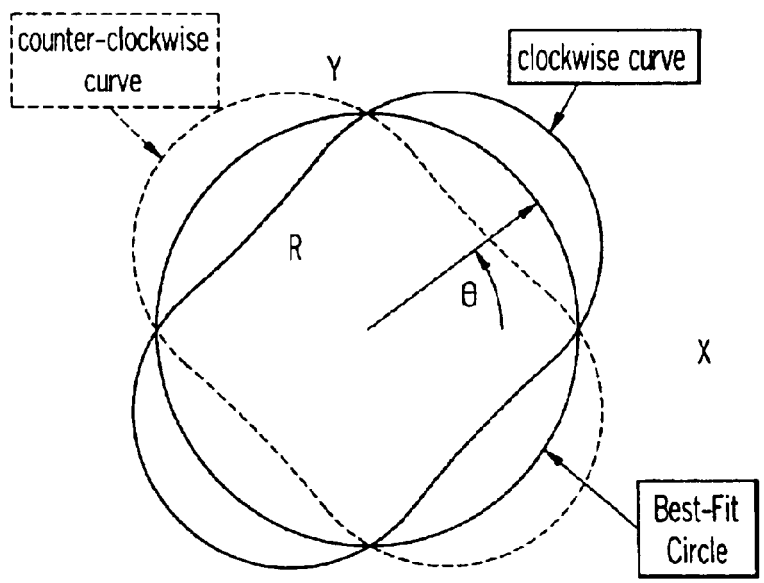
FIG. 11 is a plot illustrating an effect of servo (phase) mismatch errors.

The impact of a servo mismatch error on a polar error plot is shown in FIG. 11.

Comparison of equations (40) and (42) to equation (14) indicates that the formulation for servo mismatch error can be the same as the formulation for squareness error. This means that the two errors can be indistinguishable unless data for both clockwise and counterclockwise measurements are present in the matrix formulation. Thus, in an exemplary ballbar test, each measurement contains both a clockwise and counter-clockwise run, and for the sake of equal weighting, both runs cover the same data-range. This can be accomplished by "stacking" the matrix with rows developed from the counter-clockwise measurement on top of rows developed from the clockwise measurement. In the following equation, the superscripts clw and ccw on the i'th measurement indicator $t_i$ are used to identify whether a measurement is from a clockwise or counter-clockwise test.

$$\begin{Bmatrix} r^2(t_1^{ccw}) \\ r^2(t_2^{ccw}) \\ \vdots \\ r^2(t_n^{ccw}) \\ \cdots \\ r^2(t_1^{clw}) \\ r^2(t_2^{clw}) \\ \vdots \\ r^2(t_n^{clw}) \end{Bmatrix} = \begin{Bmatrix} 2\sin\theta(t_1^{ccw}) \cdot \cos\theta(t_1^{ccw}) & 1 \\ 2\sin\theta(t_2^{ccw}) \cdot \cos\theta(t_2^{ccw}) & 1 \\ \vdots & \vdots \\ 2\sin\theta(t_n^{ccw}) \cdot \cos\theta(t_n^{ccw}) & 1 \\ \cdots & \cdots \\ -2\sin\theta(t_1^{clw}) \cdot \cos\theta(t_1^{clw}) & 1 \\ -2\sin\theta(t_2^{clw}) \cdot \cos\theta(t_2^{clw}) & 1 \\ \vdots & \vdots \\ -2\sin\theta(t_n^{clw}) \cdot \cos\theta(t_n^{clw}) & 1 \end{Bmatrix} \begin{Bmatrix} R^2 \sin(\phi) \\ R^2 \end{Bmatrix} \quad (43)$$

Lost motion describes an error that commonly exists in an individual axis mechanism that is caused by looseness in the mechanical components and linkages. When an axis with a lost motion error reverses its direction of motion (sign of velocity), the position of the end-point lags the position of the motor. The A2100 control identifies and compensates for two classes of lost motion, backlash and windup.

Backlash is a type of lost motion that is present regardless of whether the axis is in motion or at rest. That is, it persists after the axis has come to a stop. Windup is a type of lost motion that exists when the axis is in motion where the axis appears to creep to the correct position after the motor has stopped. An explanation of the differences between windup and backlash and how they can be compensated is given in U.S. Pat. No. 6,060,854, entitled "Method and Apparatus for Compensating for Windup in a Machine," issued to Stephen J. Yutkowitz, the entire disclosure of which is incorporated herein by reference.

Both types of lost motion exhibit nearly indistinguishable signatures on a ballbar plot and cannot conventionally be separately identified based on a single ballbar circle-test measurement. An additional test that uses the ballbar to allow the two types of lost-motion to be distinguished from each other has been developed and can be called the backlash-test. In an exemplary embodiment, the backlash test is a separate type of test from the circle-test whose measured data has been the topic of discussion up to this point. An explanation of how to estimate the total lost motion error from the circle-test data will be presented first, then an explanation for the backlash test will be given.

The parametric description of total-lost motion makes the assumption that the lost motion parameter does not vary with axis position or velocity (as long as there are no full stops). Axis lost motion of the backlash type that does vary with position can be handled (e.g., in the A2100 by the bidirectional compensation capability whose data-tables are developed from laser measurements).

Figure 12:
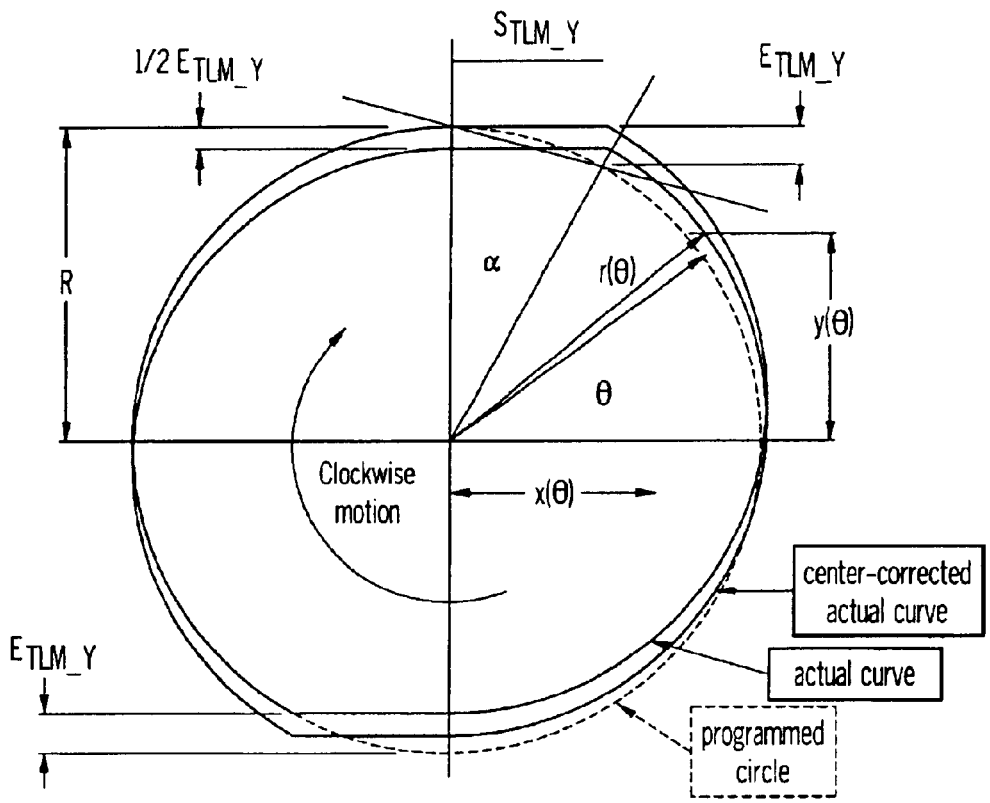
FIG. 12 is a plot illustrating an effect of lost motion on circular contour.

An effect of lost-motion on circular motion is shown in FIG. 12. The specific example shown in FIG. 12 is for a case with a very high amount of backlash on the Y-axis and no backlash on the X-axis. Unlike many of the previous plots, FIG. 12 is not a polar-error plot; it is a plot of the actual circular contour.

The plot of FIG. 12 shows the contour for clockwise motion. The case for counter-clockwise motion should look like the current plot reflected about the Y-axis, as can be imagined. The center-corrected curve is simply the actual curve shifted downward such that its geometric center corresponds to the center of the ideal circle. The actual y-coordinate of the curve center depends on the direction from which the ballbar center fixture was approached when the circle center was defined during the fixturing phase of the ballbar test.

Examination of FIG. 12 indicates that the total lost motion error $E_{TLM}$ causes a flat area following the axis reversal where the motion of the Y-motor does not result in any Y-axis motion while the X-axis moves with no error. This flat area can cause the best-fit circle to have a radius that is somewhat less than the radius of the programmed circle. It will be shown that for the type of data generated by an exemplary embodiment of the present invention, the amount of "shrinkage" caused by lost motion should be insignificantly small compared to the total lost motion error and need not be considered when determining the absolute scale errors. The command circle angle that defines the distance from the reversal where the (Y-axis) motion begins can be well approximated by the following equation when the ratio of $E_{TLM}$ to R is fairly small.

$$\cos(\alpha) = \frac{R - \frac{1}{2}E_{TLM\_Y}}{R + \frac{1}{2}E_{TLM\_Y}}$$

For actual measurements on conventional machine tools, a minimum circle radius can be about 100 mm and the largest expected lost-motion error should be well below about 0.2 mm. Thus, the maximum conceivable value for the angle $\alpha$ should be less than about 2 degrees. This confirms that the amount of shrinkage of the best-fit-circle radius due to lost motion should be insignificant relative to the lost motion error itself and need not be considered.

The observation that the flat area, $S_{TLM}$, covers a small percentage of the total circle also suggests that the exact shape of the curve just after the reversal (henceforth referred to as the transient portion) need not be considered by the technique for estimating the total lost motion from a ballbar measurement (since, e.g., a built-in requirement could be that the data arc is relatively large). Nevertheless, a good approximate representation of the transient portion can be useful when attempting to predict how backlash or windup compensation might improve circularity. The predicted effect of compensation can be obtained by subtracting a curve developed from the model parameter from the measurement curve, wherein it is desired to closely match the model to the actual transient. Thus, for a clockwise circle with a y-axis lost motion error, the following set of equations applies.

$$x(\theta) = R\cos(\theta) \quad (44)$$

$$y_{clw}(\theta) = \begin{cases} R\sin(\theta) + \frac{1}{2}E_{TLM\_Y}, & -\frac{1}{2}\pi \leq \theta < \frac{1}{2}\pi - \alpha & (a) \\ R - \frac{1}{2}E_{TLM\_Y}, & \frac{1}{2}\pi - \alpha \leq \theta < \frac{1}{2}\pi & (b) \\ R\sin(\theta) - \frac{1}{2}E_{TLM\_Y}, & \frac{1}{2}\pi \leq \theta < \frac{3}{2}\pi - \alpha & (c) \\ -R + \frac{1}{2}E_{TLM\_Y}, & \frac{3}{2}\pi - \alpha \leq \theta < \frac{3}{2}\pi & (d) \end{cases} \quad (45)$$

The equation for the radius squared as a function of circle angle can be obtained by summing the square of the x and y components. The estimation of the total lost motion error may be based on regions (a) and (c) in equation (45) because regions (b) and (d) are very small and should not significantly bias the result if their effects are ignored. As a practical matter, the angle $\alpha$ is not known until $E_{TLM}$ is known, so the transient effects cannot be considered until a first approximation in an iterative method is obtained. The approximate equation for the radius squared can thus be obtained by applying the equation for region (a) to both regions (a) and (b), and by applying the equation for region (c) to both regions (c) and (d). The following equation can be developed by assuming that the lost-motion squared terms are insignificantly small.

$$r_{clw}^2(\theta) = \begin{cases} R^2 + R\sin(\theta)E_{TLM\_Y}, & -\frac{1}{2}\pi \leq \theta < \frac{1}{2}\pi \\ R^2 - R\sin(\theta)E_{TLM\_Y}, & \frac{1}{2}\pi \leq \theta < \frac{3}{2}\pi \end{cases} \quad (46)$$

The results for the counter-clockwise circle may be analogously obtained and can be shown below.

$$r_{ccw}^2(\theta) = \begin{cases} R^2 - R\sin(\theta)E_{TLM\_Y}, & -\frac{1}{2}\pi \leq \theta < \frac{1}{2}\pi \\ R^2 + R\sin(\theta)E_{TLM\_Y}, & \frac{1}{2}\pi \leq \theta < \frac{3}{2}\pi \end{cases} \quad (47)$$

The equations for estimating the lost motion errors of the X-axis may also be obtained using similar techniques or by replacing $\theta$ with $(\theta + \frac{1}{2}\pi)$ in the previous equations.

$$r_{clw}^2(\theta) = \begin{cases} R^2 - R\cos(\theta)E_{TLM\_X}, & 0 \leq \theta < \pi \\ R^2 + R\cos(\theta)E_{TLM\_X}, & \pi \leq \theta < 2\pi \end{cases} \quad (48)$$

$$r_{ccw}^2(\theta) = \begin{cases} R^2 + R\cos(\theta)E_{TLM\_X}, & 0 \leq \theta < \pi \\ R^2 - R\cos(\theta)E_{TLM\_X}, & \pi \leq \theta < 2\pi \end{cases} \quad (49)$$

Equations that are analogous to (45) for the counter-clockwise y-axis case and for both x-axis cases can also be developed, but are not shown here. The matrix equation for total lost motion presented below includes factors for lost motion on both axes. In the equation, the notation QI, QII, QIII, QIV are used to represent the circle quadrants (where the measurement data is segregated into quadrants).

$$\begin{Bmatrix} r^2(t_1^{ccwQI}) \\ \vdots \\ r^2(t_{n_{ccwI}}^{ccwQI}) \\ \cdots \\ r^2(t_1^{ccwQII}) \\ \vdots \\ r^2(t_{n_{ccwII}}^{ccwQII}) \\ \cdots \\ r^2(t_1^{ccwQIII}) \\ \vdots \\ r^2(t_{n_{ccwIII}}^{ccwQIII}) \\ \cdots \\ r^2(t_1^{ccwQIV}) \\ \vdots \\ r^2(t_{n_{ccwIV}}^{ccwQIV}) \\ \cdots \\ r^2(t_1^{clwQI}) \\ \vdots \\ r^2(t_{n_{clwI}}^{clwQI}) \\ \cdots \\ r^2(t_1^{clwQII}) \\ \vdots \\ r^2(t_{n_{clwII}}^{clwQII}) \\ \cdots \\ r^2(t_1^{clwQIII}) \\ \vdots \\ r^2(t_{n_{clwIII}}^{clwQIII}) \\ \cdots \\ r^2(t_1^{clwQIV}) \\ \vdots \\ r^2(t_{n_{clwIV}}^{clwQIV}) \end{Bmatrix} = \begin{bmatrix} +\cos(\theta(t_1^{ccwQI})) & -\sin(\theta(t_1^{ccwQI})) & 1 \\ \vdots & \vdots & \vdots \\ +\cos(\theta(t_{n_{ccwI}}^{ccwQI})) & -\sin(\theta(t_{n_{ccwI}}^{ccwQI})) & 1 \\ \cdots & \cdots & \cdots \\ +\cos(\theta(t_1^{ccwQII})) & +\sin(\theta(t_1^{ccwQII})) & 1 \\ \vdots & \vdots & \vdots \\ +\cos(\theta(t_{n_{ccwII}}^{ccwQII})) & +\sin(\theta(t_{n_{ccwII}}^{ccwQII})) & 1 \\ \cdots & \cdots & \cdots \\ -\cos(\theta(t_1^{ccwQIII})) & +\sin(\theta(t_1^{ccwQIII})) & 1 \\ \vdots & \vdots & \vdots \\ -\cos(\theta(t_{n_{ccwIII}}^{ccwQIII})) & +\sin(\theta(t_{n_{ccwIII}}^{ccwQIII})) & 1 \\ \cdots & \cdots & \cdots \\ -\cos(\theta(t_1^{ccwQIV})) & -\sin(\theta(t_1^{ccwQIV})) & 1 \\ \vdots & \vdots & \vdots \\ -\cos(\theta(t_{n_{ccwIV}}^{ccwQIV})) & -\sin(\theta(t_{n_{ccwIV}}^{ccwQIV})) & 1 \\ \cdots & \cdots & \cdots \\ -\cos(\theta(t_1^{clwQI})) & +\sin(\theta(t_1^{clwQI})) & 1 \\ \vdots & \vdots & \vdots \\ -\cos(\theta(t_{n_{clwI}}^{clwQI})) & +\sin(\theta(t_{n_{clwI}}^{clwQI})) & 1 \\ \cdots & \cdots & \cdots \\ -\cos(\theta(t_1^{clwQII})) & -\sin(\theta(t_1^{clwQII})) & 1 \\ \vdots & \vdots & \vdots \\ -\cos(\theta(t_{n_{clwII}}^{clwQII})) & -\sin(\theta(t_{n_{clwII}}^{clwQII})) & 1 \\ \cdots & \cdots & \cdots \\ +\cos(\theta(t_1^{clwQIII})) & -\sin(\theta(t_1^{clwQIII})) & 1 \\ \vdots & \vdots & \vdots \\ +\cos(\theta(t_{n_{clwIII}}^{clwQIII})) & -\sin(\theta(t_{n_{clwIII}}^{clwQIII})) & 1 \\ \cdots & \cdots & \cdots \\ +\cos(\theta(t_1^{clwQIV})) & +\sin(\theta(t_1^{clwQIV})) & 1 \\ \vdots & \vdots & \vdots \\ +\cos(\theta(t_{n_{clwIV}}^{clwQIV})) & +\sin(\theta(t_{n_{clwIV}}^{clwQIV})) & 1 \end{bmatrix} \begin{Bmatrix} R \cdot E_{TLM\_X} \\ R \cdot E_{TLM\_Y} \\ R^2 \end{Bmatrix}$$

(50)

Figure 13:
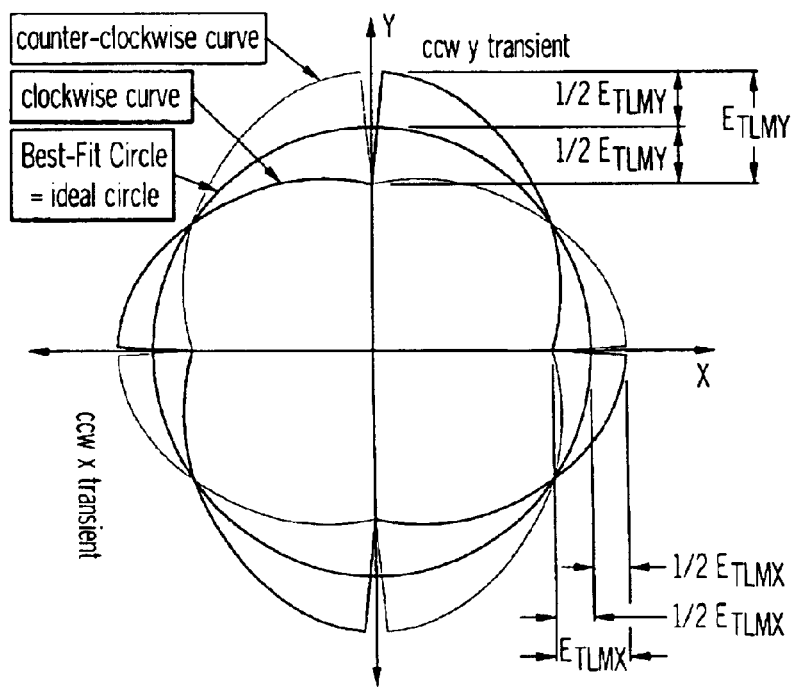
FIG. 13 is a polar error plot illustrating a lost motion signature.

An example for a polar-error plot for clockwise and counterclockwise moves on a machine with lost motion on both X and Y axes is shown in FIG. 13. The post-reversal transient portions for this synthesized example are very similar to the post-reversal portions of measurements on actual machines. In the example, the best-fit circle and the ideal circle are so-similar that they are substantially indistinguishable, as was expected based on the argument of insignificantly small circle shrinkage.

Up to this point, the discussion has been limited to the identification of the total lost motion from a continuous motion circle-test measurement. Experience with these measurements indicates that there is no substantially detectable difference between the effect of the backlash and windup components of total lost motion. In order to separately identify each of these errors, an additional backlash test can be employed.

An exemplary backlash test involves a sequence where the ballbar is used to detect the lost motion that occurs when the axis moves to position stops and dwells (as previously described). The windup error for an axis can then be computed by subtracting the measured backlash from the estimate for total lost motion. If a backlash test is not performed, backlash can be assumed zero and the measured lost motion from the circle-test attributed to a windup error. For example, this could be based on the assumption that the machine is properly compensated for backlash using bidirectional compensation.

$$E_{windup\_X} = E_{TLM\_X} - E_{backlash\_X}$$

Friction on a machine tool axis can be the source of a transient error following axis reversals. Currently, for example, the A2100 employs friction compensation algorithms as part of its integrated feedforward capability. The A2100 friction compensation assumes that the friction forces and torques acting on the axis are reasonably represented by a Coulomb+viscous friction model.

A torque discontinuity due to Coulomb friction occurs after an axis reversal and results in a transient error where the axis lags the command for some period of time until the integrator in the velocity control loop builds up to contain a torque that counters the friction torque. In general, the size of the transient error increases with the friction level and decreases with the velocity loop's proportional and integral gains. A description of how to iteratively tune the friction compensation based on a ballbar measurement is described in the A2100 *Installation Service & Support Manual* (referred to hereinafter as the "ISS manual"), which is hereby incorporated by reference.

Figure 14:
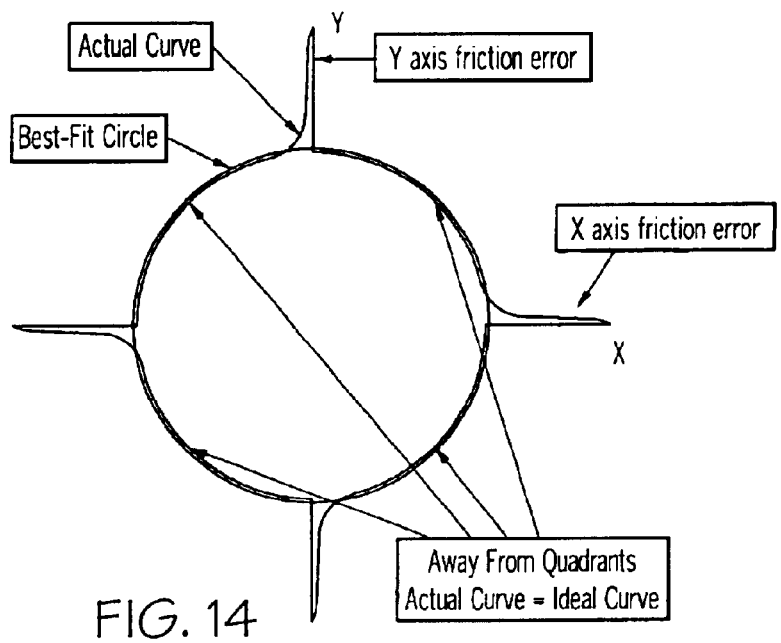
FIG. 14 is a polar error plot illustrating a friction reversal error signature.

An effect of Coulomb friction errors on a ballbar plot is an increase in the circle radius following the reversal for some angle until the servo detects the error and the radius returns to the desired value. A signature of a friction reversal error on a polar-error plot is shown in FIG. 14.

In contrast to the effect of lost motion, friction errors can cause the best-fit radius to be slightly larger than the ideal radius. The amplification of the best fit radius over the ideal radius relative to the magnitude of the friction reversal error depends mostly on the angular duration of the friction error, which itself is related (primarily) to the velocity loop's integrator time constant and the circle frequency. To assess the degree to which friction errors may bias the best fit radius, a worst case scenario could be considered to get an approximate value for the largest expected angle of the reversal spike.

For example, the anticipated highest circle frequency should occur at a minimum ballbar radius of about 100 mm and a maximum anticipated feedrate of about 15,000 mm/min—making the frequency about 2.5 rad/sec. Experience shows that the integrator time constant is typically less than about 0.020 sec. The duration of the reversal error is considered to be significant over two integrator time constants. The angular distance traveled in two time constants can thus be about 0.040 sec*2.5 rad/sec=0.10 rad or 5.7 degrees. Even for the worst case scenario, the friction error should not significantly amplify the best-fit radius relative to the amplitude of the friction error itself.

In another embodiment of the present invention, algorithms for estimating the parameters associated with the friction errors can also be included. The results for friction compensation parameters obtained via feedforward auto-tuning can often be improved upon by performing some manual adjustments based on ballbar measurements. The manual adjustments can be typically performed based, for example, on the procedure outlined in the ISS manual. An explanation for why the results of the feedforward auto tuning may be improved by further manual tuning is that the transient friction forces/torques that occur during an axis reversal are more complex than the assumed step discontinuity at zero velocity. The exact nature of these transient friction torques may be very complex and may be a function of a number of state variables including the positions, velocities, and accelerations of a number of bodies in a multi-body system.

This complex behavior may be partially approximated by adjusting the amplitude and time constant of friction compensation (feedforward) to differ from the ideal values obtained from feedforward auto-tuning's torque measurements and measurements of the response of the velocity loop compensator. This observation has led to the addition of a Coulomb-Width-Adjust parameter to the set of feedforward parameters to enable adjustments of the friction compensation time constant without affecting the other types of feedforward that operate directly on the integrator time constant (acceleration and viscous friction feedforward). Thus, the ballbar measurement may be used to determine an optimal value for the Coulomb-Width-Adjust parameter, given that the feedforward-auto-tuning process has already been performed and has resulted in a value for the estimate of the integrator time constant.

Figure 15:
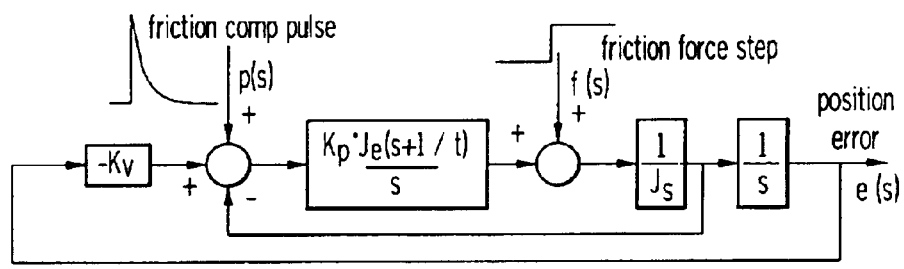
FIG. 15 is a block diagram illustrating a system model employed by friction error estimation according to an exemplary embodiment of the present invention.

In one embodiment, the ability to estimate friction parameters (e.g., amplitude and time constant) directly from a measurement of a machine without any active friction compensation can be included (e.g., if a precise estimate of the circle angle for every measurement can be obtained). For example, such an algorithm could first remove known error types from the data using the techniques described below. Next, the radial error in the immediate region of the axis reversal could be converted to deviation of the reversing axis and the corresponding angles could be converted to the time since reversal. Then, an iterative process can begin by selecting a candidate value for the time constant τ (inverse of integrator gain) and performing a simulation based on this time constant. A model used to develop the simulation is shown in FIG. 15.

The transfer function for the position error in response to a friction force signal can be derived from the block diagram in FIG. 15 and can be shown in equation (51) below. The DC amplitude of this transfer function is arbitrary. The transfer function formulation may be used to develop a numerical solution to the associated linear differential equation.

$$\frac{e(s)}{f(s)} = \frac{s}{s^3 + K_P s^2 + K_P\left(\frac{1}{\tau} + K_V\right)s + \frac{K_V K_P}{\tau}} \quad (51)$$

The known axis Kv, an assumption that Je≈J (where Je is an inertia estimate from feedforward auto tuning and J is actual total axis inertia), and an estimate for the axis Kp (velocity loop proportional gain) can be used to develop an estimate for the error-transient versus time function of the data sequence for the axis error transient following a reversal. The scaling of such a time sequence might be arbitrary since the friction torque is initially unknown. The value for Kp need not be very precise as the pulse shape is quite insensitive to this parameter (assuming the velocity servo is reasonably well tuned with a phase margin of more than 40°). The simulation parameter for Kp can be the same as the iff_kp_estimate.

The amplitude of the estimated transient can be determined using least squares to obtain an optimal scaling between the arbitrary-amplitude simulated transient and the y-axis deviation sequence derived from the measured radius. The sum of the residual errors squared can be computed and retained. Residual errors can be computed for a number of selections for the time constant as part of an iterative optimization process. The time constant and associated amplitude that results in the minimum sum-of-residual-error-squared can be chosen as the estimated friction parameters. The process can be constructed to simultaneously include available measurements of reversals of the axis under consideration.

A potential problem with the above-described procedure for estimating the friction reversal error can be that it might not be valid for cases where, for example, the friction compensation is actively applied during the ballbar measurement. The ballbar measurement is expected to have the most value in determining an adjustment to nominal values for friction compensation parameters obtained via feedforward auto-tuning. Thus, in an exemplary embodiment, a ballbar measurement will be performed under circumstances where friction compensation is actively applied during the measurement.

If the friction compensation that is applied is not optimal, then some error at the reversal might occur, and such an error might be more complex than the type produced when friction compensation is turned off. One approach to take in this case could involve attempting to remove the effects of friction compensation. However, the effects of friction compensation are not easily removed from the data because the DC scaling of the transfer function may no longer be arbitrary. This means that a 1-dimensional optimization problem could become a 2-dimensional optimization problem.

One solution could include automatically applying the iterative manual tuning procedure outlined in the ISS manual. Such an approach could iteratively execute the following sequence: 1) perform a ballbar measurement, 2) isolate the reversal errors, 3) use heuristic rules to determine whether to increase or decrease the Coulomb-Width-Adjust and whether to increase or decrease the Coulomb-Friction-Level, 4) perform a model-based curve fitting to determine candidate values of these parameters for the next iteration, 5) configure the friction feedforward with these new values, and 6) return to step 1. The iterative sequence can be exited once the errors are below a defined threshold or the improvements obtained between iterations become insignificant.

Estimation of the friction-related parameters is a capability that could be useful for the purpose of data analysis in ranking the impact of different errors on the overall circularity. It could be used to auto-tune friction compensation for systems where feedforward-auto-tuning is unavailable. For systems where feedforward-auto-tuning is available, it could, for example, be used to propose modifications to the friction compensation parameters obtained via a previously run feedforward-auto-tuning test.

The preceding discussion developed the equations for the individual error types by assuming that each of these error types was the one existing in a measurement. In real applications, the error types occur simultaneously and are present in some proportion. In order to get an optimal estimate for each error types, the effect of all known errors can be considered simultaneously. This can be accomplished by formulating a single matrix equation that includes the effects of all known errors.

The matrix of basis functions can contain, for example, ten columns, with each column containing a basis function for one of the following exemplary parameters:

1. X axis center offset.
2. Y axis center offset
3. XY Squareness Error
4. XY Scale-mismatch error
5. XY Servo mismatch
6. X Straightness Error
7. Y Straightness Error
8. X Total Lost Motion
9. Y Total Lost Motion
10. Best Fit Radius The matrix equation can be formulated by simply combining each of the matrix equations previously discussed. Since the servo-mismatch and lost-motion estimate includes separate treatment of data based on circle direction, the data can be segregated into clockwise and counter clockwise segments. Additionally, the total lost motion estimate involves separate treatment of data based on quadrant, with the data being further partitioned based on circle quadrant (estimate angle). Partitioning of this type has already been described during the discussion of lost motion estimation as seen in equation (50).

A combined matrix equation for simultaneous estimation of all parameters is shown below. To enable the equation to fit on the page, the data partitioning is not explicitly shown (the ± symbols are used to designate matrix columns whose basis function depends on direction and/or quadrant).

$$\{r^2(t_i)\} = \begin{bmatrix} \{-2\cos(\theta(t_i))\}^T \\ \{-2\sin(\theta(t_i))\}^T \\ \{\cos(\theta(t_i))\sin(\theta(t_i))\}^T \\ \{2(\cos^2(\theta(t_i)) - \sin^2(\theta(t_i)))\}^T \\ \{\pm 2\cos(\theta(t_i))\sin(\theta(t_i))\}^T \\ \{2\sin(\theta(t_i))\cos^2(\theta(t_i))\}^T \\ \{2\cos(\theta(t_i))\sin^2(\theta(t_i))\}^T \\ \{\pm \cos(\theta(t_i))\}^T \\ \{\pm \sin(\theta(t_i))\}^T \\ \{1\ 1\ \cdots\ 1\}^T \end{bmatrix}^T \cdot \begin{Bmatrix} R \cdot E_{CTR\_X} \\ R \cdot E_{CTR\_Y} \\ R^2 \cdot E_{SQR\_XY} \\ R^2 \cdot E_{SCL\_XY} \\ R^2 \cdot \sin(\phi_{svo}) \\ R^3 \cdot E_{STR\_X\_Y} \\ R^3 \cdot E_{STR\_Y\_X} \\ R \cdot E_{TLM\_X} \\ R \cdot E_{TLM\_Y} \\ R^2 \end{Bmatrix} \quad (52)$$

The following symbolic matrix equation can be used to describe the previous specific equation.

$$\{r^2(t)\}_{(n \times 1)} = [A]_{(n \times 10)} \cdot \{P\}_{(10 \times 1)} \quad (53)$$

The estimation of the above ten parameters can be accomplished by applying the least squares solution of equation (3) to equation (52) above. In the following equations the ^ symbol is used to designate a parameter as being an estimated value.

$$\{\hat{P}\} = [[A]^T[A]]^{-1}[A]^T\{r^2\} \quad (54)$$

The inversion of the matrix $A^T A$ may be accomplished using eigenvalues and eigenvectors obtained by Jacobi's technique. Using the Jacobi technique has the advantage that it provides the eigenvalues of $[A^T A]$, which are used in the computation of the condition number as described below.

Once the matrix is inverted, the scaling of the parameter by powers of the best fit radius can be removed by multiplying each parameter by the appropriate power of the inverse of the best-fit radius obtained by square-rooting the final element of the parameter vector.

$$\hat{R} = \sqrt{\hat{P}_{10}},\ E_{CTR\_X} = \frac{\hat{P}_1}{\hat{R}},\ E_{CTR\_Y} = \frac{\hat{P}_2}{\hat{R}}, \quad (55)$$

$$E_{SQR\_XY} = \frac{\hat{P}_3}{\hat{R}^2},\ E_{SCL\_XY} = \frac{\hat{P}_4}{\hat{R}^2}$$

$$\phi_{svo} = \sin^{-1}\left(\frac{\hat{P}_5}{\hat{R}^2}\right),\ E_{STR\_XY} = \frac{\hat{P}_6}{\hat{R}^3},$$

$$E_{STR\_YX} = \frac{\hat{P}_7}{\hat{R}^3},\ E_{TLM\_X} = \frac{\hat{P}_8}{\hat{R}},\ E_{TLM\_Y} = \frac{\hat{P}_9}{\hat{R}}$$

Examination of the matrix [A] in equation (52) reveals that there are opportunities in the formulation for some columns to be redundant with other columns. If a column is not unique, then the parameter associated with that column cannot be uniquely identified and the least squares solution to the matrix equation fails to exist. The columns can be made unique by ensuring that the data arc is sufficiently large and that both clockwise and counter-clockwise data is present.

An indicator of the overall uniqueness of the columns in the matrix formulation is the matrix condition number (the ratio of the maximum singular value to the minimum singular value). The singular values may be obtained by computing the square root of the eigenvalues of the $[[A]^T[A]]$ matrix (from equation (3)). The condition number for a given set of test conditions can be normalized based on the (best case) condition number for a full 360 degree data arc in both directions.

A statistic called the "excitation" is defined as the inverse of the normalized condition number. A test for the sufficiency of excitation provided by a collection of test setup parameters might be to compare excitation statistic to a threshold. When an inappropriate set of test conditions is proposed by the user, the excitation falls below a predefined threshold and the test conditions can be rejected.

$$\{\lambda\} = eig[[A]^T[A]],\ C_{NUM} = \sqrt{\frac{\lambda_{max}}{\lambda_{min}}}, \quad (56)$$

$$\text{excitation} = \frac{C_{NUM}}{C_{NUM}(360°\ clw\ \&\ ccw)}$$

Figure 16:
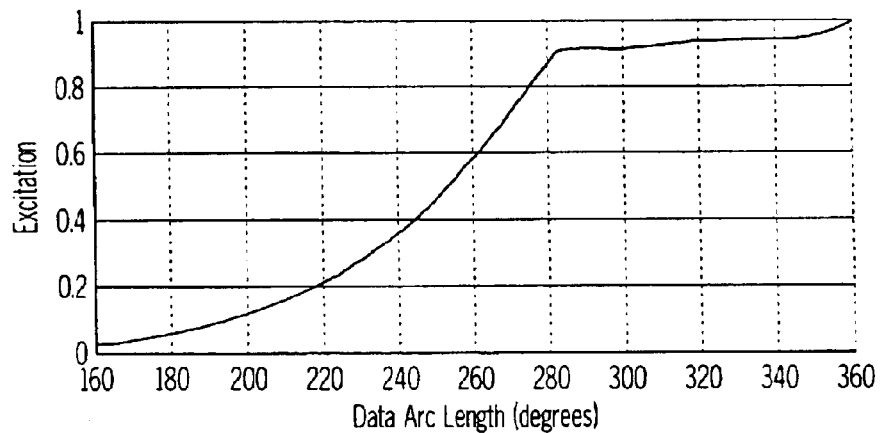
FIG. 16 is a graph illustrating excitation as a function of data arc length according to an exemplary embodiment of the present invention.

A plot of the excitation as a function of data arc length for a data arc starting at 0.0 is shown in FIG. 16. Similar plots for other (non-zero) data start angles are very similar to the one shown in FIG. 16. The plot indicates that the best excitation is obtained for a data arc whose length is greater than about 280 degrees. The minimum acceptable excitation allowed for by the test setup validity test can be chosen to be about 0.2 or approximately 220 degrees of data arc.

Some data analysis tasks provided as described by example herein involve computing a synthesized value for the ballbar radius for each angle at which a ballbar radius measurement has been taken. The sequence of synthesized radii can be referred to as $r_{synth}(t)$. The synthesized radius sequence can be used by the following analyses: 1) modeling coherence, 2) ranking the relative impact of each error type on the overall circularity error, 3) predicting how the circularity error would change if a selected combination of axis compensations were employed, and/or 4) estimating the measurement variance used to determine the significance of each estimated parameter.

The synthesized radius vector can be obtained by evaluating equation (52), where the parameter vector is populated with the estimates, and performing the square-root of the result. The synthetic data can then be modified at the axis reversals to account for the lost motion transients of the type described by equation (45)b and (45)c. The data following the reversal can be modified by computing the radius for a constant axis deviation over the region defined by the angle α. The following equations describe how the synthetic data can be generated.

$$\{r_{synth}(\theta)\} = \sqrt{[A] \cdot \{\hat{P}\}} \tag{57}$$

$$\hat{\alpha}_X = \cos^{-1}\left(\frac{\hat{R} - \frac{1}{2}\hat{E}_{TLM\_X}}{\hat{R} + \frac{1}{2}\hat{E}_{TLM\_X}}\right), \hat{\alpha}_Y = \cos^{-1}\left(\frac{\hat{R} - \frac{1}{2}\hat{E}_{TLM\_Y}}{\hat{R} + \frac{1}{2}\hat{E}_{TLM\_Y}}\right) \tag{58}$$

$$r_{synth}(\theta) = \begin{cases} \sqrt{\hat{R}^2 \sin^2(\theta) + \left(\hat{R} - \frac{1}{2}\hat{E}_{TLM_X}\right)^2} & \forall\, clw\!: -\hat{\alpha}_X \le \theta < 0 \text{ or } \pi - \hat{\alpha}_X \le \theta < \pi \\ \cdot\cdot & \forall\, ccw\!: 0 \le \theta < \hat{\alpha}_X \text{ or } \pi \le \theta < \pi + \hat{\alpha}_X \end{cases} \tag{59}$$

$$r_{synth}(\theta) = \tag{60}$$

$$\begin{cases} \sqrt{\hat{R}^2 \cos^2(\theta) + \left(\hat{R} - \frac{1}{2}\hat{E}_{TLM_Y}\right)^2} & \forall\, clw\!: \frac{\pi}{2} - \hat{\alpha}_Y \le \theta < \frac{\pi}{2} \text{ or } \frac{3\pi}{2} - \hat{\alpha}_Y \le \theta < \frac{3\pi}{2} \\ \cdot\cdot & \forall\, ccw\!: \frac{\pi}{2} \le \theta < \frac{\pi}{2} + \hat{\alpha}_Y \text{ or } \frac{3\pi}{2} \le \theta < \frac{3\pi}{2} + \hat{\alpha}_Y \end{cases}$$

In the previous equations, the value for mean radius was for the case where all errors, except for the lost motion under consideration, are present in the data set.

The sequence of synthesized radii can be used to demonstrate what is expected to occur in the absence of certain error types or combinations of error types. As described earlier, for example, analyze-data page 70 can allow a user to select a combination of error types to be removed from the measurement (e.g., by checking or unchecking checkboxes to designate the desired combination). For example, when a checkbox is checked, the associated error type can be included in the predicted-radius polar-error plot. When it is unchecked, the effect of the corresponding error can be removed. In this way, the user can get a realistic idea of how application of compensation can improve performance by removing the known error effects from measured data that may contain error types for which no compensation is available.

The first step in constructing the predicted radius sequence can be to compute the residual error by subtracting elements of the synthesized radius sequence from corresponding elements in the measured radius sequence. The residual error can then be added to a second synthesized radius sequence $r_{synth\_partial}$ that can be created by zeroing all elements of the $\{P\}$ vector except for those whose error types remain (e.g., those checked on diagnostics window 102). If an axis lost motion error is included, then modification of the synthesized sequence can be performed by employing equations (59) and (60) for the axis or axes whose lost motion error should be included in the prediction sequence.

In an exemplary embodiment, checkboxes for the center offset errors are not provided because the center offsets are not machine errors and the predicted radius sequence should have the effect of center offsets removed. This means that, for the computation of $r_{synth\_partial}$, the first two elements of $\{P\}$ can be set to zero. A procedure for computing the predicted radius $r_{predicted}$ is now explicitly described.

First, the residual error between the synthesized radius and the measurement can be computed.

$$e_r = r - r_{synth} \tag{61}$$

Next, the synthesized radius including only the error types whose checkboxes are checked can be computed.

In the following equation, each element of the vector $\{c\}$ can be assigned a value of 0.0 when the checkbox associated with the parameter is checked, and a value of 1.0 when the checkbox associated with the parameter is not checked.

$$\{r_{synth\_part}(\theta, \{c\})\} = \tag{62}$$

$$\sqrt{[A(\theta)] \cdot \{|\,0\,|\,0\,|\,c_3\hat{P}_3\,|\,c_4\hat{P}_4\,|\,c_5\hat{P}_5\,|\,c_6\hat{P}_6\,|\,c_7\hat{P}_7\,|\,c_8\hat{P}_8\,|\,c_9\hat{P}_9\,|\,\hat{P}_{10}\,|\}^T}$$

If $c_7=1$, use equation (59) to apply the x-axis reversal transient modification to $r_{synth\_part}$. Likewise, if $c_8=1$, use equation (60) to apply the y-axis reversal transient modification to $r_{synth\_part}$. Finally, the predicted radius for the selected combination of error types can be computed.

$$r_{predicted}(\theta, \{c\}) = r_{synth\_part}(\theta, \{c\}) + e_r(\theta) \tag{63}$$

The predicted radius sequence from the previous equation has no center offset error. It can be used directly in the computation of the corrected circularity displayed, for example, in the diagnostics window 102.

A capability that can be provided by diagnostics window 102 can include displaying and ranking error types in order of their relative contribution to the circularity error. Each error type's contribution can be determined by evaluating equation (62) for $r_{synth\_part}(\theta, \{c\})$ where the elements in the vector $\{c\}$ are set to zero, except the one associated with the particular error type under consideration (set to 1.0). The circularity error for the resulting synthesized radius can be computed and retained.

The process can be performed for each of the, in this embodiment, seven error parameters. The circularity errors associated with each error type can be sorted and displayed when the user requests. The process can be summarized by the following equation, which makes use of the Kronicker delta $\delta(k)$: a 10 element vector whose elements are zero, except for the k'th element which has a value of one.

$$E_{CIRC}(k) = \max(r_{synth\_part}(\theta, \{c\} = \delta(k))) - \min(r_{synth\_part}(\theta, \{c\} = \delta(k))), k=3,4,\ldots,9 \tag{64}$$

A statistic called the "model coherence" can be used to indicate whether the data is well approximated by the model. It can be used to identify situations where error sources that are beyond the scope of the assumed model may be present, or situations where the measurement data was corrupted for some reason. A coherence parameter can be obtained by computing the square of the coefficient of correlation between the measured radius vector to the synthesized radius vector $r_{synth}$ that contains the effects of all known errors.

In an exemplary embodiment, the center offset errors are removed from both radius vectors prior to computation of coherence. Additionally, the contiguous data segments that follow an axis reversal over the angular ranges of $\alpha_x$ and $\alpha_y$ can be removed from both the measured and synthesized radius. One advantage associated with eliminating these data regions can include avoiding the inclusion of much or all of the friction reversal error transient, which can lower the coherence, in the computation.

As the coherence deviates from the ideal value of 1.0, the ability of the model to represent the observed behavior becomes potentially questionable. Typically, a coherence value above about 0.90 indicates a good fit. Accordingly, in an exemplary embodiment, a warning is given (e.g., displayed) if the coherence is unacceptably low to avoid situations where a less experienced user might attempt to compensate a machine based on a bad measurement.

One problem with a definition of coherence based on correlation coefficient can be that, when the machine has little or no errors, or when the errors are well compensated, the presence of random noise or axis vibration may cause the computed coherence to be low. If the same machine had some errors present that are within the scope of the model, the coherence would have been high. One solution to such a problem could involve performing analyses to distinguish between components of the residual error that appear to be random relative to significant changes in circle angle to those residual errors that appear to have a deterministic low-frequency relationship to circle angle. Evaluation of the autocorrelation function of the residual error or applying an angle-domain smoothing filter to the residual error could potentially identify the existence of non-random signal content.

Another solution involves intentionally adding some random noise to both the measured and the synthesized data in order to provide some correlation for the case where there are no errors present. The amplitude of this intentional random noise should be low enough to allow for true problems with the measurement to be identified with a low coherence, but high enough to prevent low coherence statistics from being reported for error-free data. Thus, the amplitude should be based on the expected residual error caused by vibration and measurement noise.

Coherence can be computed based on the following equations where p is the coherence, $\eta(t)$ is a sequence of uniformly distributed random noise with a predefined range, the "~" overstrike is used to designate a signal that has been intentionally augmented with the addition of noise, the "–" overstrike is used to designate the mean value of a sequence, and the "synth" subscript is used to identify the synthesized data sequence. Experience has shown that a good value for the range of the uniformly distributed random variable $\eta$ is about ±10 microns.

$$\tilde{r}_{synth}(t) = r_{synth}(t) + \eta(t) \tag{65}$$

$$\tilde{r}(t) = r(t) + \eta(t) \tag{66}$$

Next, these data sequences can be modified by computing the center offset error and removing its effects from the data by applying equations (6) and (7) to both data sets. Otherwise, a large center offset error may result in a good coherence even if there are measurement problems. Finally, the correlation coefficient can be computed for the relationship for the center-corrected, noise-augmented sequences for measured and synthesized radius.

$$\rho^2 = \frac{\left(\sum \left(\tilde{r}_{synth}(t) - \overline{\tilde{r}_{synth}}\right) \cdot \left(\tilde{r}(t) - \overline{\tilde{r}}\right)\right)^2}{\sum \left(\tilde{r}_{synth}(t) - \overline{\tilde{r}_{synth}}\right)^2 \cdot \sum \left(\tilde{r}(t) - \overline{\tilde{r}}\right)^2} \tag{67}$$

"Significance" is a statistic that can be computed for each estimated parameter. It is designed to indicate, for example, whether the magnitude of the parameter estimate is significantly large relative to the estimated uncertainty of the parameter. For example, the parameter estimate for lost-motion on a machine with zero backlash is likely to be non-zero due to the presence of measurement noise. In this case, the computed significance for the total-lost-motion parameter should be small and the user can appreciate that the estimate for the total lost motion is not particularly meaningful.

The equations for the computation of significance can be developed based on several assumptions about the data. These assumptions are not necessarily totally valid, yet the significance statistic developed based on these assumptions has proven to be useful. The significance statistic compares the parameter estimate to an estimate of the standard-deviation associated with the parameter. The estimate of the standard deviation of the parameter can be computed based on the assumption that the error model is capable of perfectly describing the measurement, with the exception of normally distributed, uncorrelated random noise of constant variance on the radius-squared measurement.

Implicit within the stated assumption is that the basis functions that constitute the matrix [A] in equation (54) are deterministic (i.e., the estimates for the circle angle based on the elapsed test time contain no errors). With these assumptions, the covariance matrix for the parameter estimate vector $\{\hat{P}\}$ in equation (54) may be determined from the equation shown below, whose derivation can be found in many textbooks whose topic is statistics and estimation-theory.

The following equation computes the exemplary 10×10 covariance matrix, where N is the total number of measurements and 10 is the number of parameters estimated. As with the estimation of coherence, the data immediately following the reversals is not included in the computation in order to assure that the transient reversal errors do not bias the estimate of the measurement noise variance.

$$[COV_P] = \left(\frac{1}{N-10} \sum_{i=1}^{N} \left(r^2 - [A]\{\hat{P}\}\right)^2\right) \cdot [[A]^T[A]]^{-1} \tag{68}$$

The estimated standard deviation of the estimated parameters is the square-roots of the diagonal elements of the covariance matrix.

$$\{\hat{\sigma}_P\} = \sqrt{\{\text{diag}([COV_P])\}} \tag{69}$$

Each component of the standard deviation vector can be compared to the value of the corresponding component in the parameter estimate vector $\{\hat{P}\}$ to determine whether the estimated value is significant relative to the standard deviation. The formulation for the significance statistic can be based-on the following statement: the significance increases as the ratio of parameter-estimate to standard deviation increases, and a parameter estimate whose amplitude is less than, for example, five standard deviations is considered insignificant. An equation for the significance S of the k'th element of the parameter estimate vector developed to meet the stated criteria is shown below.

$$S_k = \begin{cases} 1 - \frac{(5 \cdot \hat{\sigma}_{P\_k})}{|\hat{P}_k|}, & \hat{P}_k \geq 5 \cdot \hat{\sigma}_{P\_k} \\ 0, & \hat{P}_k < 5 \cdot \hat{\sigma}_{P\_k} \end{cases} \quad (70)$$

The previous equations provide a general approach for computing the significance. Some special consideration for the scale error estimates for the case of a length-calibrated ballbar can be included as these parameters are not explicitly contained in the parameter estimates vector and can be developed based on two separate parameters, each with its own variance estimate. When a simplifying assumption that the average radius is much greater than the variance of the estimate for the average radius is employed, the following expression may be obtained from equation (25).

$$\text{var}(\hat{R}^2 \cdot \hat{E}_{SCL\_X}) = \text{var}(\hat{R}^2 \cdot \hat{E}_{SCL\_Y}) \approx (\hat{\sigma}_{P\_4})^2 \quad (71)$$

Equations for the significance for the axis scale errors are shown below.

$$S(\hat{E}_{SCL\_X}) = \begin{cases} 1 - \frac{(5 \cdot \hat{\sigma}_{P\_4})}{(\hat{R}^2 \cdot \hat{E}_{SCL\_X})}, & \hat{R}^2 \cdot \hat{E}_{SCL\_X} \geq 5 \cdot \hat{\sigma}_{P\_4} \\ 0, & \hat{R}^2 \cdot \hat{E}_{SCL\_X} < 5 \cdot \hat{\sigma}_{P\_4} \end{cases} \quad (72)$$

$$S(\hat{E}_{SCL\_Y}) = \begin{cases} 1 - \frac{(5 \cdot \hat{\sigma}_{P\_4})}{(\hat{R}^2 \cdot \hat{E}_{SCL\_Y})}, & \hat{R}^2 \cdot \hat{E}_{SCL\_Y} \geq 5 \cdot \hat{\sigma}_{P\_4} \\ 0, & \hat{R}^2 \cdot \hat{E}_{SCL\_Y} < 5 \cdot \hat{\sigma}_{P\_4} \end{cases} \quad (73)$$

Although the exemplary development of the significance statistic is based on an assumption that model residual errors were uncorrelated, normally-distributed random-variables, it has proven to be a useful statistic even for cases where the residual error is caused by some deterministic phenomenon that is not included within the scope of the model structure. The computed significance for each error parameter can be used by the update compensation algorithms to determine whether or not to update a proposed value for a particular compensation parameter relative to the existing compensation. If the significance for a parameter is zero, then the proposed value for compensation can be chosen to be the existing original value. Otherwise, it can be developed based on the parameter estimate as described below.

Additionally, the significance of the parameter estimate associated with each proposed compensation value can be graphically displayed (e.g., as meter 150 on adjust compensation page 112). This can, for example, provide the user with some additional information to aid in the decision of whether to use a proposed value for compensation.

The model structure for machine tool errors employed as specifically disclosed by example herein addresses a limited range of possibilities. Many other error types are known to exist that are not currently handled by this particular example (but which one of ordinary skill in the art could appreciate could be handled using the teachings of the present invention). Some of the unmodeled errors might be static, while others might be dynamic.

With respect to analysis of ballbar measurements, some unmodeled error types may be falsely attributed to one or more of the errors that are contained within the model structure, while other error types do not fit within the model structure and their presence results in a reduced value of the coherence statistic. Some unmodeled errors are parametric in nature (i.e., they can be represented by a limited number of parameters) while others are not suitable for parameterization. Some known machine error types that are not addressed by the structure of the machine error model of the exemplary embodiments as specifically disclosed by example herein are listed below.

| Error Description | Dynamic/ Static | False Attribution in Exemplary Model Structure? | Suitable For Parameterization? |
|---|---|---|---|
| Feedback or Mechanism Kinematics Cyclic Errors | Static | No | Yes |
| Torque Ripple Cyclic Errors | Dyn | No | Potentially |
| Complex Linear Axis Straightness Errors | Static | No | Probably not |
| Simple Axis Angular Errors (Roll, Pitch, Yaw) | Static | Potentially | Yes |
| Complex Axis Angular Errors | Static | No | Probably not |

Of the error types listed above, the simple axis angular errors may, for example, be falsely attributed as linear squareness, straightness or scale errors under the exemplary embodiments discussed herein. Simple axis angular errors refer to errors in the orientation of the machine member that vary linearly or parabolically as a function of axis position.

For example, there can be a total of nine angular error types (e.g., roll, pitch, and yaw errors for each of three linear direction axes). Each error type can be associated with an associated error amplitude parameter and two parameters associated with the location of the rotation axis (e.g., resulting in a total of 27 parameters). If both linear and parabolic varieties of these error types are present, then there can be a total of 54 possible angular error parameters. Errors of this type not only potentially effect the relative orientation of, for example, a tool tip to a workpiece, but can also create displacement errors between the tool tip and workpiece.

The displacement errors created by angular errors may appear very similar to the linear axis squareness and straightness errors contained within the assumed exemplary error model structure. This can be seen by examining FIG. 17, showing the displacement errors created by just one of the nine error types.

Figure 17:
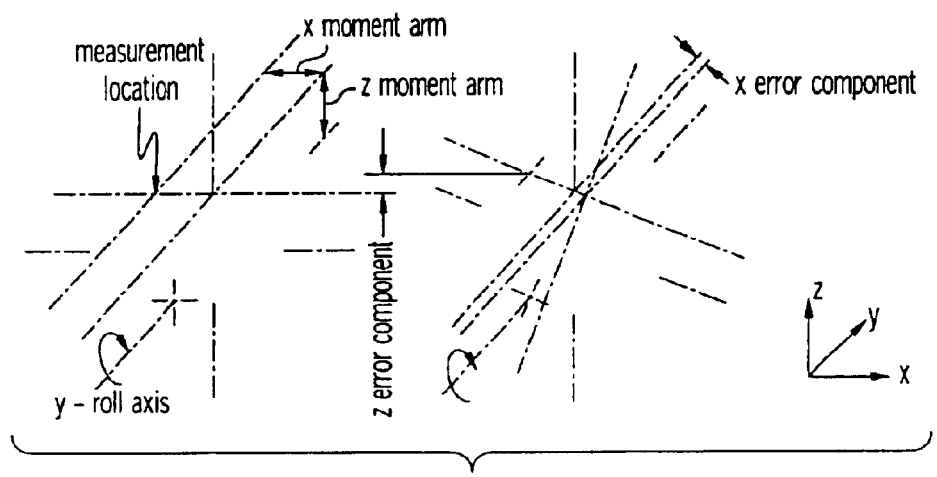
FIG. 17 is a plot illustrating an example of angular error (y-axis roll error)

Referring to FIG. 17, it can be seen that a Y-axis roll error creates a displacement error with components in the X and Z directions. The displacement error depends on the location in the machine envelope relative to the roll axis. For a ballbar measurement, the effect of the angular errors should appear to be very similar to YX squareness, YZ squareness, YX straightness, and YZ straightness errors.

Attribution of angular errors to the linear squareness, straightness, and scale error parameters is not necessarily a detrimental effect. Parameters for squareness straightness and scale error compensation developed based on displacements that originally was caused by angular errors will likely improve the accuracy of the machine as long as the machine motion is in or near the plane of the ballbar test. Any attempt to incorporate these "simple" angular errors into the assumed exemplary model structure might involve estimating error parameters by simultaneously analyzing measurement results obtained from multiple ballbar measurements in multiple machine orientation planes and in stacked parallel planes.

The A2100 control, for example, has the ability to compensate for most of the error types previously identified herein. The compensation algorithms can be parameterized in much the same way as the errors themselves, with some minor differences that will be discussed below. Typically, the compensation parameter has an inverse relationship with the error type.

For example, if the straightness error coefficient is positive, then the compensation parameter is negative. The error parameters can be estimated for the Cartesian horizontal and vertical axes within the circle plane, but the compensation is applied to a physical axis or axes that actuate motion of the logical axis that corresponds to the horizontal or vertical axis. If the test is performed with some amount of compensation active, then the estimated error parameter defines the incremental adjustment to the existing parameter.

Accordingly, an exemplary embodiment of the present invention has knowledge of the configuration of each compensation type for each physical axis involved in the motion within the circle plane. Thus, conversion of an error parameter estimate to a compensation parameter involves mapping the existing compensation from data associated to a physical axis (or axes) to the circle plane-axis (horizontal or vertical), computing the new value of compensation based on the parameter estimate for the circle-plane axis, then mapping the new compensation value to the physical axis or axes.

The discussions regarding the analysis of measured data referred to the x and y axes. The equations can be interpreted in such a way that x designates the horizontal axis and y designates the vertical axis. In this way, the equations that have been developed for x and y can be applicable to the axes in any of the machine's major planes.

The major planes can be identified by naming the horizontal axis followed by the vertical axis (e.g., XY, XZ, YZ). The equations discussed herein require no modification for the XY plane, and may be applied to, for example, the YZ plane by substituting x for y and y for z.

Unlike the other two planes, the horizontal and vertical axes of the XZ plane describe a left-handed coordinate system and, for squareness and straightness coefficients, a sign change accompanies the substitution. This plane is defined by the left-handed XZ coordinates rather than the right-handed ZX coordinates due to a previously established convention for machine tools. The discussions that follow use designators h and v for horizontal and vertical axes within the circle-plane, and p to designate the third axis perpendicular to the plane.

It has already been seen that configuration data for the physical axis that produces motion of a circle-plane axis is involved when computing an error parameter for the circle plane axis. Such a mapping from physical axis to circle-plane axis can be anticipated by equations (28) through (30) that account for the expected servo effects on the average circle radius. These equations can be used when computing the overall axis scale errors for a test involving a length-calibrated ballbar.

The aforementioned equations need knowledge of the circle plane axes values for $Kv_{nominal}$, $Kv_{adjust}$, and velocity feedforward (VFF). These parameters can be data items associated with the physical axes. The composite Kv ($Kv_{nominal}$* $Kv_{adjust}$) and the applied VFF for the circle plane axis can be stored in, for example, the test result data-file's header (the applied VFF can be the configured VFF percentage for the axis if test-setup-data's feed-mode has an apply_rate_feedforward attribute that is true and is zero otherwise). A system level assumption can be that the machine's linear axes have matched gains and VFF levels.

Ideally, values for Kv and VFF can be obtained by examining configuration data from one physical axis that actuates one of the circle-plane axes. In practice, the Kv and VFF are included for each of the circle-plane axes in the data file header. Thus, a data file header according to an exemplary embodiment of the present invention contains a $Kv_h$, a $Kv_v$, a $VFF_h$ and a $VFF_v$.

The evaluation of equations (28) through (30) uses each parameter's average value for the plane. This is considered reasonable because a significant mismatch between axes can be identified by parameter estimation, and a user would be expected to correct the situation and re-perform the test. Another complicating factor can be the possibility that a logical axis may be mapped to one or more physical axes. This situation occurs for split and slave axes.

In order to accommodate for both split and slave axes, the configuration data item for the logical axis can be obtained from the data for the first actively normal physical connection at the time of the test. This is reasonable for split axes because the configuration sets for each of the physical connections are expected to match each other and it is anticipated that compensation be applied equally to the physical axes that make up the split set. For slave axes, it is anticipated that each axis may be compensated separately. This can be accomplished by performing a separate ballbar test for each slave axis while the other slave axes are removed. Since the other slave axes have a status of removed (i.e. not normal) during the test, the data set for the first normal connection can be the appropriate choice.

Similar considerations as those discussed for Kv and VFF can be made when obtaining the existing compensation for an axis. As mentioned, the development of proposed modification to compensation based on a ballbar test measurement can include: 1) the estimate of the parametric error; and 2) the values for compensation parameters that were active in the machine at the time the test was performed. As with the retention of the Kv and VFF, in an exemplary embodiment, the compensation present on the machine during the test may be stored in the data file header. In an alternative embodiment, rather than store the compensation in the data file header, a unique text string, the data reference number, can be written to the file header.

The data reference number can be developed based on the time and date at the beginning of a ballbar test run. If the data reference number stored in memory for the most recent test matches the data reference number from the file header for the measurement data currently loaded into memory, then the proposed values for compensation for the circle plane of the loaded measurement can be computed based on the existing compensation parameters from the data base. Once changes to the compensation are applied, the data reference number in memory can be cleared and the display of proposed values can be terminated (the compensation values present during the test are no longer accurately represented by the current values in the database).

The existing parameters for scale, squareness, and straightness compensation from the data for the first physical connection to the logical-axis associated with the circle-plane axis can be employed as the original compensation values. This approach can be taken to accommodate both split and slave axes as described above. Once the compensation is computed, it can be applied uniformly to normal connections to the logical axis. This can be done if the exemplary embodiment described herein is the primary method for developing these compensation parameters.

Uniform application to all axes making up the split set can be a reasonable choice given that measurements of positions of individual physical axes are not performed. The same approach can be taken for backlash and windup compensation; but, in this case it is conceivable that the exemplary embodiment might detrimentally over-write values for backlash and windup that are intentionally set to different values for each axis in the split set based on a more specialized measurement. In an exemplary embodiment as described herein, however, backlash and windup compensation are typically applied uniformly to all axes in a split set based on the results of a ballbar or similar measurement of logical axis end point.

Associations between axes for straightness/squareness compensation can be based on physical axes and limited to four compensation axes per independent physical axis. The straightness/squareness compensation facility can also be used to compensate for scale errors by compensating an axis relative to itself. For a simple configuration where each linear axis (e.g., X, Y, Z) is actuated by a single physical axis, three associations for each physical axis can be sufficient to compensate each cross axis for straightness and squareness errors in the direction of the cross axis and to compensate the axis itself for scale mismatch errors.

For the case where there is one split axis actuated by two physical axes, four associations per independent axis are utilized. For example, consider a case where the x axis is a split with two physical axes, and the y and z axes are actuated by a single physical axes. Compensation relative to the x-axis position can be accomplished by associating the y and z axes to the first x connection for squareness and straightness, a third association for the first connection can be consumed in compensating for scale error, and the second connection uses just one association (to itself) to compensate for scale error. Compensation relative to the y (or z) axis consumes all available associations (e.g., each of the two physical connections to x consume one association, z consumes another, and the self-association for scale compensation consumes the fourth).

As is implied by the previous example, associations for squareness/straightness can be allocated separately from associations for scale-error. The algorithm for assigning associations attempts to create the cross-axis associations by using the first connection to logical as the independent axis. A cross axis association can be used when either squareness compensation or straightness compensation for the independent axis is enabled.

When an attempt is made to apply the proposed values of compensation, existing associations for each physical axis can be first scanned through to identify any existing associations of the type required and the parameters associated with these associations updated. If there is no existing association of the type required, a new one can be created. If all available associations for an axis are consumed, an alert can be reported instructing the user to delete any extra associations, such as those that involve a rotary axis.

Proposed values for compensation parameters are typically computed by subtracting the computed error parameter from the value for the original compensation parameter (i.e. the value of the parameter that was used to actively apply compensation during execution of the circle-test). Proposed values can be computed for the axes involved in the plane of the most recent circle test. The following equations summarize how compensation can be developed from an estimated error parameter for the horizontal or vertical axis. It should be understood that the equations are applied to each physical connection to the logical axes associated with the h or v axis for the particular circle plane.

Squareness/straightness compensation can be defined by the following four parameters: 1) the squareness comp coefficient, 2) the straightness comp coefficient, 3) the compensation origin, and 4) the compensation range. A procedure for developing the compensation parameters from the measurement results is outlined below. In the equations that describe the compensation parameters, the axes to which squareness or straightness compensation applies are identified by the subscripts where the first subscript identifies the independent axis and the second subscript identifies the dependent axis. For example, $\text{sqr\_comp}_{HV}$ is the coefficient of squareness compensation that adjusts the position of the V axis as a function of the position of the H axis.

Equation (52) provides the parameter $E_{SQR\_Hv}$ that describes the squareness error of the two axes that make up the circle plane. However, squareness compensation parameters can be available for both axes. Compensation can be applied to the vertical axis as a function of the position of the horizontal axis and compensation to the horizontal axis can be applied to the horizontal axis as a function of the vertical axis position.

For the sake of symmetry, both available compensations can be employed by equally distributing the squareness error to each available association. For the case of the XZ plane, the sign of the squareness error can be negated to account for the fact that the equation was developed for a right-handed coordinate system, but H=X, V=Z is a left handed coordinate system. The equations can be generalized for any of the three coordinate systems by defining a sign-adjust variable that is a function of the circle plane.

$$\text{sgn\_adj} = \begin{cases} +1, & XY \text{ Plane} \\ -1, & XZ \text{ Plane} \\ +1, & YZ \text{ Plane} \end{cases} \quad (74)$$

A general equation for squareness compensation adjustment is shown below.

$$\text{sqr\_comp}_{HV}^{proposed} = \text{sqr\_comp}_{HV}^{original} - \frac{1}{2}\text{sgn\_adj} \cdot E_{SQR\_HV} \quad (75)$$

$$\text{sqr\_comp}_{VH}^{proposed} = \text{sqr\_comp}_{VH}^{original} - \frac{1}{2}\text{sgn\_adj} \cdot E_{SQR\_HV}$$

When considering squareness compensation, the compensation origin can be arbitrary since it defines the location of the independent axis from which to measure displacement.

However, this same parameter can be re-used by straightness compensation and, in that case, the straightness error can be computed as if the compensation origin is equal to the independent axis coordinate of the circle center.

The proposed value for straightness compensation can be developed directly from the original value for the coefficient and the estimated straightness error if the independent axis coordinate of the circle center for the test from which the error parameters are estimated is the same (or nearly the same) as the compensation origin from the original data. The following equation, for example, may be employed. In the equation below, the sign of the estimated straightness coefficient is modified for the X axis in the XZ coordinate system.

$$\mathrm{str\_comp}_{HV}^{proposed}=\mathrm{str\_comp}_{HV}^{original}-\mathrm{sgn\_adj} \cdot E_{STR\_HV}$$

$$\mathrm{str\_comp}_{VH}^{proposed}=\mathrm{str\_comp}_{VH}^{original}-E_{STR\_VH} \quad (76)$$

Figure 18:
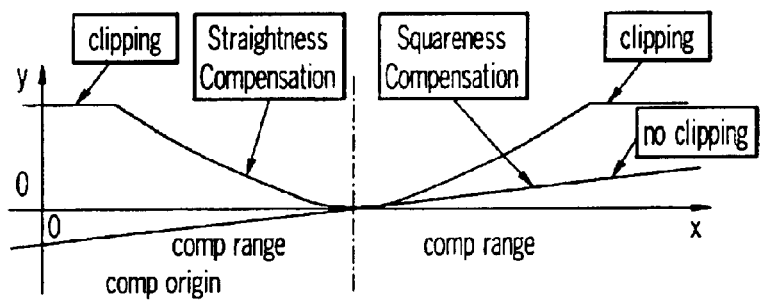
FIG. 18 is a graph illustrating clipping behavior of applied straightness compensation.

Straightness compensation limits the amount of compensation applied to be the compensation applied at a distance from the compensation origin that is equal to the compensation range. Accordingly, the compensation origin can be matched to the circle center for the recent test or, for the case of partial circles, be set to the coordinate that represents the midpoint of the axis range of motion experienced during the test. The proposed value of the compensation range can be the radius of the test circle. This "clipping" can help avoid large errors that can be introduced when compensation is extrapolated to regions outside of the range of the measurement. The clipping behavior is illustrated by FIG. 18.

If the clipping did not occur, then changes to the circle center could be accommodated by making adjustments to both squareness and straightness compensation. Given the presence of the clipping, the effect of straightness compensation present in the measured data can be removed from the data prior to performing the estimate for the parametric straightness error. The resulting estimate could then be used directly (with a possible sign adjustment) as the straightness compensation coefficient. Such a consideration can also be used for cases when the original compensation origin matches the circle center, but the radius of the circle test is greater than the original compensation range.

Another solution to the changing center problem involves having test setup validation algorithms test whether the selected values for circle center coordinates are near the compensation origin for the currently configured straightness compensation. If the circle center is significantly different from the compensation origin, or if the circle radius is significantly larger than the compensation-range, then the test setup validation can issue a message informing the user that, if the test results are to be used to develop squareness/straightness compensation, then the straightness compensation for the axis or axes whose circle center does not match the compensation origin should be disabled prior to performing the test.

A threshold to identify a significant difference between circle center coordinate and original compensation origin coordinate can be about 20% of the circle radius. Likewise, a threshold for a significant difference between the circle radius and the original compensation range can be when the circle radius is about 20% greater than the original compensation range. With these precautions in place, equation (76) may be applied directly.

Since squareness compensation varies based on the arbitrary choice of circle center, both types of compensation might be clipped or not-clipped together. The decision of whether or not to clip a compensation might be configurable for each compensation type for each association.

Scale error compensation can be implemented via, for example, the straightness/squareness compensation capability of a control (e.g., the A2100) by associating the axis to itself and populating the squareness compensation parameter with a parameter derived from the estimated value of the scale error. The straightness coefficient for the self-association can be zeroed and the enable Boolean for straightness can be set to off. Thus, the proposed value for scale compensation can be developed using the following equation.

$$\mathrm{sqr\_comp}_{HH}^{proposed}=\mathrm{sqr\_comp}_{HH}^{original}-E_{SCL\_H}, \mathrm{str\_comp}_{HH\_proposed}=0 \quad (77)$$

$$\mathrm{sqr\_comp}_{VV}^{proposed}=\mathrm{sqr\_comp}_{VV}^{original}-E_{SCL\_V}, \mathrm{str\_comp}_{VV\_proposed}^{pro}=0$$

If the ballbar is not length calibrated, then the compensation can be adjusted to account for scale mismatch (equation (24) would have been used to compute the estimate for scale error). This might be reasonable if the original value for scale compensation was developed based on a measurement with a length-calibrated ballbar. However, if the scale error has changed significantly since the development of the original compensation, or if the scale error compensation is originally developed with the ballbar length not-calibrated, then the scale error compensation can probably only adjust for mismatches between axes within the plane.

As tests (with the ballbar not length-calibrated) are performed for multiple planes, the scale mismatch compensation that worked for one plane will be detrimentally overwritten by the scale mismatch compensation for another plane. In such a situation, the order in which the per-machine-plane tests are arranged can affect the value for an axis' scale compensation, and a compensation coefficient that corrects a mismatch in one plane can conceivably aggravate a mismatch in the other plane. This problem should not occur when all tests are performed with a length calibrated ballbar, as the result for an axis's proposed value for scale error compensation should be the same (correct value) for tests performed in either of the two machine major-planes in which the axis lies. The associated exemplary embodiment helps the user avoid this situation by issuing a warning message when the user attempts to copy the proposed values for scale error compensation to the active values column if the proposed value was developed based on measurements where the ballbar was not length calibrated.

Straightness compensation could be used in a self-association to correct for screw-pitch errors that are not constant everywhere on the screw, but where the pitch error increases in an approximate linear relationship to screw position. If such cases are found on actual machine tools, then augmentation of the existing capability could include a parameterized variable pitch error using the straightness coefficient.

Backlash compensation and windup compensation are both represented as positive numbers for positive windup and backlash errors.

backlash_comp$_H^{proposed}$=backlash_comp$_H^{original}$+$E_{backlash\_H}$ backlash_comp$_V^{proposed}$=backlash_comp$_V^{original}$+$E_{backlash\_V}$ (78)

windup_comp$_H^{proposed}$=windup_comp$_H^{original}$+$E_{windup\_H}$ windup_comp$_V^{proposed}$=windup_$_{compV}^{original}$+$E_{windup\_V}$ (79)

Both types of lost motion are errors that occur on the axis. They are not expected to vary with circle plane and can be compensated per-axis. It is expected that the estimated value for axis lost motion should be the same regardless of which of the two available circle-planes was used to perform the measurement.

One capability that can be provided by an exemplary embodiment of the present invention could involve ensuring that a user constructs a set of test conditions that are within the capability of the machine and capable of providing usable results. For example, validity checks can be performed on user-entered test-setup parameters and combinations of parameters. These validity checks were previously summarized in the previous discussion regarding test setup page 10.

Exemplary equations employed for these checks are herein provided. A test for the validity of measured data that compares the total test time to the expected test time is also described here. The data validity test can be very similar to the overshoot arc length test and a design for a single utility (e.g., software) employed by both tests is presented.

In an exemplary embodiment, a circle center is within the range limits of the machine axes. The test setup displacement coordinates can be specified using the machine coordinates for the axis. The test-setup configuration values for circle center can be directly compared to the machine configuration data for axis range limits.

If the following equations are true, the validity test should pass. $X_{min}$ designates the lower limit for the x-axis range (LOW_LIMT[X]), $X_{max}$ designates the high limit for the x-axis range (HIGH_LIMT[X]), etc.

$X_{min} \leq X_{CIRC\_CTR} \leq X_{max}$ $Y_{min} \leq Y_{CIRC\_CTR} \leq Y_{max}$ $Z_{min} \leq Z_{CIRC\_CTR} \leq Z_{max}$ (80)

As previously described with respect to the discussion regarding test setup page 10, the circle radius can be less than or equal to the ballbar length, but not so small that motion in the direction of the axis perpendicular to the circle plane contributes significantly to the ballbar measurement. In an exemplary embodiment, a change in ballbar length dL, relative to a change in position in the direction of the perpendicular axis dP can be chosen that is less than half the change in ballbar length relative to a change in position along a radial with the circle plane dR.

$$\left(\frac{dL}{dP} \leq \frac{1}{2}\frac{dL}{dR}\right) \Rightarrow \left(P \leq \frac{1}{2}R\right) \quad (81)$$

The previous equation specifies a maximum cone angle $\phi_{max}$.

$$\tan(\phi_{max}) = \left.\frac{P - P_{CTR}}{R}\right|_{max} = \frac{1}{2} \Rightarrow \phi_{max} = \tan^{-1}\left(\frac{1}{2}\right) = 22.6° \quad (82)$$

A circle radius relative to the ballbar length based on the maximum cone angle is shown below.

$L \cos(\phi_{max}=22.6°) \leq R \rightarrow 0.9 \cdot L \leq R$ (83)

Finally a requirement for circle radius can be:

$0.9 \cdot L_{BALLBAR} \leq R_{CIRCLE} \leq L_{BALLBAR}$ (84)

Since this check involves knowledge of the ballbar radius, in an exemplary embodiment, it is not performed until the user attempts to apply a proposed set of test configuration parameters. In an exemplary embodiment, the ballbar length is not subject to a validity test because its configured value is limited to a finite number of selections in a drop-down menu uicontrol (described further herein). The values in the drop down menu can be nominal lengths of the ballbar, plus the available extension bars and combinations of extension bars.

A previous discussion regarding equations for simultaneous estimation of the error parameters describes how the parameter estimation algorithm distinguishes one error type from another based on the excitation of the measurement. The excitation increases with the length of the data arc, but can also depend on the angle of the data arc start point. A test of whether the data arc is long enough to provide sufficient excitation for uniquely identifying the various error parameters can be to compute the excitation parameter using equation (56). In an exemplary embodiment, the excitation is required to exceed the value for a 180° data arc starting at an angle of 45° relative to the horizontal axis. The excitation can be computed by constructing an [A]-matrix from equations 52 and 53 with clockwise and counter-clockwise data covering the same data-arc range. The condition for a data arc and start angle providing sufficient excitation is represented by equation (85) below. The angular spacing used to construct the [A]-matrix in equation (85) can be the greater of 1° or the predicted angle change based on federate and radius as represented by equation (86) below.

Excitation ([A]($\theta_{data\_start}$, $\theta_{data\_range}$, $\Delta\theta$))$\geq$Excitation ([A](45°, 180°,1°)) (85)

where: $\Delta\theta = \max\left(\frac{1}{f_{sample}} \cdot \frac{180}{\pi} \cdot \frac{Feedrate}{60 \cdot R_{CIRCLE}}, 1.0°\right)$ (86)

In an exemplary embodiment, tests for ensuring that the circle test will not cause an axis range limit to be exceeded simultaneously consider the circle center, circle radius, ballbar length, start angle of acceleration arc, and total arc length. An exemplary test is designed to ensure that the total circle from the beginning of the acceleration overshoot arc to the end of the deceleration overshoot arc nowhere involves exceeding a range limit of an axis. If the test discovers that a range limit might be exceeded, changes to the circle center and/or circle radius bringing the test to within range can be proposed.

A constant height of the perpendicular P axis can be checked. The test setup parameter for the P coordinate of the circle center is not really the circle center—it is the P coordinate of the center ball. In an exemplary embodiment, the perpendicular coordinate of the true circle center is located at or "above" the entered value for circle center in test setup data. Thus, in the following equation, the square root is added to the configured circle center (not subtracted).

$$P_{mm} \leq (P_{CIRC\_CTR} + \sqrt{L_{ballbar}^2 - R_{circle}^2}) \leq P_{max} \quad (87)$$

Once the perpendicular axis position is found to be within range, the maximum and minimum axis locations during the circular motion can be determined. These values can be evaluated by first determining the bounds for a circle whose total arc (acc-overshoot-arc+data-arc+dec-overshoot-arc) covers 360°, and then refining these bounds by considering the specific case if the total arc is less than 360°. The bounds can be initially computed for circle center coordinates of (0,0), and the actual coordinates can be considered after having made any refinements for a partial circle.

$$H_{max} = R_{circle}, \; H_{min} = -R_{circle}, \; V_{max} = R_{circle}, \; V_{mm} = -R_{circle} \quad (88)$$

If the total circle (overshoot-arcs+data-arc) spans an arc of 360°, then there need not be any additional refinement of axis bounds. Otherwise, the next step can be to identify the quadrant in which the arc begins and the quadrant in which the arc ends, identify any quadrant boundaries that are crossed, and re-evaluate the bounds that correspond to quadrant boundaries that are not crossed. This process might not easily be represented by a single equation since it involves a large degree of logic and unique handling for each of the 16 possible combinations of start-quadrant and end quadrant according to an exemplary embodiment. The start and end quadrants can be determined by establishing the unit vector from circle center to acc-arc-start point and the unit vector from circle center to dec-arc-stop point.

$$\hat{u}_{start} = \begin{Bmatrix} \cos(\theta_{data\_start} - \theta_{overshoot}) \\ \sin(\theta_{data\_start} - \theta_{overshoot}) \end{Bmatrix}, \quad (89)$$

$$\hat{u}_{end} = \begin{Bmatrix} \cos(\theta_{data\_start} + \theta_{data\_length} + \theta_{overshoot}) \\ \sin(\theta_{data\_start} + \theta_{data\_length} + \theta_{overshoot}) \end{Bmatrix}$$

The start and end quadrants can be determined from the unit vectors as follows:

$$Q_{start} = \begin{cases} I, \; u_{start}^H > 0, \; u_{start}^V \geq 0 \\ II, \; u_{start}^H \leq 0, \; u_{start}^V > 0 \\ III, \; u_{start}^H < 0, \; u_{start}^V \leq 0 \\ IV, \; u_{start}^H \geq 0, \; u_{start}^V < 0 \end{cases}, \; Q_{end} = \begin{cases} I, \; u_{end}^H > 0, \; u_{end}^V \geq 0 \\ II, \; u_{end}^H \leq 0, \; u_{end}^V > 0 \\ III, \; u_{end}^H < 0, \; u_{end}^V \leq 0 \\ IV, \; u_{end}^H \geq 0, \; u_{end}^V < 0 \end{cases} \quad (90)$$

Figure 19:
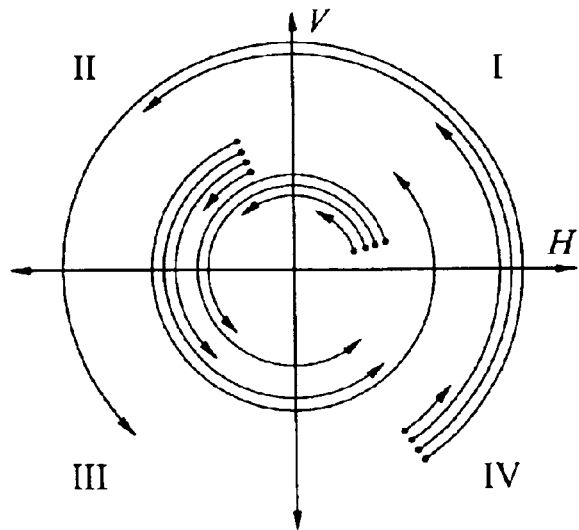
FIG. 19 is a graph illustrating maximum and minimum axis deflection based on start and end quadrant according to an exemplary embodiment of the present invention.

The maximum and minimum axis displacements can be refined based on the particular combination of start quadrant and end quadrant for each of the 16 combinations shown in FIG. 19. Exemplary equations for each combination are provided below.

$$\begin{cases}
Q_{start} = I \begin{cases}
Q_{end} = I \; \& \; (u_{start}^H > u_{end}^H) & : \; H_{max} = R \cdot u_{start}^H \quad H_{min} = R \cdot u_{end}^H \quad V_{max} = R \cdot u_{end}^V \quad V_{min} = R \cdot u_{start}^V \\
Q_{end} = II & : \; H_{max} = R \cdot u_{start}^H \quad H_{min} = R \cdot u_{end}^H \quad V_{max} = R \quad V_{min} = R \cdot \{u_{start}^V, u_{end}^V\}_{MIN} \\
Q_{end} = III & : \; H_{max} = R \cdot u_{start}^H \quad H_{min} = -R \quad V_{max} = R \quad V_{min} = R \cdot u_{end}^V \\
Q_{end} = IV & : \; H_{max} = R \cdot \{u_{start}^H, u_{end}^H\}_{MAX} \quad H_{min} = -R \quad V_{max} = R \quad V_{min} = -R
\end{cases} \\
Q_{start} = II \begin{cases}
Q_{end} = I & : \; H_{max} = R \quad H_{min} = -R \quad V_{max} = R \cdot \{u_{start}^V, u_{end}^V\}_{MAX} \\
Q_{end} = II \; \& \; (u_{start}^V > u_{end}^V) & : \; H_{max} = R \cdot u_{start}^H \quad H_{min} = R \cdot u_{end}^H \quad V_{max} = R \cdot u_{start}^V \quad V_{min} = R \cdot u_{end}^V \\
Q_{end} = III & : \; H_{max} = R \cdot \{u_{start}^H, u_{end}^H\}_{MAX} \quad H_{min} = -R \quad V_{max} = R \cdot u_{start}^V \quad V_{min} = R \cdot u_{end}^V \\
Q_{end} = IV & : \; H_{max} = R \cdot u_{end}^H \quad H_{min} = -R \quad V_{max} = R \cdot u_{start}^V \quad V_{min} = -R
\end{cases} \\
Q_{start} = III \begin{cases}
Q_{end} = I & : \; H_{max} = R \quad H_{min} = R \cdot u_{start}^H \quad V_{max} = R \cdot u_{end}^V \quad V_{min} = -R \\
Q_{end} = II & : \; H_{max} = R \quad H_{min} = R \cdot \{u_{start}^H, u_{end}^H\}_{MIN} \quad V_{max} = R \quad V_{min} = -R \\
Q_{end} = III \; \& \; (u_{start}^V > u_{end}^V) & : \; H_{max} = R \cdot u_{end}^H \quad H_{min} = R \cdot u_{start}^H \quad V_{max} = R \cdot u_{start}^V \quad V_{min} = R \cdot u_{end}^V \\
Q_{end} = IV & : \; H_{max} = R \cdot u_{end}^H \quad H_{min} = R \cdot u_{start}^H \quad V_{max} = R \cdot \{u_{start}^V, u_{end}^V\}_{MAX} \quad V_{min} = -R
\end{cases} \\
Q_{start} = IV \begin{cases}
Q_{end} = I & : \; H_{max} = R \quad H_{min} = R \cdot \{u_{start}^H, u_{end}^H\}_{MIN} \quad V_{max} = R \cdot u_{end}^V \quad V_{min} = R \cdot u_{start}^V \\
Q_{end} = II & : \; H_{max} = R \quad H_{min} = R \cdot u_{end}^H \quad V_{max} = R \quad V_{min} = R \cdot u_{start}^V \\
Q_{end} = III & : \; H_{max} = R \quad H_{min} = -R \quad V_{max} = R \quad V_{min} = R \cdot \{u_{start}^V, u_{end}^V\}_{MIN} \\
Q_{end} = IV \; \& \; (u_{start}^H < u_{end}^H) & : \; H_{max} = R \cdot u_{end}^H \quad H_{min} = R \cdot u_{start}^H \quad V_{max} = R \cdot u_{end}^V \quad V_{min} = R \cdot u_{start}^V
\end{cases}
\end{cases} \quad (91)$$

After evaluation of the equations from the appropriate row above, the circle axis ranges can be tested against the available machine axis range to determine whether the machine envelope is large enough to accommodate the specified circle. If the machine is not large enough, and a change to the center coordinates can bring the circle within the machine envelope, a proposed change to the center coordinate can be provided. The process can be represented by the following pseudo-code for the case of the H axis—an analogous procedure can be implemented for the V axis.

```
IF: (H_CTR + H_MAX) > HIGH_LIMIT[H] OR (H_CTR + H_MIN) < LOW_LIMIT[H]
    MESSAGE: "defined circle parameters will cause H axis to exceed a range
limit..."
    IF: (HIGH_LIMIT[H] - LOW_LIMIT[H]) < (H_MAX - H_MIN)
        MESSAGE: "chosen circle radius is too large for H axis range"
    ELSE:
        H_CTR1 = LOW_LIMIT[H] + ½(H_MAX - H_MIN)
        H_CTR2 = LOW_LIMIT[H] - ½(H_MAX - H_MIN)
        MESSAGE: "valid H axis range for circle center: {H_CTR1}<H<{H_CTR2}"
    ENDIF
ENDIF
```

The messages seen by the operator contain the appropriate axis letter associated with the H or V axis rather than the H or V as shown above. The terms inside the braces "{ }" above will contain numeric values.

Assuming that it has been established that the circle is within the machine range, then one final test can be to ensure that the position prior to an initial (e.g., 1.5 mm) feed-in and the position following a final (e.g., 1.5 mm) feed-out are also within range. These positions can be defined by the following equations.

$$\phi = \tan^{-1}\left(\frac{P - P_{CTR}}{R}\right) \quad (92)$$

$$P_{feedin} = P_{feedout} = P_{CTR} + (L_{ballbar} + 1.5)\cdot\sin(\phi) \quad (93)$$

$$H_{feedin} = H_{CTR} + (L_{ballbar} + 1.5)\cdot\cos(\phi)\cdot\cos(\theta_{data\_start} - \theta_{overshoot}) \quad (94)$$

$$V_{feedin} = V_{CTR} + (L_{ballbar} + 1.5)\cdot\cos(\phi)\cdot\sin(\theta_{data\_start} - \theta_{overshoot}) \quad (95)$$

$$H_{feedout} = H_{CTR} + (L_{ballbar} + 1.5)\cdot\cos(\phi)\cdot\cos(\theta_{data\_start} + \theta_{data\_length} + \theta_{overshoot}) \quad (96)$$

$$V_{feedout} = V_{CTR} + (L_{ballbar} + 1.5)\cdot\cos(\phi)\cdot\sin(\theta_{data\_start} + \theta_{data\_length} + \theta_{overshoot}) \quad (97)$$

If one of these coordinates is outside of the associated axis' range limit, then the validity check can issue a warning to inform the user of the situation.

A check for sufficient overshoot arc length can be used to ensure that: 1) the acceleration overshoot arc is large enough to allow the path speed to attain the programmed feedrate during the acceleration from the speed at the end of the initial feed in; and 2) the deceleration overshoot arc is long enough such that deceleration to the speed prior to the final feed-out move begins some time during the deceleration arc—not during the data arc. The test for the overshoot arc length can consider the programmed feedrate, the circle radius, the data arc start and end angles, the control's velocity algorithms, and the machine configuration parameters for the axes and path rates. An exemplary embodiment of the present invention can also include the ability to predict a distance consumed to change speed from the feedrate at the end of the feed-in to the programmed feedrate and a distance to change speed from the programmed feedrate to the feedrate just before the final feed-out move.

In one embodiment, such checks can be performed through off-line emulation of the part program (or parts thereof). For example, the execution of the entire part program (e.g., feed-in, acceleration overshoot arc, data arc, deceleration overshoot arc, and feed-out) could be emulated and analyzed to determine if the aforementioned conditions are met. In one such embodiment, for example, a velocity versus cumulative distance traveled profile generated by the emulation could be analyzed to ensure such conditions are met (velocity versus time and cumulative distance traveled versus time profiles could also be used). For example, the velocity at the cumulative distances that represent the beginning and ending of the data arc could be analyzed to determine if they are at the full programmed feedrate. Moreover, such profiles (e.g., a cumulative distance traveled versus time profile) could also be analyzed to estimate the total test time (e.g., by tagging data points corresponding to expected cumulative distances for the feed-in and feed-out triggers) and data arc time (e.g., tagging data points corresponding to cumulative distances representing the beginning and end of the data arc).

Alternatively, as most of the calculations in such an emulation will be during the data arc (a full feedrate portion), and are therefore unnecessary, such checks could be performed by emulating the execution of selected portions of the part program. For example, execution of the part program could be emulated from just prior to the feed-in move until the target feedrate is achieved. The corresponding cumulative distance traveled could be analyzed to determine if it is less than the cumulative distance that represents the beginning of the data arc (indicating that the acceleration overshoot arc should be sufficient). Moreover, a data point corresponding to such a distance could be tagged and the emulated execution continued until the end of the acceleration overshoot arc is reached, wherein that data point is also tagged and can be used to determine the total time to perform the acceleration overshoot arc (which could be used with respect to extraction of the data arc).

Through symmetry, the time for the deceleration overshoot arc can be assumed to be reasonably similar to the time for the acceleration overshoot arc. A separate check can, however, also be performed on the sufficiency of and time to perform the deceleration overshoot arc. For example, emulation (with the initial condition of full feedrate) can be started at some distance before the start of the deceleration arc (e.g., at a distance early enough before the start of the deceleration arc to reasonably assume that motion is at the full feedrate). The aforementioned assumption based on symmetry can be used to determine such a distance. The feedrate can be monitored during the emulation and a data point tagged when the feed rate first reduces. A data point corresponding to the cumulative distance associated with the beginning of the deceleration overshoot arc can also be tagged. If the feedrate started to reduce after the beginning of the deceleration overshoot arc, then the deceleration overshoot arc is sufficient.

Further according to one such embodiment, the emulation can continue running until the end of the program (the feed-out move). Accordingly, the amount of time of the deceleration overshoot arc can also be determined (e.g., from the data point indicating the beginning of the deceleration overshoot arc and a data point corresponding to feed-out move). Total test time can also be determined by, for example, adding the time for the acceleration overshoot arc, the time for the deceleration overshoot arc, and the time for the data arc (which can be determined, for example, by dividing the data arc length by the feedrate). Although separate software could be developed to perform the aforementioned emulation, in one embodiment of the present invention, a utility program can be created that calls the real time velocity manager software from the non-real time process to perform the emulation.

Data from a ballbar measurement can be stored, for example, in a disk file. Facilities for loading historic files and performing analysis on these historic files can be provided. Files can be of a format that could be defined by a ballbar manufacturer, or by the CNC manufacturer. This enables analysis of measurements taken using software from the ballbar manufacturer.

Referring by example to the Renishaw QC10 ballbar, it is a device that plugs into a serial port of a computer. An abstract interface object is used to access and control the ballbar device. This software interface provides methods for initializing the corn port, powering on the ballbar, setting the ballbar's measurement coefficients, and starting data collection. The data collection is performed in an execution thread that is a member of the process that initializes the ballbar software object. The ballbar deflection is sampled at a constant frequency (e.g., 250 Hertz). The data is copied from the serial port to a data pipe. The data is stored as floating point values that represents the signed deflection of the ballbar nominal deflection in units of mm. The pipe can retain some maximum number of measurements. The ballbar device object generates an event whenever the pipe contains new data. The ballbar device has publicly visible attributes that describe the status of the ballbar and reports any error conditions. An event is generated when the ballbar object detects an error condition.

The methods and techniques employed by an associated exemplary embodiment of the present invention to realize the execution of the ballbar measurement test as previously described with respect to, for example, run test page 30 are now further described. The steps for performing the physical setup and the performance of the actual measurement test can be handled by, for example, a Run-Test-Coordinator finite state machine (RTC FSM). One of the states of the RTC FSM can be the TestInProgress state, which itself can involve execution of a nested FSM called the TestInProgress (TIP) FSM. In an exemplary embodiment, the FSMs and the program execution on the CNC real time process interact in a timely manner, allowing for a smooth and responsive interface as seen by the user (not clunky and jerky).

Safeguards to ensure proper sequencing of events can be provided to account for the possibility of highly variable processor loads. These goals can be achieved by polling, for example, the CNC real-time data, invoking the RTC FSM, and letting the FSM run until it reaches its exit point. The process can be accomplished by recurrently invoking the FSM activities method from an autonomous thread within a non-real time environment. A parallel thread buffers the measurement data by moving data from the ballbar pipe into a dynamically allocated data buffer whose size is based on the estimated maximum test duration. In this way, the ballbar pipe can be kept as empty as possible in order to avoid pipe overflow and data loss. If a pipe overflow condition is detected, then the FSM transitions to an error state and generates the appropriate alert.

The RTC FSM may be invoked by, for example, an external requirement originating from the human operator or by a recurrent invocation generated as a background task associated with an exemplary embodiment of the present invention. An invocation originating from a human operator may be a user interface (UI) control callback event caused by, for example, pushing a button on the screen, an acknowledgement of an alert dialog, or by a reset event that occurs when the user changes the test-plane, changes the test-setup data, or enters a Run-Test screen for the first time. Any invocation of any FSM method requires that the client obtain a mutex to the FSM.

Figure 20:
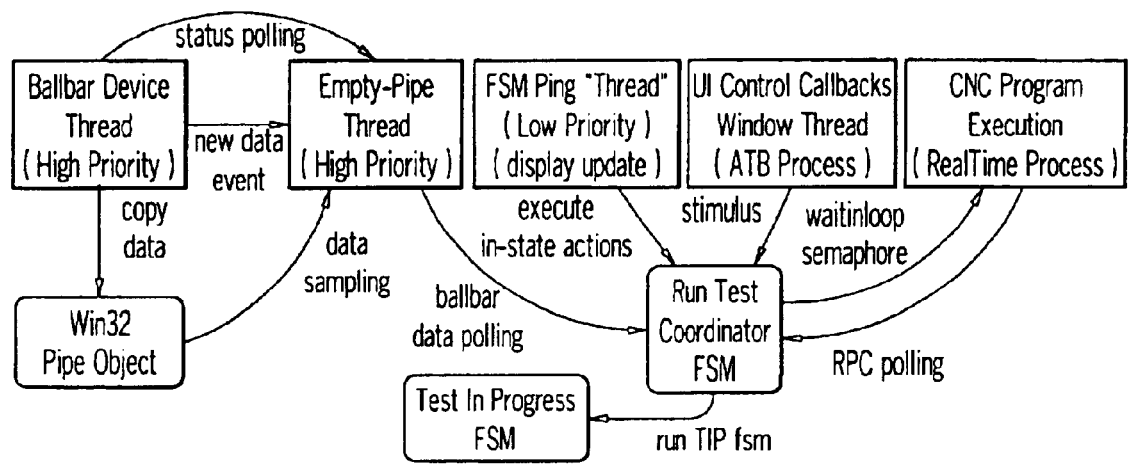
FIG. 20 is a block diagram illustrating a multi-threaded implementation of test realiziation according to an exemplary embodiment of the present invention.

The execution of the state machines can be driven by, for example, data from the real time process, events from the ballbar device, and user inputs via the user interface controls (Uicontrols) from a screen. If these data sources are developed from within multiple threads or processes, the RTC FSM can be designed to run within a multi-threaded environment. Threads/processes involved in an exemplary test realization are described by FIG. 20, which indicates that five threads/processes can be involved in test realization, including:

1. Ballbar Device Thread—an autonomous thread running under the OS (e.g., Windows) that involves collecting data from the ballbar via the serial port, processing the data, and copying the measurement to, for example, a pipe object. For example, the ballbar device software object provided by Renishaw furnishes the interface for establishing this thread and reporting the ballbar status.

2. Empty Pipe Thread—a high priority thread running under the OS that copies data from the pipe into a data buffer of dynamically allocated memory whose length can be based on the anticipated test duration. This thread empties the pipe when it receives an event signal from the ballbar device that new data is present in the pipe. The data can be stored in, for example, a buffer object: "resamp_pipe_buffer." This data can be accessed by the RTC FSM when evaluating state transition stimulus conditions. This thread may also invoke the RTC FSM when certain triggering conditions are detected. These triggering conditions are the ballbar entering the measurement range from the fully extended position, entering the fully extended position from the measurement range, and entering the fully contracted position. The full measurement data-set can be accessed when performing data analysis (e.g., curve fitting).

3. FSM Ping Thread—the recurrent invocation of the state activities method of the RTC FSM. The invocations originate from the user interface display. The interval between attempted recurrent invocation of the FSM can be small to keep the test moving along and the priority of this thread can be lower than that of the other threads discussed.

4. Uicontrol Thread—the thread that responds to the operator's inputs via on-screen user interface controls. Certain Uicontrol callback functions cause an invocation of the RTC FSM's respond-to-stimulus method. Access to the RTC FSM methods can be mutexed such that a request for services from the Ping Thread waits until the Uicontrol thread's request is completed and vice-versa. In an exemplary embodiment uicontrol requests are not queued; a new request replaces any existing request that is pending.

5. CNC Program Execution Process—the program execution process can be the real time autonomous process that runs under the CNC's real time OS. The run test FSM makes decisions about when and whether to perform a state transition based on data from the real time process.

A semaphore (referred to as "waitinloop") communicates with a mechanism that allows the RTC FSM to exercise a limited degree of control over the part program execution. These topics are later discussed in greater detail.

In an exemplary embodiment, all of the tasks that are not associated with the user interface's run test tab can be executed under the Uicontrol Thread.

According to one embodiment of the present invention, a nested states pattern is used. In one such embodiment, the state machine performs the state activity of the parent state and then traverses the nested states. If the need for a transition out of the parent state is detected during its state activity, no further activities of the nested states are performed.

The data from the ballbar pipe can be permanently stored in a buffer (resamp_pipe_buffer) that contains the measurements over an entire test arc. The resamp_pipe_buffer may contain lower density data than the ballbar pipe. This can be the case when ballbar pipe data is re-sampled for the purpose of controlling the size of the dynamic test data file.

Figure 21:
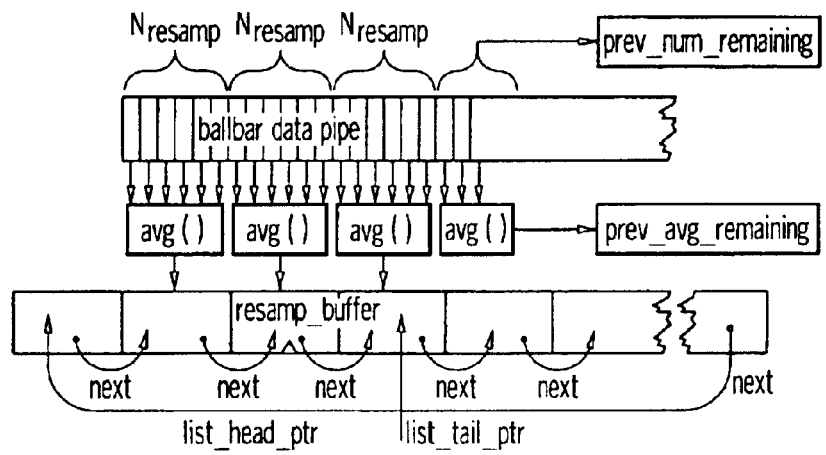
FIG. 21 is a block diagram illustrating resampling according to an exemplary embodiment of the present invention.

The lower density data can be created by performing a windowed-average over sets of $N_{resamp}$ raw data items, as illustrated in FIG. 21. The data container area of the resamp_pipe_buffer can be dynamically allocated to be capable of containing as many resampled data points as are expected to occur between the feedin and feedout events of the continuous motion test plus some amount of headroom.

Prior to each resampling operation, the number of items remaining in the ballbar data-pipe can be compared to the resampling ratio $N_{resamp}$. If the number of items remaining is less than $N_{resamp}$, the number remaining can be stored as prev_num_rem, the average of the remaining items can be computed and stored as prev_avg_rem, the ballbar pipe can be emptied of its remaining contents, and an empty_ballbar_pipe( ) method returns. The next time the empty_ballbar_pipe( ) method is invoked, and the ballbar pipe contains data, the newest item in the resamp_pipe_buffer can be computed as described by the following equation.

$$next\_sample\_value = \frac{prev\_avg\_rem * prev\_num\_rem + \sum_{i=1}^{(N_{resamp}-prev\_num\_rem)} pipedata[i]}{N_{resamp}}$$

Once the initial resampled value is computed, the resampling process continues as usual. In the special case where the pipe contains fewer than $N_{resamp}$-prev_num_rem data points, the values for prev_num_rem and prev_num_avg can be updated, the data pipe emptied and the function returns. This can be accomplished by limiting the upper range of the summation to the number of points in the pipe and the result of the computation is stored in prev_avg_rem, while the variable prev_num_rem is updated by adding the number of points in the data pipe to the existing value.

Upcoming discussions will describe how the data collection process in an exemplary embodiment begins some time in advance of the feedin move that triggers collection of data to be retained. In the time prior to this triggering event, the resamp_buffer can be populated via the resampling process as described above. If the time between the beginning of the data collection and the triggering event is exceedingly long, it can cause the resamp_buffer to fill up. If this occurs, then room for the newest data can be created by discarding the necessary amount of the oldest data.

The resamp_buffer can be implemented as a ring-buffer linked-list. As the resamp_buffer is populated, a list-head-pointer can be updated to point to the sample associated with the oldest measurement in the ring-buffer and a list-tail-pointer points to the data item in the buffer corresponding to the most recent measurements from the ballbar pipe. During the time in advance of the feedin trigger, the TIP FSM can scan the data from the most recent ballbar data pipe and check for the occurrence of the triggering event. In one embodiment the "Empty Pipe Thread" checks for trigger conditions each time it runs in response to a new data event. Once the TIP FSM detects a valid triggering event, it can retain a pointer to the buffer location associated with the event, two points are maintained—one for the most recent feedin trigger and one for the most recent feedout trigger.

Figure 22:
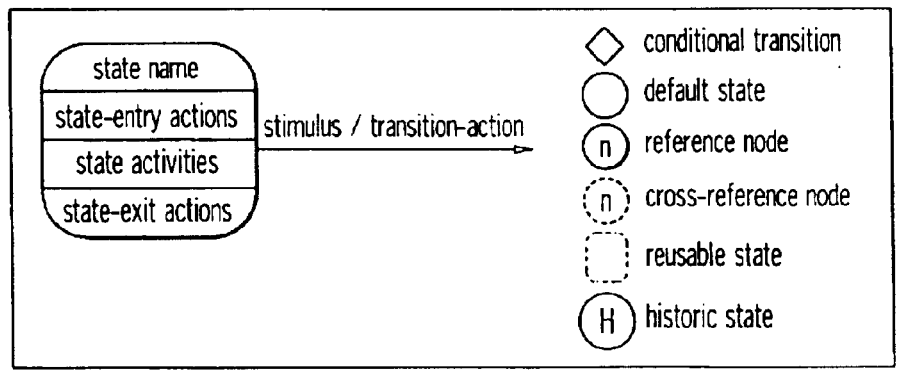
FIG. 22 is a legend explaining symbols used in finite state machine diagrams according to exemplary embodiments of the present invention.

Exemplary embodiments of RTC and TIP finite state machines are further described later herein. Some of the elements found in the FSM diagrams will now be described. As discussed herein, state machines are described by diagrams that employ the symbols depicted in FIG. 22.

Each state is represented by a rounded corner box. The box can be partitioned vertically into four sections. The top section contains the name of the state. The second section contains the state-entry actions (actions to be executed once when the state is entered via a transition).

The third section contains the state activity or in-state actions. These are the tasks associated with the current state that can be performed for each invocation of the FSM. The state activity can be performed prior to any state-transitions. For the case of nested states, the activity can be performed for both the parent and nested states, where the parent state's activity occurs first.

The bottom section of the state box contains the state-exit actions (actions to be executed once when the state is exited via a transition). Transitions from one state to another can be initiated by some stimulus condition and are represented by a line with an arrowhead that points to the state into which the system transitions. The transition line is labeled with an explanation of the stimulus followed (optionally) by a slash "/", which is followed by the transition-action (an action to perform during the transition).

Facilities for distinguishing transition-actions from state-exit-actions and state-entry-actions are included to avoid the need to duplicate state-exit-actions on each transition out of a particular state, and to avoid the need to duplicate state-entry-actions for each transition into a particular state. A diamond is used to indicate a conditional transition. A hollow circle represents the FSM's default-state (the state of the FSM just after initialization or an FSM reset event). A solid black circle with a number is used as a reference node. A solid gray circle with a number is a cross-reference to the reference node with the same number. Cross-references are used in the diagrams to avoid having too many arrows crossing.

In an exemplary embodiment, certain states are made to be relocatable to satisfy employing several states, each with identical state-entry-actions, in-state-actions, state-exit-actions, and transition stimuli. Rather than create a separate unique state for each case in which it is required, a relocatable state can be employed where the states to transition into in response to a stimulus are set up when the relocatable state is initially entered. A relocatable state is indicated in the diagram by a rounded-corner box with dashed lines rather than solid lines.

In an exemplary embodiment involving the ATB software, an ATB Run-Test page (such as run-test page 30) includes a status-bar for the display of a message that serves the dual purpose of: 1) providing prompts to the user that describe what to do next to proceed; and 2) displaying the status while the FSM is in the process of completing some task. Many of the states in the FSM execute a function setstatus( ) at state entry time. This function displays the particular message associated with the state in the status bar. The particular message is not shown in the FSM diagrams because of limited space, but the messages are provided in the text descriptions of each state.

Machine motion might be involved while preparing for and executing a ballbar test. Much of this machine motion can be accomplished by populating the control's part program MDI buffer with part program blocks. The function setmdi( ) can often be employed as a state-entry action where a character string containing the specific part program associated with the particular state is auto-generated (based on setup data) and loaded into the MDI buffer. Explanations of the state specific MDI programs created by setmdi( ) are provided with the discussions of the individual states.

The setmdi( ) action might fail to populate the MDI buffer with a new program if the buffer is locked, which can occur, for example, when: 1) the program path control-state is such that the existing program cannot be overwritten; or 2) the system is in the process of unlocking the buffer in response to a change in control state. A number of states in the RTC FSM involve an at-entry action of populating the MDI buffer with a new program. If the MDI buffer is locked at that point, then the attempt might fail.

In order to avoid this, transitions into a state with such an at-entry action can be conditional upon a Boolean condition referred to as ateop (at end of program). In the context of discussions about the ATB FSMs, ateop is "true" when an attempt to clear the MDI buffer by invoking setmdi( ) with a blank string is successful. The setmdi( ) action also resets the value of a waitinloop semaphore (process control data table item) for reasons discussed below.

State transitions are often the result of stimuli that indicate that the MDI program has thus-far executed beyond a certain block. The generation of these stimuli can be facilitated by including a block sequence number for each block in the auto-generated part program. The MDI program auto-generation method for a particular state provides the FSM with a collection of sequence numbers to represent specific locations in the program that have significance to the FSM. They may be used by the FSM to create a state transition stimulus when the sequence number of the block currently undergoing execution ($N_{SEQ}$) equals or exceeds one of these values. $N_{SEQ}$ is the notation used herein to represent the system name for the sequence number of the part program block currently undergoing execution.

Within the context of the RTC FSM, the state transitions typically follow a pattern from a waiting-to-execute-mdi state to an executing-mdi state, to an instance of a WaitCycCompl state (described later herein), to a new waiting-to-execute state, etc. The condition $N_{SEQ} \geq N_{START}$ can be used to generate a transition out of a waiting-to-execute state to an executing state. The transition out of the executing state typically occurs when $N_{SEQ} \geq N_{STOP}$.

The transition out of the executing state typically enters a WaitCycCompl state, which waits for the control-state to be ateop and for the MDI buffer to become unlocked so that it may be populated with program blocks upon entry of the next waiting-to-execute state. Within the context of the TIP FSM, a list of sequence numbers can be generated during part program action where the significance of each sequence number is understood by the FSM since the program is created by the FSM. The execution of the part program block that follows a given sequence number can be used to stimulate transitions within the TIP FSM as the circular motion part program progresses.

Synchronization of the state of the FSM in response to the state of the part program can be accomplished using sequence numbers $N_{SEQ}$ as described above. In certain instances, the realization of the ballbar test involves synchronizing the part program execution to the FSM state. One such example is now described.

In an exemplary embodiment, when the state of the FSM transitions due to a condition $N_{SEQ} \geq N_{START}$, the part program, at some point, suspends and allows the FSM to complete its transition. Otherwise, the program execution could proceed to completion, reset $N_{SEQ}$ to zero and cause the FSM to be stuck waiting for a $N_{SEQ} \geq N_{STOP}$ stimulus condition that has already occurred and vanished. This situation can be avoided by causing the part program execution to wait for the FSM to catch up by employing, for example, a waitinloop mechanism.

The waitinloop can be accomplished by including blocks in the auto-generated MDI programs that can cause the part program to suspend at certain points. The suspended part program may be released by the FSM (running in a separate process) by incrementing the value of a variable shared by both processes (a semaphore). In the case of the A2100 control, such variables are provided for interprocess communication and are referred to as process control variables. During program generation, infinite loops that are conditional on the value of a process control variable can be inserted at the locations within the part program where re-synchronization of the part program to the FSM is desired.

Once the state transition of the FSM is completed, it can release the "suspend" on the part program, as it is now ready to detect the stimulus conditions. An example of a sequence of part-program blocks to accomplish a suspend-loop is shown below. Code that auto generates these blocks can be employed during program auto-generation.

The release condition in the part program can be that the value of the process control data semaphore exceeds its previous value, and the release action of the FSM can be to increment the value of the semaphore. The previous value of the semaphore can be maintained in the part program context by copying the value of the process control variable to a local program variable in the block immediately following the suspend-loop, and making the condition to exit the suspend-loop that the process control data item have a value greater than that of the local variable. The value for the process control parameter can be set to zero at state machine initialization and reset if the FSM writes new blocks to the MDI buffer.

The first suspend-loop encountered in a program should function correctly because the local variable is initialized to zero when it is referenced for the first time. Referring to the code snippet below, the interrogations of CURPOS_PGM (X) can be included to create a wait-for-steady state condition to help prevent the suspend-loop from being prematurely released during part-program lookahead.

Code Snippet 1. Example Of an NC Program Blocks Suspend-loop

```
N100 [#FOO]=[$CURPOS_PGM(X)]
N100 (DO WHILE [$PROCESS_DATA(99)J]<=[#RELEASE])
N100 G4F.1
N100 [#FOO]=[$CURPOS_PGM(X)]
N100 (LOOP)
N100 [#RELEASE]=[$PROCESS_DATA(99)J]
```

The waitinloop('susp_cond') method can be invoked during part program generation to generate the conditional statement for the particular process control data table entry selected. The release method of waitinloop, indicated by waitinloop('release'), can be employed by the FSM to increase the value of the appropriate entry of the process control data. The release is usually applied from within a state where it is known from the sequence number that the program is currently in or about to enter a suspend-loop.

An additional method, waitinloop('init'), searches the process control data table for an entry whose value is zero and stores the index of the selected table entry (e.g., as an FSM property). The waitinloop('init') method can be invoked when, for example, a run-test page is entered. The value of the selected process control data table entry can be returned to zero by invoking waitinloop('restore') when the run-test page is exited. Although the previous discussion used A2100 specifics for the case of an example, the same concept with different implementation details can be employed on other CNC's with the same results.

The control state of the real time part program path is an item that can be made available to the ATB that executes on a separate non-real time process. The control state variables can be read prior to each recurrent invocation of the FSM method for in-state actions. The control state can be represented by a variable, e.g., SINC_CONTROL, that serves to enumerate the state of the program execution process.

In the current context, the control state can be used in a test to determine whether the part program is undergoing execution as a requirement for a transition stimulus. In the context of the RTC FSM, the control state can be represented as a Boolean termed incycle. In an exemplary embodiment, the incycle Boolean is "true" only if the first part program path is actively executing, is in a feedhold condition, or is stopped at end of block as in a single-block situation. The terminology poll(ctlstate) is used in the FSM diagrams as shorthand to indicate an in-state action of testing whether or not the program is in cycle as defined above.

Several states in the exemplary FSMs have transitions that can be stimulated by an event where the current state has persisted for a period of time greater than a maximum time period defined for the state. This is referred to in the FSM diagrams as a timeout condition. Transitions associated with a timeout condition typically involve generation of an alert. Timeout conditions can be detected by capturing the system clock time as one of the state's at-entry actions and subsequently, during the state activity, calculating the elapsed time since state entry and comparing it to the state's timeout_time attribute. States that have a timeout transition can also have an at-entry action of timeoutset where the time at state entry is captured and the timeout_time is specified.

A purpose of a Run Test Coordinator (RTC) FSM according to one exemplary embodiment is to automate the physical set up of, for example, a ballbar test, execute the test, collect data, save the data to a file, and perform an initial data analysis. For example, a complete test execution can involve the completion of five steps.

Once again referring to an exemplary embodiment involving the ATB software, each step can be represented by a button on the ATB Run-Test Page. Each button has an associated checkbox to indicate whether the particular step has been completed. When a button is enabled, the user may press it to perform the associated task. In certain circumstances, a button is disabled where button presses are inhibited and the button is "grayed-out" to inform the user that the task associated with the button may not be performed at that point in time.

The five buttons can appear vertically on the run-test page, such as in an order specified from top to bottom with self-descriptive labels specified. The buttons are identified in the FSM diagram by the specified integer number.

1. "Move To Center"
2. "Secure Center"
3. "Move To Start"
4. "Start Test"
5. "Save Data"

The FSM diagram uses a shorthand terminology for certain state-entry actions that pertain to the enabled/disabled status of the buttons and the checked/unchecked status of the checkboxes. The terminology enable($n_1$:$n_2$) is used to indicate that the buttons whose identifying integer are within the range of $n_1$ up to and including $n_2$ should be enabled. Similarly, disable($n_3$:$n_4$) can be used to indicate an action where buttons $n_3$ through $n_4$ should be disabled.

In one embodiment, buttons are enabled in such a way as to indicate that, if the user chooses, a previous step may be re-performed, but steps may not be skipped. As has been described in the previous discussion regarding run test page 30, in an exemplary embodiment, button presses are not required to move forward through the test sequence (e.g., they are used to repeat a step that has already been completed). A test can be indicated as having been successfully completed by causing the associated checkbox to be checked and vice-versa. This action is indicated in the FSM diagram by the notations set_compl($n_1$:$n_2$) and set_incmpl ($n_3$:$n_4$), which sets the checkboxes associated with indices $n_1$ through $n_2$ as checked and sets the checkboxes whose indices are $n_3$ through $n_4$ as unchecked.

The exemplary RTC FSM enables and disables certain uicontrols found on the run-test page as a function of the state. The following exemplary list identifies which uicontrols have their enable/disable attribute assigned by the RTC state FSM, and describes how and why they might be modified.

1. feedrate edit field—a feedrate edit field can be made available on the run-test page to allow the user to run multiple tests at multiple feedrates without having to return to a setup page each time. The feedrate edit field can be uniformly enabled as an at-entry task for RTC states except for the TestInProgress state where it is disabled. These actions are not indicated in the FSM diagram of FIG. 23 in order to save space. When the state is AtStart, the test part program has already been generated and is resident in the MDI buffer. User changes to the feedrate when the state is AtStart are accommodated by employing a process control variable in the program to represent a variable feedrate. When the state transitions into TestInProgress, the value from the feedrate edit field can be copied to the appropriate entry of the process control data table and further edits to the feedrate edit field can be disabled.

2. perform-backlash-test checkbox—the RTC FSM can determine whether or not a backlash test should be performed based on the state of the perform-backlash-test checkbox. In an exemplary embodiment, the ability for the user to change the checkbox state is disabled upon entry of the AtStart state and the TestInProgress state and is enabled upon entry of all other states. These at-entry actions are not indicated in the FSM diagram of FIG. 23 in order to conserve space. The disabling of checkbox modification at entry of AtStart and TestInProgress ensures that the state of the checkbox accurately reflects whether or not a backlash test is being performed. The test-part program can be loaded into MDI during entry into the AtStart state. In an exemplary embodiment, the part program blocks to perform the motion for the backlash test are generated only if the backlash check box is checked. Thus, in one embodiment, the user should not be allowed to change the state of the checkbox at any time while the MDI buffer contains the test part program.

3. aggregation of ballbar calibration controls—in an exemplary embodiment, ballbar length calibration may be performed or cancelled from a limited number of RTC states. The ballbar calibration process suspends execution of the RTC FSM, so it cannot be allowed to take place while the part program is in cycle or has an opportunity to go into cycle. These actions can be strictly enforced by a mechanism to be described later. The uicontrols associated with ballbar length calibration can be disabled at entry of certain states to help prevent the user from trying to perform a length calibration when it is known for certain that the machine is in-cycle. The ballbar calibration controls can be disabled upon entry of the states MovingToCenter, MovingToStart, TestInProgress, TestAbort, and WaitForCycComplete. In an exemplary embodiment, the accessibility of the ballbar calibration controls is not modified at entry of an AlertMessage state and is set to enabled at entry of the remaining states in the RTC.

Figure 23:
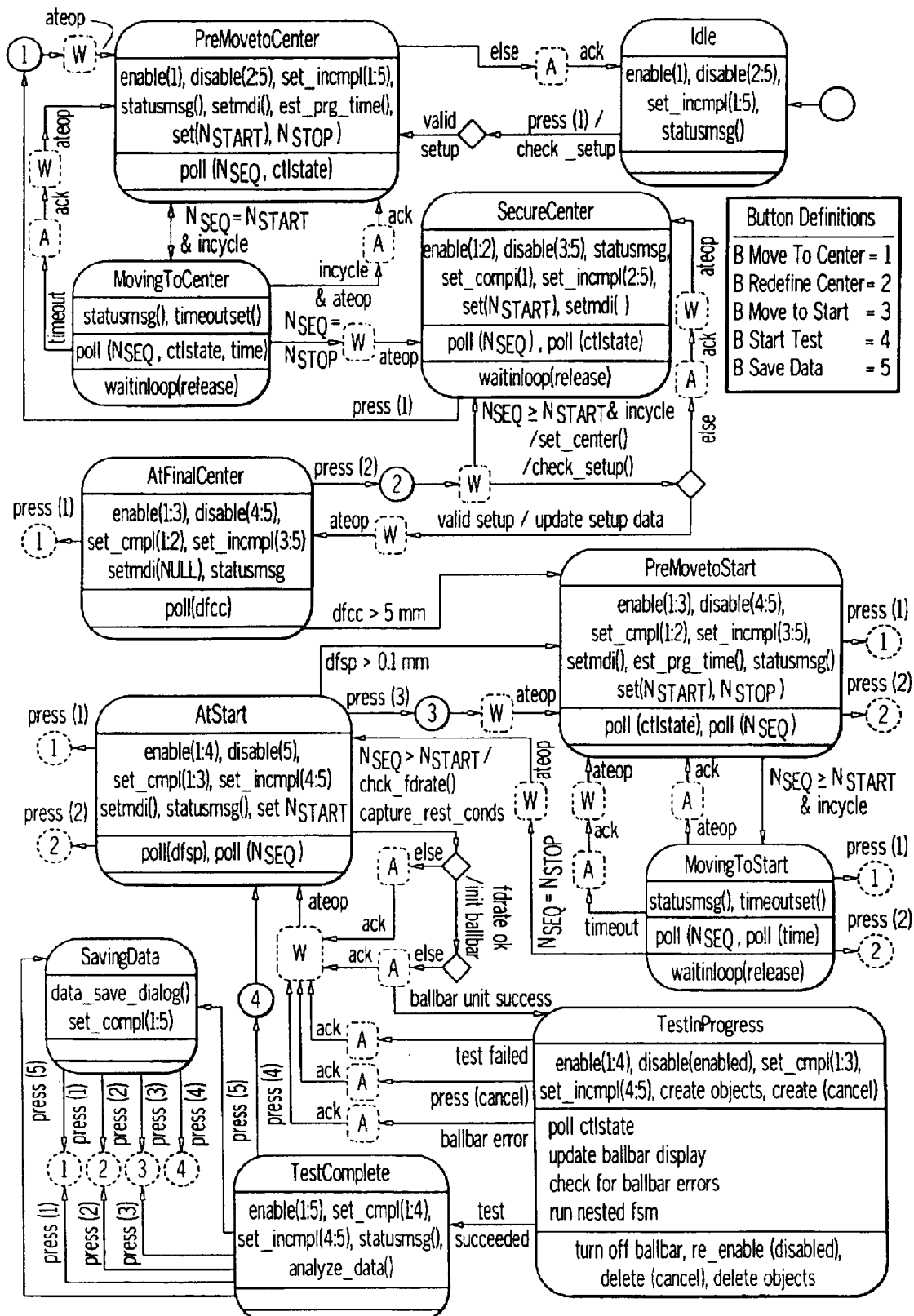
FIG. 23 is a finite state machine diagram for a run test coordinator (RTC) algorithm according to an exemplary embodiment of the present invention.

An exemplary RTC FSM diagram is depicted in FIG. 23. The purpose of a reusable AlertMessage state can be to generate a window with an alert message for the user, and to wait for the user to acknowledge the alert message. In the RTC FSM diagram of FIG. 23, instances of the reusable AlertMessage state are represented by an "A" surrounded by a dashed box.

Figure 24:
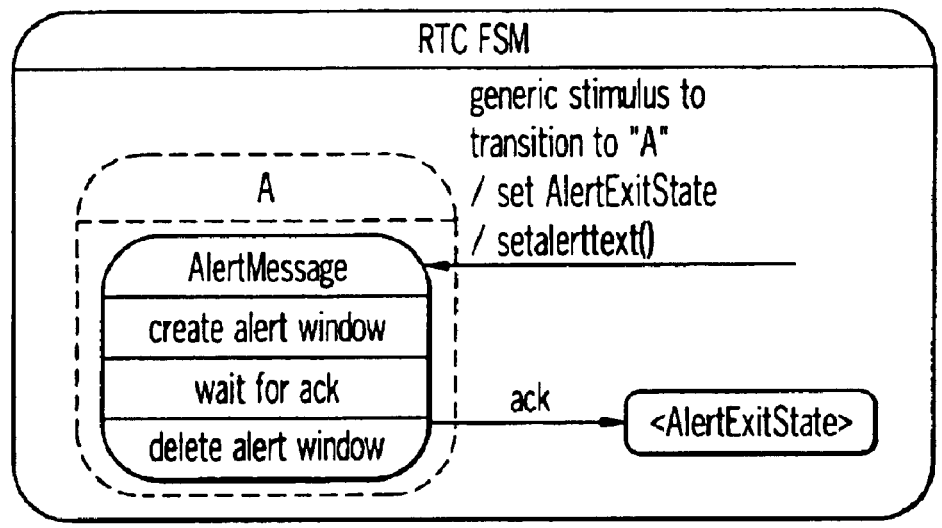
FIG. 24 is a diagram explaining a reusable "A" state according to an exemplary embodiment of the present invention.

A diagram showing the actions and transitions for an A state is provided in FIG. 24. In FIG. 24, the state labeled "GenericRTCState" represents the state from which a transition to a particular instance of AlertMessage had originated. The text to display in the alert window can be specified during the transition from GenericRTCState to AlertMessage.

Also during this transition, the AlertExitState can be specified. The AlertExitState is the state to which the FSM transitions when AlertMessage receives an acknowledge (ack) stimulus. The ack stimulus occurs when, for example, a user presses an "OK" button in the alert window. In an exemplary embodiment, the alert window is destroyed as the AlertMessage state is exited.

The RTC FSM can also employ the reusable state W, which serves the purpose of delaying a transition between two states until part program execution has completed and the MDI buffer is write accessible. The W signifies WaitCycComplete. The W states in the exemplary RTC FSM diagram actually represents a two-state subsystem with a WaitCycComplete and an A state, as shown in FIG. 25.

Figure 25:
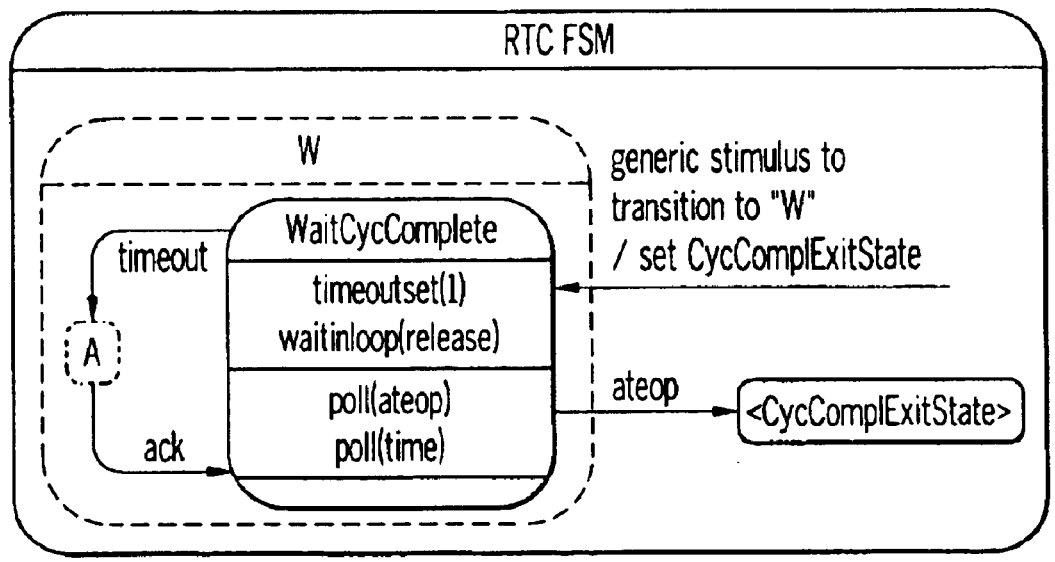
FIG. 25 is a diagram explaining a reusable "W" state according to an exemplary embodiment of the present invention.

In FIG. 25, the "Generic RTC State" indicates that WaitCycComplete is reusable and unique instances of WaitCycComplete have their own unique entry transitions. Transitions into WaitCycComplete involve specifying a CycComplExitState. The CycComplExitState dictates the state into which the system transitions when the W state is exited. The A state can be contained within the W subsystem to facilitate the generation of alerts that, for example, suggest the user Feedhold and Data Reset when the program execution does not complete in the expected time frame.

The following at-entry actions can be associated with the WaitCycComplete state:

1) timeoutset(1): the timeout_time is set to 1 second as a default. This can be sufficient because entries into WaitCycComplete are typically stimulated by a program sequence number that indicates that the program execution has reached its final suspend-loop. For instances of WaitCycComplete where a case-specific timeout_time is involved, the default may be overridden by explicitly programming a timeoutset( ) during the transition.

2) waitinloop(release): allow program execution to continue in case it is currently in a suspend-loop.

The following in-state actions can be associated with WaitCycComplete:

1) poll(ateop): check for the program not incycle and for write access to the MDI buffer.

2) poll(time): check whether the time since state entry exceeds the specified timeout_time.

There are no at-exit actions associated with the WaitCycComplete state. Meanwhile, the following can be transitions out of the WaitCycComplete state:

1) ateop: the MDI buffer is writeable and the waiting state may be exited. The state into which is transitioned is specified by the variable CycComplExitState that was defined when WaitCycComplete was initially entered.

2) timeout: if the WaitCycComplete state has persisted for a period of time considered unacceptable, the state transitions into A (AlertMessage) with an alert asking the user to manually complete program execution and unlock the MDI (such as with the message "Hit FeedHold and Data-Reset to Continue"). The state transitions back into WaitingForCycComplete when the alert is acknowledged. If the user had not data-reset, then after the timeout_time has elapsed the alert can be generated again. This can continue until the user does what is asked.

The Idle state is the default state of the exemplary RTC FSM following invocation of the ATB software. It is also the state to which the FSM is set in response to a reset event. The reset event can occur when, for example, the test-plane selection or setup data is changed. The Idle state can provide a starting point from which the user can initiate execution of the sequence of tasks involved in performing a test, such as by pressing the button labeled "Move To Center". The following at-entry actions can be associated with the Idle state:

1) enable(1), disable(2:5), set_incmpl(1:5): reset buttons and checkboxes to initial state 2) statusmsg( ): "Press 'Move To Center' to begin the test"

There are no explicit state activities or at-exit actions associated with the RTC Idle state. With respect to transitions associated with the RTC Idle state and, more particularly, a press(1)/check_setup( ) transition, a user press of, for example, a "Move To Center" button causes a transition into a conditional test. During the transition, the action check_setup( ) performs test setup validity tests, such as those previously described herein. If the setup is valid, the transition proceeds to the state PreMoveToCenter. If the setup is found to be invalid, the state transitions to an instance of the reusable state AlertMessage (the reusable state labeled A). A alert message text can be displayed, such as one derived from the list of error codes returned by check_setup( ), and used to instruct the user to switch to, for example, a setup-test page to compose a valid setup (e.g., for the given circle-plane).

PreMoveToCenter is a state in which the FSM waits for an indication (e.g., for the user to hit the cycle-start button on the machine's pendant or panel) to cause the machine axes to move to the circle center position specified in the setup data (e.g., by running a MDI program). The following at-entry actions can be associated with the PreMoveToCenter state:

1) enable(1), disable(2:5), set_incmpl(1:5): still working on completing "Move To Center" task.
2) statusmsg( ): "Ensure Safe Path To Center, Loosen Center Thumbscrew—Then Cycle Start"
3) setmdi( ): generates a sequence of machine coordinates motions to move the axes to the setup data's circle center coordinates. The feedrate employed can be the test setup data item: traverse-feedrate. The center coordinates can be approached by first programming a block to move to the horizontal-axis and vertical-axis coordinates of the circle center. This can be followed by a block to move to the perpendicular axis coordinates of the circle center. Each block in the MDI program contains a sequence number that is incremented by one relative to the sequence number of the previous block. The motion blocks can be followed by a suspend-loop. The suspend-loop can be included to prevent a situation where the real time execution of the program races ahead of the non-real time execution of the FSM and finishes the program before the FSM's in-state action that queries the sequence numbers has had a chance to execute and detect the state-transition stimulus. The code snippet shown below presents an example of a MDI program created by PreMoveToCenter's setmdi( ) method for the case of an X-Y plane circle.

Code Snippet 2. Example of MDI Program to Move to Circle Center

N1 G71 G60 G90 G45 F4000
N2 G98.1 X300 Y150
N3 G98.1 Z200
N4 [#FOO]=[$CURPOS_PGM(X)]
N4 (DO WHILE [$PROCESS_DATA(99)J]<=[#RELEASE])
N4 G4F.1
N4 [#FOO]=[$CURPOS_PGM(X)]
N4 (LOOP)
N4 [#RELEASE]=[$PROCESS_DATA(99)J]

4) set($N_{START}$, $N_{STOP}$): $N_{START}$ is set to the sequence number of the first motion block of the MDI program ($N_{START}$=2 for the example above). $N_{STOP}$ is set to be the sequence number of the suspend loop ($N_{STOP}$=4 for the example above).
5) est_prg_time( ): computes a rough estimate of the time to complete a move to center (e.g., at 100% feedrate override). This time estimate can be used to determine an order-of-magnitude value for the timeout condition for the MovingToCenter state.

Poll(ctlstate) and poll($N_{SEQ}$) state activities can be associated with the PreMoveToCenter state. Accordingly, the control state and sequence number can both be determining factors for the generation of the stimulus condition for a transition out of PreMoveToCenter. Meanwhile, there are no at-exit actions associated with the PreMoveToCenter state. Furthermore, with respect to transitions from PreMoveToCenter, and more particularly $N_{SEQ} \geq N_{START}$ & incycle, the state can transition to MovingToCenter when the user hits cycle start and the program execution reaches the triggering sequence number.

The exemplary RTC FSM is in the state MovingToCenter when the MDI program (generated by the at-entry action of the PreMoveToCenter state) is incycle. The following at-entry actions can be associated with the MovingToCenter state:

1) enable(1), disable(2:5), set incmpl(1:5): still working on completion of the "Move To Center" task.
2) statusmsg( ): "Moving To Center"
3) timeoutset: The timeout_time can be set to be five times the estimated time for the move plus, for example, thirty seconds. Meanwhile, the following state activities can be associated with the MovingToCenter state:

1) poll($N_{SEQ}$): detect stimulus for transitions toward next state
2) poll(ateop): detect stimulus for error condition where program execution terminates prematurely
3) poll(time): test for timeout condition With respect to an exemplary waitinloop('release') at-exit action associated with the MovingToCenter state, execution of the MDI program is allowed to complete since an event to stimulate transition out of MovingToCenter has occurred. The following can be transitions from MovingToCenter state:

1) $N_{SEQ} \geq N_{STOP}$: when the sequence number exceeds $N_{STOP}$, the motion toward the center has completed and the state transitions to the state "W" in the direction towards SecureCenter. The W state acts as an intermediary to ensure that the MDI buffer is unlocked (i.e., eop=="true") before attempting a setmdi( ) upon entry of the SecureCenter state.
2) ateop: This condition might occur if the user hits feedhold followed by data reset. This condition stimulates a transition to the reusable AlertMessage state in the direction of PreMoveToCenter. The text for this particular transition can be "Motion Toward Center Ended Prematurely: Press 'OK' To Continue." When the user hits the OK button in the alert window, an acknowledge or ack stimulus can be created, and the state transitions to PreMoveToCenter (where the user has a new opportunity to complete the task of moving to the center).
3) timeout: if the timeout_time is exceeded, a timeout stimulus can cause a transition toward an A state in the direction of PreMoveToCenter. The alert message created during this transition can contain the following text: "The move to circle center did not complete in a reasonable period of time: hit feed-hold and data reset to continue." An acknowledge of this alert can cause a transition toward a W state before arriving at PreMoveToCenter.

A purpose of a Secure Center state can be to provide the user with an opportunity to adjust the coordinates of the circle center relative to the coordinates specified in setup data. For example, the user can be instructed to adjust the axes positions by power feeding or handwheeling and/or to adjust the location of the ballbar center fixture on the table until the magnetic cup picks up the center ball. If the user wishes for the machine to return to the coordinates of the circle center as defined in setup data, the "Move To Center" button may be pressed. Once the final center is correctly established, the user can tighten the setscrew of the center fixture and hit cycle start to cause the FSM to capture the current machine coordinates of the axes and transition to the next state.

Actions of an exemplary FSM in this case could include correctly updating the displays, detecting and responding to the cycle start, or detecting and responding to a press of the "Move To Center" button, which might be the only button enabled. The cycle-start can be detected in circumstances where the MDI buffer contains a program that consists of just a suspend-loop. When the FSM detects that the program is incycle and has reached the sequence number of the suspend-loop, the state can transition to a W state while simultaneously issuing a waitinloop(release). Additional description is found in the following discussions of exemplary actions and transitions.

The following can be state activity associated with the SecureCenter state:

1) enable(1:2), disable(3:5), set_compl(1), set_incmpl (2:5): the move to center task is now complete. In an exemplary embodiment, only the "Move To Center" button is enabled to allow the user to return to the current active values for circle center coordinates.
2) statusmsg( ): "Use Handwheel To Locate Ball In Magnetic Cup/n Tighten Screw, Then Cycle Start"
3) setmdi( ): The program loaded into the MDI buffer can simply be a suspend-loop, such as the one in Code Snippet 1 where each block in the program has the same sequence number.
4) set $N_{START}$. Since each block in the MDI program has the same sequence number, $N_{START}$ can be set to this value.

Meanwhile, the following in-state actions can be associated with the SecureCenter state:

1) poll($N_{SEQ}$): test for partial condition for transition stimulus
2) poll(ctlstate): test for partial condition for transition stimulus At-exit actions associated with the SecureCenter state include waitinloop(release) where the waitinloop semaphore can be set to release regardless of which exit transition is taken. Meanwhile, transitions From SecureCenter can include the following:

1) $N_{SEQ} \geq N_{START}$ & incycle: When execution of the MDI program has begun, the state transitions to a conditional transition node during which the current axis positions (in machine coordinates) can be captured and assigned to the active circle center coordinates for use in the upcoming test. In an exemplary embodiment, the permanently stored circle center coordinates are not modified by this process. The conditional transition node performs a check_setup( ) validity test, as previously described with respect to the discussion regarding the maximum axis range for a circle within machine limits, to assure that, given the modified center coordinates, the machine envelope is still able to accommodate the circle test. If the test fails, then the state can transition to an AlertMessage state on its way back towards SecureCenter. The alert specified during such a transition can indicate that the user's modification of the center resulted in a set of test conditions that cannot be accommodated by the machine and specify an acceptable range of circle center coordinates. The AlertExitState in this case is an instance of the WaitCycComplete state to ensure that the MDI buffer is writeable upon re-entry of the SecureCenter state. If the validity test is successful, then the state transitions into an instance of WaitCycCompl where the WaitCycComplExitState is set to AtFinalCenter.
2) press(1): If the user presses the "Move To Center" button, then the state transitions back towards PreMoveToCenter, but first enters a WaitCycCompl state. In FIG. 23, the transition enters reference node 1. This is depicted for the sake of being able to cross reference all transitions into PreMoveToCenter resulting from a press of button 1, and the actual FSM implementation does not make use of a node 1 state.

The AtFinalCenter state can create an opportunity for a user to, for example, handwheel or power feed the axes to bring the magnetic cup off of the center ball to a safe position (e.g., prior to a move to the start position). A clearance move is not included as part of the exemplary program to move to start position as the FSM in this embodiment does not know the orientation vector of the magnetic cup. Depending on the setup, the magnetic cup orientation vector may, for example, be parallel to the tool vector, may be perpendicular to the circle plane, or may be at some arbitrary angle. The exemplary AtFinalCenter state transitions to PreMoveToStart when the FSM detects that the user has fed the axes a safe distance from the circle center. The at-entry actions associated with the AtFinalCenter state can include:

1) enable(1:3), disable(4:5), set-compl(1:2), set-incmpl (3:5): At this point, the tasks of "Move To Center" and "Secure Center" are complete, but all others are considered incomplete. The corresponding buttons can be enabled to allow the user to choose a new center.
2) statusmsg( ): "Use power feed or handwheel to move the magnetic cup a safe distance at least five millimeters away from the center ball"
3) setmdi( ): The MDI buffer can be loaded with an empty string to assure no consequences in case the user hits cycle-start.

Meanwhile, the state activity associated with the AtFinalCenter state include poll(dfcc). With respect to this action, the distance from circle center (dfcc) can be computed from the instantaneous axis positions and the active value for machine coordinates of the circle center. The instantaneous axis position commands and following errors can be sampled from the real time process prior to each recurrent invocation of the current state's activities method.

The derived values for machine position can also be used to update the displays on a run-test page prior to each recurrent FSM invocation. The value for dfcc can be computed for each invocation of the in-state action method by evaluating the square root of the sum of the squares of the individual axis distances from the active circle center.

$$dfcc = \sqrt{(X(t) - X_{\text{circ\_ctr}})^2 + (Y(t) - Y_{\text{circ\_ctr}})^2 + (Y(t) - Y_{\text{circ\_ctr}})^2} \quad (98)$$

In an exemplary embodiment, there are no at-exit actions associated with the AtFinalCenter state. The following can be transitions from the AtFinalCenter state:

1) dfcc>5 mm: When the axes have moved, for example, at least about five millimeters away from the circle center, the state transitions to PreMoveToStart. If necessary, the user may continue to feed the axes further from the center ball even after the state transition without affecting the FSM.
2) press(1): When the user presses the "Move To Center" button, the state transitions to the instance of WaitCycComplete at reference node 1.
3) press(2): When the user presses the "Secure Center" button, the state transitions to the instance of WaitCycCompl at reference node 2.

The PreMoveToStart state serves as a place to wait for the operator to hit cycle start to begin execution of the MDI blocks to move the axes to the test start position. The pattern employed for the transitions out of PreMoveToStart can be identical to the pattern employed by PreMoveToCenter. The test start position is the location prior to the (e.g., 1.5 mm) feedin along the ballbar orientation vector.

At-Entry Actions associated with the PreMoveToStart state can include:

1) enable(1:3), disable(4:5), set compl(1:2), set incmpl (3:5): The "Move To Start" button is enabled but the check box is not checked to indicate that the move to start task is currently in process. The Move To Start button may be pressed from this state, but it results in no action.

2) statusmsg( ): "Ensure a safe path to the start position, then hit Cycle Start"

3) set($N_{START}$), set($N_{STOP}$): $N_{START}$ is assigned the value of the sequence number for the motion span and $N_{STOP}$ is assigned the value of the sequence number of the suspend-loop blocks.

4) setmdi( ): The MDI program contains, for example, a linear interpolation block to move to the machine coordinates of the start position at the traverse_ feedrate from setup data. The motion span can be followed by a suspend-loop, such as the one in Code Snippet 1. The start position can be computed from the setup data and the active value for circle center. The start position can be computed by first determining the unit-vector that describes the ballbar orientation (direction cosines), multiplying the unit vector components by the quantity ballbar length plus 1.5 millimeters and then adding the circle center components. The involved computations can utilize equations (92) through (95).

5) est_prg_time( ): compute and store a rough estimate of the time to complete a move to start for a feedrate override of 100% when starting from the current position of the axes.

With respect to state activities associated with the PreMoveToStart state, there can be poll(ctlstate, $N_{SEQ}$), involving a check for a transition stimulus condition. Meanwhile, there are no at-exit actions associated with the PreMoveToStart state. Transitions from the PreMoveToStart state can include:

1) $N_{SEQ} \geq N_{START}$ & incycle: Transition to the state MovingToStart.

2) press(1): Return to the PreMoveToCenter state via the W state at node 3) press(2): Return to the SecureCenter state via the W state at node 2.

The state MovingToStart serves the purpose of waiting for the machine motion to complete. The pattern employed for state transitions out of MovingToStart can be identical to the pattern employed for MovingToCenter. At-entry actions associated with the MovingToStart state can include:

1) statusmsg( ): 'Axes moving to start position'

2) timeoutset( ): The timeout condition can be set to be five times the estimated time plus, for example, 30 seconds.

State activity associated with the MovingToStart state can include:

1) poll($N_{SEQ}$): test for transition stimulus condition 2) poll(time): compute time elapsed since state entry At-exit actions associated with the MovingToStart state can include waitinloop(release), uniformly allowing program execution to complete regardless of the particular transition taken to exit the state. Meanwhile, transitions from the MovingToStart state can include:

1) $N_{SEQ} \geq N_{STOP}$: This condition indicates that the part program execution has reached the suspend-loop and a normal exit transition toward the state AtStart is initiated. The transition goes toward AtStart but first enters an instance of the W state to ensure that the MDI buffer is unlocked to enable AtStart's setmdi( ) at-entry method to execute properly.

2) !incycle & ateop: If this condition occurs before the normal exit condition ($N_{SEQ} \geq N_{STOP}$), then an event such as a manual data reset or a servo fail might have occurred. In response to this stimulus, the state transitions to an instance of AlertMessage where the following text can be displayed: "Move To Start Position Terminated Unexpectedly." When the alert message is acknowledged, the state transitions to PreMoveToStart to give the process a second try.

3) timeout: If the MovingToStart state has persisted for a period of time much longer than expected, the state transitions to an instance of AlertMessage where the following text can be displayed: "The move to start position is taking much longer than expected: hit feedhold data reset." Acknowledgement of this alert by the user causes the state to transition to an instance of W. If the user had not data reset, the W state can display an alert message asking the user to do so. Once the ateop condition is met, the state transitions to PreMoveToStart to allow the user to try again. A timeout condition might occur if the feedrate override is set to zero or if the user presses feedhold.

4) press(1): Return to the PreMoveToCenter state via the W state at node 1.

5) press(2): Return to the SecureCenter state via the W state at node 2.

AtStart serves to provide a state where an exemplary RTC FSM waits for the user to hit cycle start to initiate the test execution. At entry of this state, the user can be instructed to place the ballbar in the machine. The state also checks the current axes positions to ensure that the machine is at the correct start position. If the axes positions deviate from the start position, then the state transitions to PreMoveToStart. This mechanism simplifies the state machine by allowing transitions from states where the axes are expected to be at the start position to be into AtStart. At entry of AtStart, the MDI part program that causes the motion for the test measurements can be created. A detailed description of a MDI part program created at entry of AtStart will also be provided later herein.

The following at-entry actions can be associated with the AtStart state:

1) enable(1:4), disable(5), set_compl(1:3), set incmpl (4:5): At entry of AtStart, the tasks of "Move To Center", "Secure Center", and "Move To Start" will have been completed. Any of these steps may be repeated by pressing the associated button. The Perform Test task has not been completed, but its button can be enabled to indicate that it is the next task.

2) statusmsg( ): 'At Start Position—Place ballbar in machine, then hit cycle-start'

3) setmdi( ): The MDI program to generate the motion for the continuous motion test and the backlash test can be generated from the setup data. Explanations of such programs and methods used to generate them are further provided herein. The first part of the MDI program can be a suspend-loop to allow the state machine to turn on and initialize the ballbar.

4) set($N_{START}$): The first sequence number of the MDI part program is assigned to $N_{START}$.

The following state activity can be associated with the AtStart state:

1) poll($N_{SEQ}$): check for the event to stimulate a transition.

2) poll(dfsp): The dfsp is the distance from start position. It can be computed using the instantaneous machine coordinates of the axis positions obtained from the real time process. The start position can be the position of the axes just prior to the feedin move, as defined in the PreMoveToStart state. The dfsp can be computed as follows.

$$dfsp = \sqrt{(X(t) - X_{start\_pos})^2 + (Y(t) - Y_{start\_pos})^2 + (Y(t) - Y_{start\_pos})^2} \quad (99)$$

There are no at-exit actions associated with the AtStart state. The following can be transitions from the AtStart state:

1) $N_{SEQ} \geq N_{START}$/capture_test_conds, check_fdrate( ): When the user hits cycle start, the program can execute a suspend loop until the FSM executes a transition into a destination state with a waitinloop(release) at entry condition. Detection of the suspend loop's sequence number triggers a transition toward the state TestInProgress. Before entering TestInProgress, certain actions and tests can be performed, as indicated by the conditional transitions in the FSM diagram. During the initial transition, all the test conditions and a comprehensive description of the control's configuration at that instant can be captured. The information captured can include the test-setup parameters, axis rates parameters, axis gains, path rates parameters, axis compensation data, feedforward parameters, etc. In addition, the test feedrate from, for example, an edit box on a run test page can be captured and further edits to the edit box can be disabled. The appropriateness of the feedrate with respect to the setup data's overshoot arc can be checked using the methods as previously described. Also at this time, the estimate of trigger to trigger time $t_{est}$ can be computed as previously described and its value stored for later use. If the checks indicate that the overshoot arcs are not large enough, then the state can transition into an instance of AlertMessage to indicate the problem to the user and to supply an estimate for the maximum allowable feedrate for the current setup data. When the alert is acknowledged, the state transitions to an instance of W, from which the state transitions to AtStart when an ateop condition is satisfied. Once the state has reached AtStart, the user may reduce the feedrate or return to, for example, a test-setup page to lengthen the overshoot arcs. If the feedrate checks out, then the FSM attempts to turn on and initialize the ballbar, such as previously described with respect to a software interface to the ballbar. If ballbar initialization is unsuccessful, then the state transitions to an instance of AlertMessage, then to the instance of W, then to AtStart where the user can try again to perform the test. If ballbar initialization is successful, then the state transitions into TestInProgress where the nested state machine can be run.

2) dfsp>0.05 mm: If the ballbar is not at the correct position, then the state transitions to PreMoveToStart without any alerts. This allows transitions where the FSM believes the axes might be at start to be directed to AtStart. This potentially avoids an extra cycle start by the user. It also protects against situations where the axes are handwheeled or power-fed away from the start position.

3) press(1): If the user wishes to return to the center position, the MoveToCenter button can be pressed to transition the FSM to reference node 1.

4) press(2): If the user wishes to re-secure the circle center, the SecureCenter button can be pressed to transition the FSM to reference node 2.

5) press(3): If the user presses the MoveToStart button, the state transitions to an instance of W prior to entry into PreMoveToStart, as indicated by reference node 3 in the diagram. This button can be made available to allow the user to move to the start position in case the user believes the axes may have been accidentally fed a very small amount (e.g., less than 0.05 mm) since arriving at the start position.

An exemplary TestInProgress state contains its own nested FSM. The details of an exemplary TIP FSM are later provided herein. The current discussion is limited to at-entry and at-exit actions of such a TestInProgress state. The current discussion also describes state activity for the TestInProgress state that occur uniformly regardless of the nested state. For each recurrent invocation of the RTC FSM where the state is TestInProgress, the uniform state activity of the TestInProgress state can be performed prior to the execution of the state activity of the nested state. In an exemplary embodiment, the at-entry and at-exit actions of the TestInProgress state are executed only once at the appropriate time as for any other RTC state.

The at-entry actions associated with the TestInProgress state can include:

1) set_compl(1:3), set_incmpl(4:5): At this point in the procedure, the tasks "Move To Center", "Secure Center", and "Move To Start" will have been completed successfully. In an exemplary embodiment, the enable status-of the buttons is not modified directly because uicontrols are uniformly disabled during test execution.

2) statusmsg( ): The status message can vary depending on the nested state. For example, the status message just prior to entry of TestInProgress can be set during the transition and indicates that ballbar initialization had been successful.

3) disable(enabled): uicontrols on the run-test page whose accessibility property is "enabled" can be identified and stored in a list. The accessibility property of each of these controls can be set to disabled. Additionally the buttons to switch, for example, the page can also be disabled. The list of previously enabled controls can be retained so that the FSM knows which controls to re-enable when the test completes.

4) create(cancelbutton): The cancelbutton is a new uicontrol that can be created at entry of TestInProgress. In an exemplary embodiment, this button is the only enabled control and serves to provide the user with the ability to manually cancel the measurement test. The callback method of the cancel button can be to invoke the FSM with a "cancel test" stimulus.

5) create objects: This action can create the resamp_pipe_buffer object and initializes its attributes. This action selects a resampling rate, computes the estimated measurements from feedin to feedout, and allocates memory for the resamp_pipe_buffer and the various run objects (e.g., clockwise run, counterclockwise run, backlash run). The size of the resamp_pipe_buffer can be determined from the estimate of the trigger-to trigger time $t_{est}$ (as previously discussed), the ballbar sample rate $f_s$, and the resampling period $N_{resamp}$. The resampling period is an integer number of samples and can be selected at state entry by computing the maximum sample rate that results in a data buffer whose size is less than or equal to a maximum size of Buffsize$_{MAX}$. The parameter Buffsize$_{MAX}$ can be selected based on the speed with which, for example, the ATB process is able to perform the data analysis and display tasks of the analyze-data page. A value for Buffsize$_{MAX}$ for a Pentium II system, for example, where the performance remains reasonably smooth is Buffsize$_{MAX}$=5000. The total amount of memory allocated for the resamp_pipe_buffer is the max_num_samps. The computation of max_num_samps takes into account the tolerance on the accuracy of the estimated trigger to trigger time t$_{TOL}$ and the size of the ballbar data pipe N$_{PIPE}$ (which can be specified by a ballbar interface definition).

$$N_{RESAMP} = \text{round}\left(0.5 + \frac{f_{samp} \cdot t_{est}}{\text{Buffsize}_{MAX}}\right) \quad (100)$$

$$\text{max\_num\_samps} = \text{round}\left(\frac{f_{samp} \cdot (t_{est} + 2t_{TOL})}{N_{RESAMP}} + N_{PIPE}\right) \quad (101)$$

The data container areas for each test arc (clockwise and counterclockwise) can be dynamically allocated at this time to be large enough to contain the samples associated with the data arcs.

State activity associated with the TestInProgress state can include:

1) check for ballbar errors: The ballbar status can be interrogated for error conditions at each invocation of the in-state-actions with the RTC state being TestInProgress. At this point, the ballbar status is expected to be powered up and collecting data; any other state for the ballbar interface object is considered incorrect. Additionally, the minimum ballbar deflection from the resamp_pipe_buffer can be tested to ensure that the ballbar is not compressed at or below its minimum range. In an exemplary embodiment, a similar test for maximum range is not performed because the ballbar is expected to be extended beyond its maximum range at various times during the test. If the number of measurements in the most recent ballbar data pipe is equal to the maximum pipe length, then a pipe overflow can be assumed to have occurred over the interval and a discontiguous data error stimulus generated. In one embodiment, monitoring of ballbar status may not be necessary because the ballbar thread provides an error event that initiates a call to the FSM with a ballbar stimulus. Likewise, the empty pipe thread checks the ballbar range and invokes the FSM with appropriate stimulus when the ballbar deflection falls below the minimum or exceeds the maximum valid range limit.

2) update displays: During the period where the state is TestInProgress, a run-test page can contain a display of the instantaneous ballbar measurement. This display can be updated by copying the most recent value from the data pipe to the display object.

3) run nested FSM: In an exemplary embodiment, following state activities that are executed uniformly regardless of the nested state, the state activities specific to the nested state can be performed by running the exemplary TIP FSM. Once the nested state's activities are completed, the nested FSM ceases execution. If the nested state activities result in a transition of the nested state, then the steps to complete this transition can be executed before the nested FSM ceases execution. In the case of a transition of the nested state, the following sequence can occur: 1) performance of at-exit actions of the original nested state, 2) performance of any transition actions and 3) performance of the at-entry actions for the new nested state. The states and transitions of the TIP FSM are further discussed later herein. If execution of the TIP FSM indicates that the RTC state should transition out of TestInProgress, then the transition is executed in the context of the RTC FSM.

The following at-exit actions are associated with the TestInProgress state:

1) turn off ballbar: When the TestInProgress state is exited for any reason, the ballbar can be turned off and uninitialized.

2) re_enable(disabled): The uicontrols that were enabled prior to state entry and were disabled during state entry can be re-enabled at state exit.

3) delete(cancel): The "cancel" button that was created at state entry can be destroyed upon state exit.

4) delete objects: Delete any objects created for the purpose of temporarily storing measurement data.

Transitions from the TestInProgress state can include:

1) test succeeded: This transition can originate from within the nested TIP FSM when the entire sequence of tests has completed without any error conditions detected.

2) test failed: This transition can originate from within the nested TIP FSM. When an error condition is encountered during execution of the TIP FSM, the TIP FSM can generate a nested-state-specific alert message and transition to an AlertMessage state in the context of the RTC FSM.

3) press(cancel): The callback method for the cancel button can be to execute the RTC FSM's transition method with the press(cancel) stimulus. The press (cancel) stimulus can cause a transition to an AlertMessage state that displays, for example, the message: "Test Cancelled By User—Hit feedhold and Data-Reset to continue." When the user acknowledges the alert message, the state transitions to an instance of W. If the user had not data-reset, then W can create an alert indicating that the user should do so. Once the ateop condition is achieved, the state transitions to AtStart.

4) ballbar error: A ballbar error detected by the TestInProgress state's uniform in-state actions can result in generation of an alert message to describe the particular error condition. The RTC state transitions to an instance of AlertMessage. Acknowledgement of the alert causes a state transition to AtStart via a W state.

TestComplete is a state entered after successful execution of a ballbar measurement test. This state persists until, for example, a user presses a task button or generates a reset event by changing the circle plane or by modifying the setup data on the setup page. At-entry actions associated with the TestComplete state can include:

1) enable(1:5), set_compl(1:4), set_incmpl(5): All tasks except saving data have been completed. All buttons can be enabled.

2) analyze_data( ): At entry into TestComplete, the clockwise and counter-clockwise data-arcs that have been extracted from the trigger-to-trigger measurement by the TIP FSM can be copied to a temporary data file. The captured test conditions, and control configuration can be copied to the data file's header. The data file can be automatically loaded to, for example, an analyze data page with the associated data processing taking place.

There are no state activities or at-exit actions associated with the TestComplete state. Transitions from the TestComplete state can include:

1) press(1:4) transition to the associated reference node in the FSM diagram.)
2) press(5): transition to the SavingData state The SavingData state can be entered from the TestComplete state when the user presses a Save Data button, for example. At entry of SavingData, a modal dialog window can be created. This window can allow a user to specify a data file name and to provide specific information about the machine, the test particulars, etc. The dialog can preload values into the fields for the date, time, control serial number, and file name. In one embodiment, the user may modify any of these. The dialog box can also contain fields where the user may enter machine information and miscellaneous notes. When the user presses save, for example, a data file can be created that contains the recent data-arc data, a test-conditions header, and additional header information containing the information pertaining to the dialog box fields. Once the file save operation has completed, the Save Data checkbox can be checked. The SavingData state persists until the user presses one of the buttons or causes a reset of the RTC FSM.

An exemplary continuous motion program consists of the sequence of blocks shown below. Each block in the described program contains a unique sequence number greater than the sequence number of the previous block. One exception to this can include that each block in a suspend-loop can have the same sequence number, but that sequence number is greater than the sequence number of the block before the first block of the suspend-loop.

1) suspend-loop to wait for completion of ballbar initialization and power-up
2) set modal states and feedrate
3) feed-in move along the ballbar orientation vector
4) counter clockwise acceleration arc
5) counter-clockwise data-arc first half
6) counter-clockwise data-arc second half
7) counter clockwise deceleration arc
8) feed-out move along the ballbar orientation vector
9) suspend-loop to wait for preparation for the clockwise move
10) feed-in move
11) clockwise acceleration arc
12) clockwise data-arc first half
13) clockwise data-arc second half
14) clockwise deceleration arc
15) feed out move
16) a suspend-loop to ensure an opportunity to detect $N_{STOP}$ before program execution terminates (or continues on to a backlash test).

Motion blocks can be programmed in machine coordinates to avoid situations where the circle center is affected by offsets and/or machine position-set. Referring to the syntax of the programming language used on the A2100 as an example, the circle can be programmed in machine coordinates by, for example, moving the axes to the circle start point in G98.1 mode with linear interpolation, and then programming a circle by using incremental coordinates for the circle end point (G91) and incremental coordinates for the circle center (G2.02 or G3.02). The data arc can be divided into two halves such that the two separate blocks accommodate the possibility that the data arc is 360 degrees.

In an exemplary embodiment, auto program generation accounts for circle-plane, circle-direction and the ratio of ballbar-radius to circle radius. For the XY and YZ plane, a clockwise move can be generated by programming a clockwise arc (e.g., G2.02) and a counter-clockwise move can be generated by programming a counter-clockwise arc (e.g., G3.02). For the XZ plane, the coordinates are left-handed (the clockwise move can be generated by programming a counter-clockwise arc (e.g., G3.02) and the counter-clockwise move can be generated by programming a clockwise arc (e.g., G2.02)).

Circular arc blocks can be generated by copying the horizontal and vertical (incremental) coordinates for endpoint and circle center to the command position of the associated logical axis for the particular circle-plane. The program generation algorithm can be summarized below for the case of both the clockwise and counter-clockwise moves.

In an exemplary embodiment, steps 1 through 4 (see below) are executed only once. Steps 5 through 10 (see below) can be executed in sequence twice; once for the counter-clockwise move angles $\theta^{ccw}$ and once for the clockwise move angles $\theta^{clw}$. In the following discussion, the pseudo-code uses the syntax <variable> to indicate a string representing the value of the variable between the "<" and ">" symbols, and double quotes are used to indicate that the string is copied exactly.

1. Compute the ballbar orientation relative to the circle plane while accommodating the possibility of a circle-radius that is smaller than the ballbar length. This is represented by the in-plane component of the orientation-vector $\cos \phi$ and the out-of-plane component of the orientation vector $\sin \phi$.

$$\cos\phi = \frac{R_{Circle}}{L_{Ballbar}}; \sin\phi = \sqrt{1-(\cos\phi)^2} \qquad (102)$$

2. Compute the circle angles for each of the circular motion spans in the program for the counter-clockwise move.

$$\text{start of acceleration span: } \theta_1^{ccw} = \theta_{DataStart} - \theta_{Overshoot} \qquad (103)$$

$$\text{start of first half data arc: } \theta_2^{ccw} = \theta_{DataStart} \qquad (104)$$

$$\text{start of second-half data arc: } \theta_3^{ccw} = \theta_{DataStart} + \tfrac{1}{2}\theta_{DataRange} \qquad (105)$$

$$\text{start of deceleration arc: } \theta_4^{ccw} = \theta_{DataStart} + \theta_{DataRange} \qquad (106)$$

$$\text{end of deceleration arc: } \theta_5^{ccw} = \theta_{DataStart} + \theta_{DataRange} + \theta_{Overshoot} \qquad (107)$$

3. Compute the circle angles for the blocks in the clockwise move.

$$\text{start of acceleration span: } \theta_1^{clw} = \theta_5^{ccw} \qquad (108)$$

$$\text{start of first half data arc: } \theta_2^{clw} = \theta_4^{ccw} \qquad (109)$$

$$\text{start of second-half data arc: } \theta_3^{clw} = \theta_3^{ccw} \qquad (110)$$

$$\text{start of deceleration arc: } \theta_4^{clw} = \theta_2^{ccw} \qquad (111)$$

$$\text{end of deceleration arc: } \theta_5^{clw} = \theta_1^{ccw} \qquad (112)$$

4. Generate strings for the modal interpolation type, circle plane, logical axes and circle center names that correspond to the horizontal, vertical, and perpendicular axes of the circle plane.

$$\begin{cases} XY: G_{plane} = "G17", H_{ax} = "X", H_{ctr} = "I", V_{ax} = "Y", V_{ctr} = "J", P_{ax} = "Z", G_{intp} = \begin{cases} ccw: "G3.02" \\ clw: "G2.02" \end{cases} \\ XZ: G_{plane} = "G18", H_{ax} = "X", H_{ctr} = "I", V_{ax} = "Z", V_{ctr} = "K", P_{ax} = "Y", G_{intp} = \begin{cases} ccw: "G2.02" \\ clw: "G3.02" \end{cases} \\ YZ: G_{plane} = "G19", H_{ax} = "Y", H_{ctr} = "J", V_{ax} = "Z", V_{ctr} = "K", P_{ax} = "Z", G_{intp} = \begin{cases} ccw: "G3.02" \\ clw: "G2.02" \end{cases} \end{cases} \quad (113)$$

5. Generate the feedin block to move the axes linearly along the orientation of the ballbar toward the circle-center. incremental axis motion in hvp system $$h = -1.5 \cdot \cos \phi \cdot \cos(\theta_1); \ v = -1.5 \cdot \cos \phi \cdot \sin(\theta_1); \ p = -1.5 \cdot \sin \phi \quad (114)$$

block string
str="G91 G1"<$H_{ax}$><h><$V_{ax}$><v><$P_{ax}$><p>
6. Generate the acceleration arc block.
incremental coordinates of arc end-point in h-v-p system $$h_{end} = R_{Circle} \cdot \cos(\theta_2 - \theta_1); \ v_{end} = R_{Circle} \cdot \sin(\theta_2 - \theta_1); \ P_{end} = 0 \quad (115)$$

incremental coordinates of circle-center in h-v-p system $$h_{ctr} = -R_{Circle} \cdot \cos(\theta_1); \ v_{ctr} = -R_{Circle} \cdot \sin(\theta_1); \ p_{ctr} = 0 \quad (116)$$

block string
str="G91" <$G_{plane}$> <$G_{intp}$> <$H_{ax}$><$h_{end}$>
<$H_{ctr}$><$h_{ctr}$><$V_{ctr}$><$V_{ctr}$>
7. Generate the first half data-arc block
incremental coordinates of arc end-point in h-v-p system $$h_{end} = R_{Circle} \cdot \cos(\theta_3 - \theta_2); \ v_{end} = R_{Circle} \cdot \sin(\theta_3 - \theta_2); \ P_{end} 0 \quad (117)$$

incremental coordinates of circle-center in h-v-p system $$h_{ctr} = -R_{Circle} \cdot \cos(\theta_2); \ v_{ctr} = -R_{Circle} \cdot \sin(\theta_2); \ P_{ctr} = 0 \quad (118)$$

block string
str="G91" <$G_{plane}$> <$G_{intp}$> <$H_{ax}$><$h_{end}$>
<$H_{ctr}$><$h_{ctr}$><>$V_{ax}$<>$v_{end}$><$V_{ctr}$><$v_{ctr}$>
8. Generate the second half data-arc block
incremental coordinates of arc end-point in h-v-p system $$h_{end} = R_{Circle} \cdot \cos(\theta_4 - \theta_3); \ v_{end} = R_{Circle} \cdot \sin(\theta_4 - \theta_3); \ P_{end} 0 \quad (119)$$

incremental coordinates of circle-center in h-v-p system $$h_{ctr} = -R_{Circle} \cdot \cos(\theta_3); \ v_{ctr} = -R_{Circle} \cdot \sin(\theta_3); \ P_{ctr} = 0 \quad (120)$$

block string
str="G91" <$G_{plane}$> <$G_{intp}$> <$H_{ax}$><$h_{end}$>
<$H_{ctr}$><$h_{ctr}$><>$V_{ax}$<>$v_{end}$><$v_{ctr}$>><$V_{ctr}$>
9. Generate the deceleration-arc block
incremental coordinates of arc end-point in h-v-p system $$h_{end} = R_{Circle} \cdot \cos(\theta_5 - \theta_4); \ v_{end} = R_{Circle} \cdot \sin(\theta_5 - \theta_4); \ P_{end} = 0 \quad (121)$$

incremental coordinates of circle-center in h-v-p system $$h_{ctr} = -R_{Circle} \cdot \cos(\theta_4); \ v_{ctr} = -R_{Circle} \cdot \sin(\theta_4); \ P_{ctr} = 0 \quad (122)$$

block string
str="G91" <$G_{plane}$> <$G_{intp}$> <$H_{ax}$><$h_{end}$>
<$H_{ctr}$><$h_{ctr}$><$V_{ax}$><$v_{end}$><$V_{ctr}$><$v_{ctr}$>
10. Generate the feedout block to move the axes linearly along the orientation of the ballbar away from the circle-center. incremental axis motion in hvp system.

$$h = 1.5 \cdot \cos \phi \cdot \cos(\theta_5); \ v = 1.5 \cdot \cos \phi \cdot \sin(\theta_5); \ p = 1.5 \cdot \sin \phi \quad (123)$$

block string
str="G91 G1"<$H_{ax}$><h> <$V_{ax}$><v> <$P_{ax}$><p>

An exemplary backlash test part program causes the axes to move to a number of locations at circle quadrant boundaries and, at these locations, effects the axis motion associated with a backlash measurement. The measurements take place at each quadrant boundary encountered along the data arc when traversed in a counter-clockwise direction. The counter-clockwise motion begins and ends at the same locations as the continuous-motion counter-clockwise test.

A suspend-loop can be inserted in the program after the final block that is part of the ccw arc. This can be followed by a clockwise arc to move the ballbar back to its start position (and to unwind a ballbar cord, if necessary). The final block that is part of the clockwise arc can be followed by a suspend-loop.

The circle quadrant boundaries can be defined as the locations on the circle whose counter-clockwise angle relative to the positive horizontal axis is 0°, 90°, 180°, and 270°. A test_point can be established for each of these quadrant boundaries that is within the range of the data arc identified in test setup data. For each test_point, a series of moves along the circle radial can be made to accommodate, for example, three ballbar measurements.

Prior to performing the first measurement, the axes move to a position to ensure that the first measurement position is approached from the correct direction. The approach_loc coordinates can be along the circle radial that intersects the test_point a distance from the center that is greater the $R_{circle}$. The first measurement, meas1, for a particular test_point can be made when the axes are at rest a distance $R_{circle}$ from the circle center, where the location was approached with a single axis move originating at approach_loc.

The second measurement, meas2, for a particular point can be made at a location along the quadrant boundary radial a distance somewhat less than $R_{circle}$ from the circle center and can be approached directly from the location of meas1. The third measurement, meas3, for a particular point can be made at the same location as meas1, but is approached from the opposite direction as meas1; the location for meas3 can be approached directly from the location of meas2.

Dwell blocks can be inserted after each block that approaches a measurement location to provide an opportunity for ballbar data to be collected while the axis is at rest. The blocks associated with the measurements at a given test_point can be followed by a circular move block to the next quadrant boundary test point where blocks for measurements at that point can be inserted. This exemplary motion is illustrated schematically in FIG. 26 for a case where the data-arc spans three of the four quadrants. In the figure, the apparent spacing along the arc between the measurements at a single test_point is not intended to represent any real relative displacement, but is included only to make the figure readable.

Figure 27:
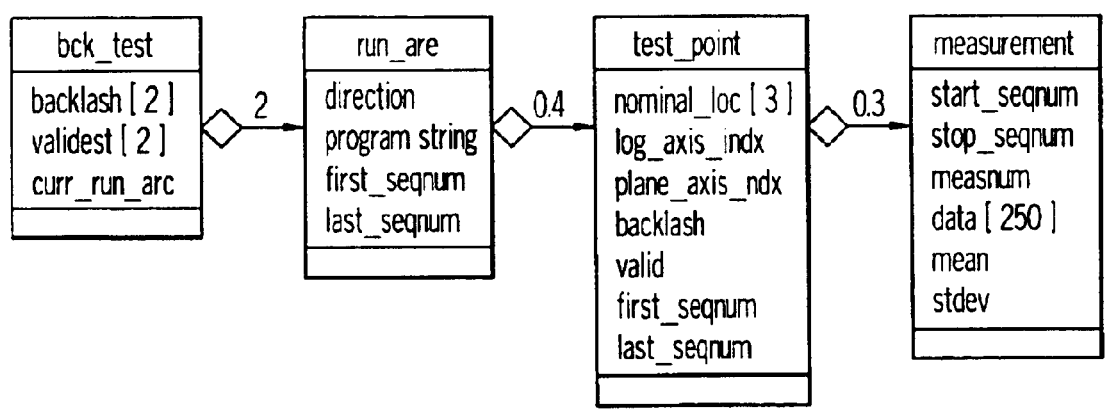
FIG. 27 is a class diagram illustrating a data hierarchy for a backlash test data structure according to an exemplary embodiment of the present invention.

Each block in the part program has a unique sequence number greater than the sequence number of the preceding block. The sequence numbers can, for example, be used by the TIP FSM as transition stimuli to ensure that the proper ballbar data is collected and that it is attributed to the proper measurement. In order to accommodate this mechanism, the function that generates the backlash part program can populate and return a data structure that contains program specific information for use by the TIP FSM. The structure identifies a hierarchy of information described by the diagram shown in FIG. 27. The notation of FIG. 27 is UML (Unified Modeling Language) and is used extensively in the field of object-oriented design.

The highest level in the hierarchy, bck_test, contains information pertaining to the backlash test. Bck_test has an aggregation of the two run_arc structures; one for a counter-clockwise directed arc and one for a clockwise directed arc. In an exemplary embodiment, measurements are performed only during the counter-clockwise arc, and the bck_test contains a clockwise run_arc to return the axes to their start position (e.g., while unwinding the ballbar cord).

The run_arc data pertains to information for a particular arc. An exemplary run_arc has an aggregation of zero to four test_point structures. The test point contains information related to one of the quadrant-crossing test points. In an exemplary embodiment, the run arc contains one or more test_point objects. The number of test_point objects owned by each run_arc can be equal and depend on the data arc start angle and the data arc length.

According to one embodiment, if the run arc contains only one test point, then a backlash estimate for only one of the horizontal or vertical axes is developed. If the run arc contains two or more test points, then a backlash estimate for both horizontal and vertical axes can be developed. The test points contain data to identify the axis to which the backlash measurement applies. The test_points owned by the counter-clockwise run_arc each contain an aggregation of three measurement objects. The test-points owned by the clockwise run_arcs do not own any measurements because they serve merely to form a path through which to move to unwind the ballbar cord.

Figure 26:
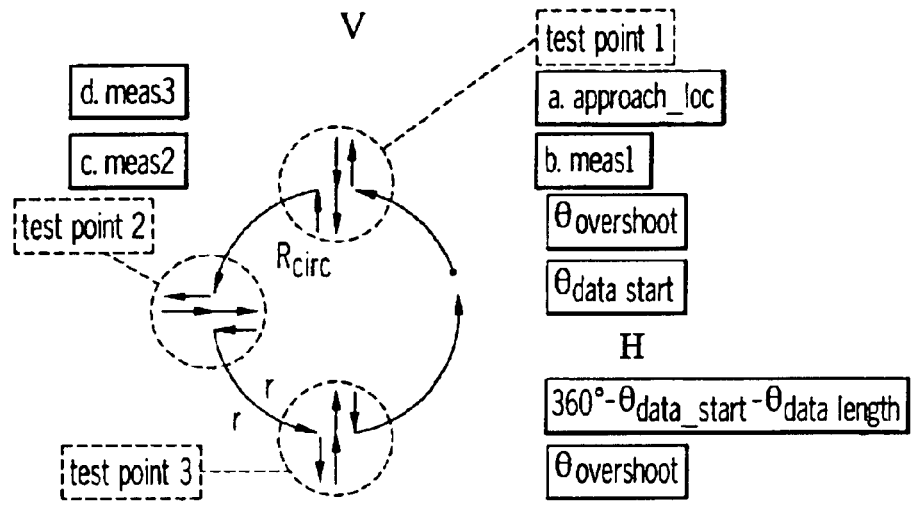
FIG. 26 is a plot illustrating machine motion for backlash test counterclockwise arc according to an exemplary embodiment of the present invention.
Figure 28:
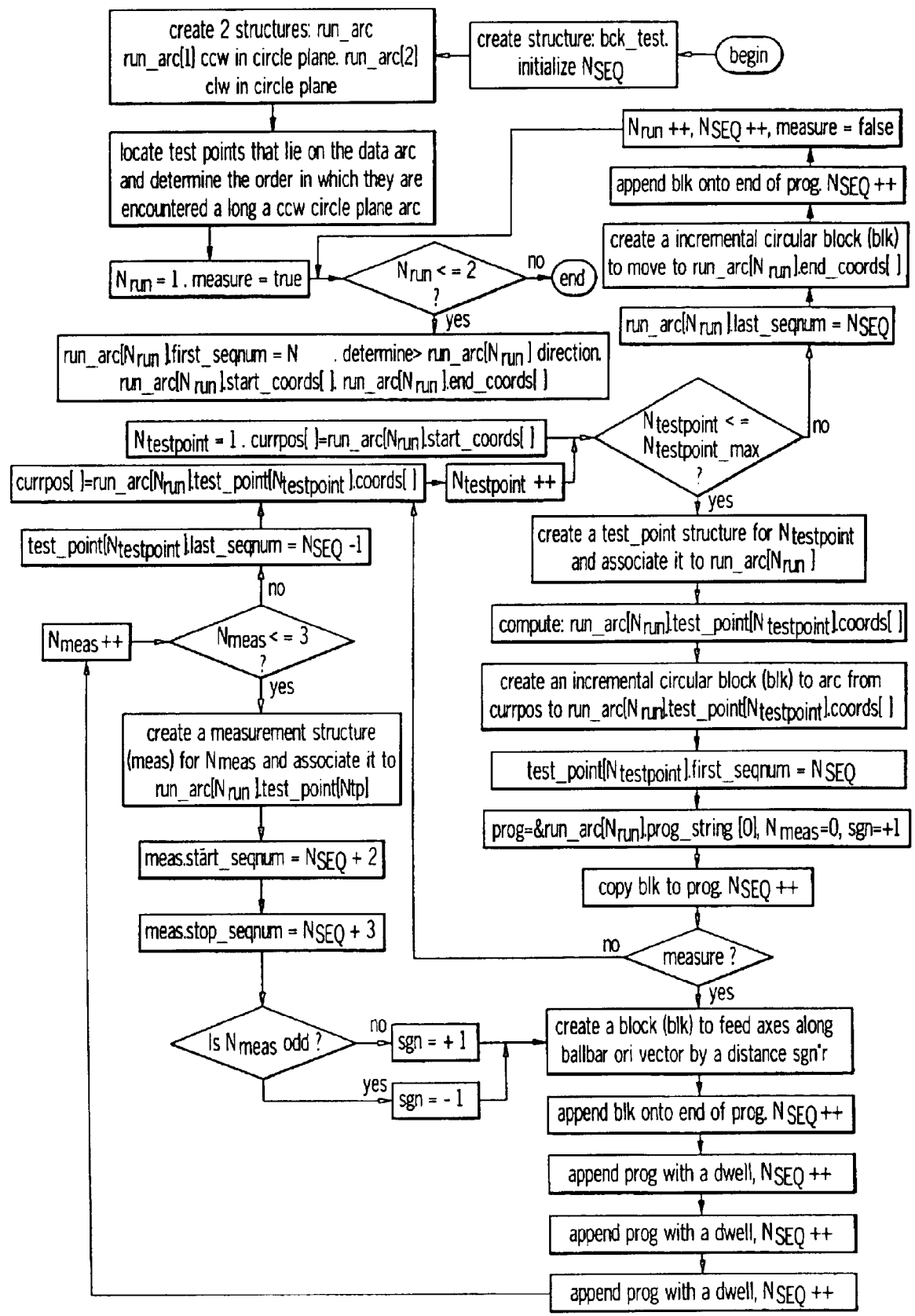
FIG. 28 is a flowchart illustrating a backlash program generation procedure according to an exemplary embodiment of the present invention.

In an exemplary embodiment, there is one measurement structure for each of the locations meas1, meas2, meas3, at each test_point, as indicated in FIG. 26. The data contained in each of these four objects can be utilized by, for example, a TIP FSM. Some of the data can be initialized during the generation of the program blocks for the backlash test. Explanations of the individual data items are given below.

bck_test
1) backlash[2]: The estimated backlash for the horizontal=1 and vertical=2 axis. The values can be computed by averaging the backlash estimates for each test point that contains a measurement of backlash for the particular axis. *
2) validest[2]: An indicator of whether the corresponding value in the backlash array is valid.**

run_arc
1) direction: The direction of the run_arc +1=ccw, −1=clw in terms of the machine coordinates (not necessarily the direction in the circle plane coordinates: e.g. for YZ ccw direction=−1)†
2) program_string: A character string containing the motion blocks for the run arc.†
3) first_seqnum: The sequence number of the first block in the run arc. †
4) last_seqnum: The sequence number of the last block in the run arc. † test_point
1) nominal_loc[3]: The logical axis machine coordinates (X Y Z) of the test_point.†
2) log_axis_ndx: The logical axis (X, Y, or Z) whose backlash is measured at this test_point.†
3) plane_axis_ndx: The circle plane axis (Horizontal or Vertical) whose backlash is measured at this test_point.†
4) backlash: The axis backlash measurement for this test_point.**
5) valid: An indicator whether the value stored under this test_point's backlash is valid.***
6) first_seqnum: The sequence number of the block that arcs to the current test point.†
7) last_seqnum: The sequence number of the block that arcs from the current test point.† measurement
1) start_seqnum: The sequence number where ballbar measurements begin.†
2) stop_seqnum: The sequence number where ballbar measurements cease. †
3) measnum: An indicator of which measurement the current structure pertains to (e.g., 1, 2, or 3)
4) data[250]: A container for the sequence of ballbar measurement samples.*x
5) datasize: The number of entries in data[] that represent a valid ballbar sample.**
6) mean: The average of the valid samples contained in data[].**
7) stdev: The standard deviation of the valid samples contained in data[].**

notes: * set after completion of the backlash test
** set during execution of the TIP FSM
*** updated during execution of the TIP FSM
† set during generation of the part program An exemplary procedure for generating the program blocks and initializing the values in the structures is described by the flow chart in FIG. 28. The flowchart shows how the program blocks to effect the motion depicted by FIG. 26 can be created. It is implied in the flowchart that each block has a sequence number that is equal to the value of $N_{SEQ}$ at the time the block is created. The flowchart shows how the sequence numbers of blocks where measurements take place can be stored in the data structure. Motion blocks can be incremental and the calculations for circular interpolation parameters and direction can be very similar to those presented in the previous discussion regarding a continuous motion program.

A measurement block is a dwell (a pause for a specified period of time) that is immediately preceded by a dwell and immediately followed by the dwell. In an exemplary embodiment, each of these dwells consumes the minimum amount of time possible. The dwell time for the measurement block can be determined based on the desired number of contiguous data samples to be taken and the expected latency between successive invocations of the FMS's state activities method.

$$T_{dwell}^{measure} = \frac{N_{revamp}}{f_{sample}} \cdot N_{samples\_desired} + T_{Latency} \quad (124)$$

The dwell immediately preceding the data-collection dwell can serve to allow the axis enough time to unwind (i.e., reach a steady-state location). This amount of time may vary from machine to machine and can be configurable. In an exemplary embodiment, the dwell immediately following the data collection dwell provides a margin of safety in case the interval latency is longer than expected.

Figure 29:
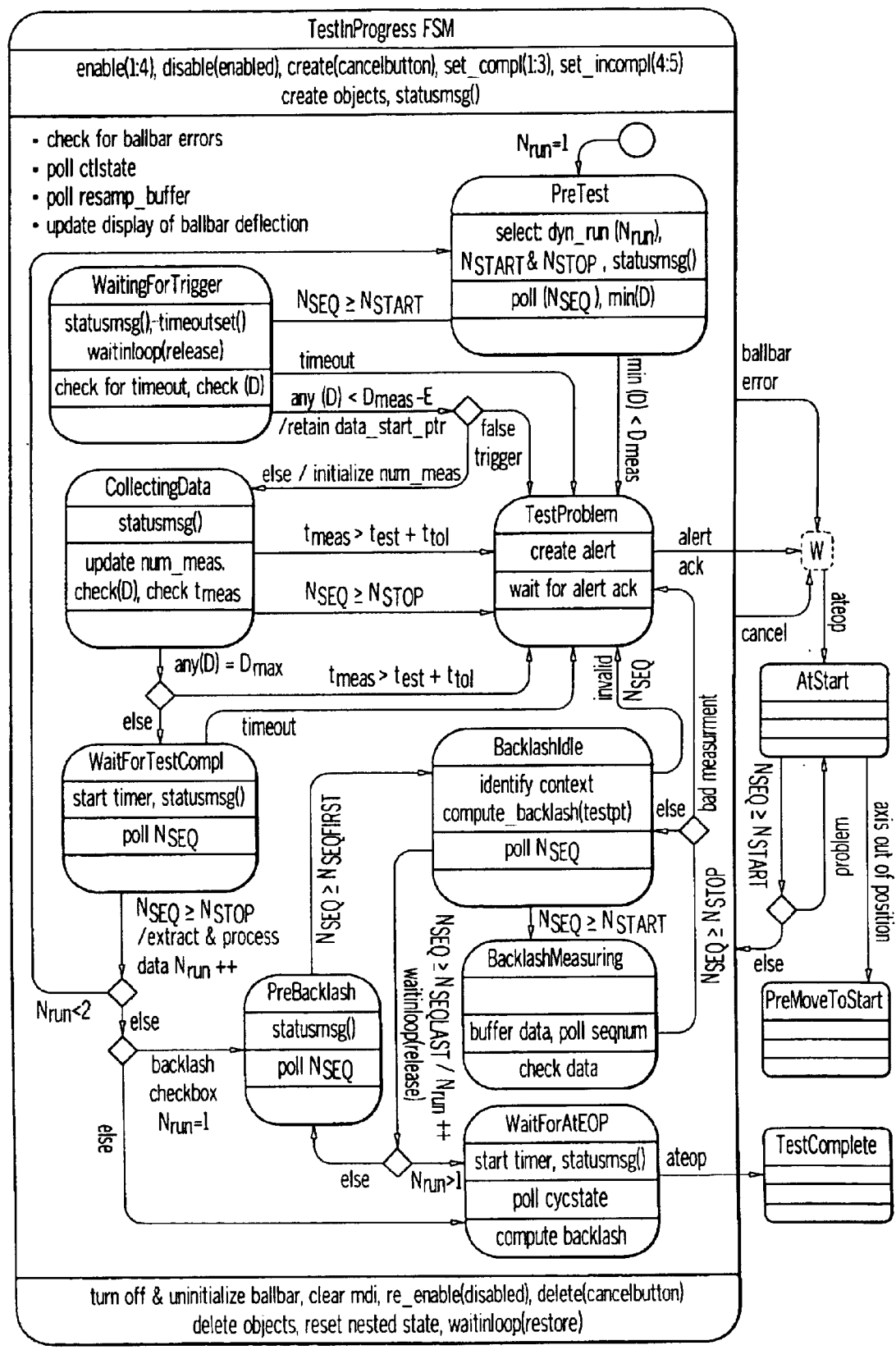
FIG. 29 is a finite state machine diagram for a test in progress (TIP) algorithm according to an exemplary embodiment of the present invention.

An alternative solution involves one that does not require up-front knowledge of the unwind time and the interval between invocation of in-state-actions. The alternative embodiment might be more likely to minimize the total dwell time for each measurement. This embodiment is not depicted in FIG. 26 or the TIP FSM diagram in FIG. 29 (see below), but could be implemented using a very similar underlying structure.

For example, dwell blocks can be replaced by a suspend-loop. When a TIP detects that the program execution has entered the suspend-loop (e.g., by polling sequence number), it transitions to a state that polls the ballbar data. When statistical analysis of the ballbar data indicates that the axes have attained a steady-state condition, the TIP state transitions to one where the ballbar data is collected. After collecting the necessary samples, a FSM can issue a waitinloop(release) to allow the program execution to proceed to the next measurement location. The FSM state transitions to one waiting for the sequence number of the next suspend-loop. Such an embodiment is expected to be particularly advantageous for extended applications where many steady-state measurements at a variety of locations are involved and where minimization of time for each measurement can be potentially important.

A TestInProgress finite state machine can run for each invocation of the FSM's state activity method when the state of a parent RunTestCoordinator finite state machine is TestInProgress. An exemplary FSM diagram for a TestIn-Progress (TIP) is provided in FIG. 29. The at-entry actions, state activity, and at-exit actions for a TestInProgress parent state have been previously discussed. The discussion will now focus on nested states, nested transitions, and actions that occur at-entry of a nested state, nested state activity, at-exit actions of a nested state, and transitions between nested states.

The exemplary TIP FSM can be divided into two sections: one for the performance of a continuous motion test and one for performance of a backlash test. For example, a continuous motion test can be performed first and a backlash test can be performed second (if, for example, its execution was specified by the user). Individual nested states are now described.

The default state for an exemplary TIP FSM can be PreTest (e.g., the state of the TIP FSM is reset to PreTest whenever the RTC state transitions into TestInProgress). A purpose of PreTest can be to initialize data for a continuous motion test and to check that the ballbar is fully extended as expected. In an exemplary embodiment, when PreTest is entered, the part program is suspended or will be suspended at a location just before the feed-in move at the start of the (ccw or clw) continuous motion test. An exemplary PreTest state persists until it is certain that the program is executing the suspend-loop.

The following at-entry actions can be associated with a PreTest state:

1) select dyn_run(Nrun), set $N_{START}$ and $N_{STOP}$: The instance of the bbardata structure that pertains to the test about to be run as indicated by Nrun is selected. The dyn_run structure contains the value for the upcoming run's start sequence number $N_{START}$ that is the sequence number of the suspend-loop that immediately precedes the feed-in block. The dyn_run structure also contains the upcoming run's stop sequence number $N_{STOP}$ that is the sequence number of the suspend-loop that follows the feedout block. The instance of dyn_run also contains memory for storing the entire ballbar measurement and fields that facilitate the data collection process.

2) statusmsg( ): "Waiting For Ballbar To Detect Feed-In Move"

In-state actions associated with the PreTest state can include:

1) poll($N_{SEQ}$): The sequence number is the factor that stimulates a transition out of PreTest.

2) min{D}: Maintain the minimum value for ballbar Deflection (D) that has occurred since the PreTest state has been entered. This can be done to ensure that the ballbar does not unexpectedly enter its active range while the machine is at rest.

No at-exit actions are associated with the PreTest state. Transitions from the PreTest state include $N_{SEQ} \geq N_{START}$. When $N_{SEQ} \geq N_{START}$, then the program has reached execution of the suspend-loop and the state transitions to WaitingForTrigger. In an exemplary embodiment, the suspend-loop is not released until the transition into WaitingForTrigger is complete.

A purpose of the WaitingForTrigger state is to wait for the feed-in move to be detected by the ballbar. As the state is entered, the part program can be suspended in a suspend-loop that precedes, for example, a short dwell block followed by the block that effects the feed-in move. At entry of the WaitingForTrigger state, the waitinloop semaphore can be incremented to release the part program from its suspended condition and the part program execution proceeds to a short dwell block. The state activities test for the trigger event or a timeout event.

The following at-entry actions can be associated with the WaitingForTrigger state:

1) timeoutset( ): capture the time at state entry and select a timeout time that is somewhat greater than the sum of 1) the dwell time that follows the suspend-loop and 2) the estimated time for the feed-in move to bring the ballbar within its active range. According to one embodiment, the time estimate of the second term will have been computed during program generation during estimation of trigger-to-trigger time.

2) statusmsg( ): "Waiting For Ballbar To Detect Feed-In Move"

3) waitinloop(release): The part program is released from its suspended state as the final at-entry task.

State Activity associated with the WaitingForTrigger state can include:

1) check for timeout: Check whether the total time since the WaitingForTrigger state has been entered exceeds the timeout time.

2) check{D}: wait for ballbar deflection to enter valid measurement range. As previously mentioned, the FSM need not explicitly check for the triggering condition because the empty pipe thread monitors for ballbar deflection transitions into and out of range, and any deflection transitions result in invocation of the FSM with the appropriate ballbar triggered stimulus specified.

There are no at-exit actions associated with the Waiting-ForTrigger state. The following can be transitions from the WaitingForTrigger state:

1) timeout: If the state persists for a period of time longer than expected, there is likely a problem with the test. The timeout could occur when, for example, the ballbar never triggers because it is incorrectly fixtured, the user hits feed hold, the control is in single block mode, etc. The timeout condition causes a transition to the TestProblem state with alert text "The start trigger for ballbar data collection did not occur within the expected period of time—the test is being aborted—hit feed hold and data reset"

2) any$\{D\}<D_{max}$-$\epsilon$: $D_{max}$ is the value output by the ballbar when it is at maximum deflection. When at least one of the resampled ballbar deflection measurements from the most recent data-pipe falls below $D_{max}$ by at least some small amount ($\epsilon$), the ballbar has entered its active range and a trigger event is considered to have taken place. The state transitions to a conditional state where the integrity of the trigger can be tested. During this transition, the data_start_ptr can be set to point to the sample in the resamp_buffer that corresponds to the first sample that met the triggering condition. The conditional state can be exited via one of the two transitions listed below.

a) false trigger: The existence of a false trigger can be tested by examining the section of the resampled buffer between the data_start_ptr and the list_tail_ptr. If any of the measurements in this section of the resamp buffer have a value greater than or equal to $D_{max}$, then a false trigger can be assumed to have occurred. The sensitivity of the condition for a false trigger may be adjusted by varying $\epsilon$ (the trigger_hysteresis attribute of the pipe_resamp_buffer object). A starting value for $\epsilon$ can be 0.05 mm. If a false trigger is detected, the state transitions to TestProblem and the following alert can be generated: "A false trigger has been detected—this can be due to a problem with the ballbar fixturing or machine vibration. Hit feed hold and data reset and try again. If the problem persists, try increasing the value for the parameter: ballbar trigger hysteresis."

b) else/initialize num_meas If data in the pipe following the initial measurement that stimulated the transition are in range, then the state transitions to CollectingData. The number of resamp_buffer samples between the data start_ptr and the list_tail_ptr (inclusive) establishes the initial value for num_meas attribute of the resamp_pipe_buffer object.

A purpose of the CollectingData state involves keeping track of the elapsed time since the feedin move and to test for the occurrence of the feedout move. At entry actions associated with the CollectingData state can include statusmsg( ) ("Continuos Motion Test In Progress: Run <Nrun> of 2— To Abort: Press 'Cancel'"). Meanwhile, state activity associated with the CollectingData state can include the following:

1) check $\{D\}$: Check the values for ballbar deflection that correspond to measurement from the most recent data pipe for a deflection that exceeds the maximum in-range deflection $D_{max}$. Alternatively, this task is performed by the empty pipe thread and detection of a feed out event results in invocation of the FSM with the TRIGOUT stimulus.

2) update num_meas: Add the number of samples added to the resamp_buffer during the current interval to the existing value for num_meas.

3) check ($t_{meas}$): Use the updated value for num_meas to derive the total time since the start trigger: $t_{meas}$ and compare this value to the estimated value for trigger to trigger time.

There are no at-exit actions associated with the CollectingData state. The following can be transitions from the CollectingData state:

1) any $\{D\} \geq D_{max}$: When any sample derived from the most recent ballbar data pipe exceeds $D_{max}$, the state transitions to a conditional node to test whether the deflection is likely to have been caused by the feedout move. The conditional node computes $t_{meas}$, the time since the feed-in trigger, by, for example, multiplying num_meas by $N_{resamp}/f_s$, and compares this value to the estimated value for trigger to trigger time $t_{est}$. If $t_{meas}$ is less than $t_{est}$ by more than the tolerance $t_{TOL}$, then the state transitions to TestProblem, otherwise the state transitions to WaitForTestCompl.

2) $t_{meas}>t_{est}+t_{TOL}$: If this condition occurs before the detection of the feedout move, then the state transitions to TestProblem. The existence of this condition, $t_{meas}>t_{est}+t_{tol}$, indicates that a period of time greater than the estimated test time has elapsed since the feed-in trigger without the occurrence of the feedout trigger. This could be caused by, for example, a problem with the ballbar fixture, a feedhold press by the user, or a very large circle center offset.

3) $N_{SEQ} \geq N_{STOP}$: If this condition occurs before the detection of the feedout move, then the state transitions to TestProblem. According to an exemplary embodiment, if the sequence number is greater or equal to $N_{STOP}$, the sequence number of the blocks comprising the suspend-loop following the feedout move, then the feedout move will have occurred, but the ballbar will have not been extended. This could be caused by, for example, a ballbar fixturing problem or a very large center offset.

The WaitForTestCompl state can be entered upon completion of a successful continuous motion measurement. A purpose of this state involves waiting for the feedout block to complete and for the control to enter the suspend-loop that follows the blocks associated with a continuous motion test. The transitions out of this state can be to:

1) PreTest: for the case where the first continuous motion test (circle-plane-ccw) has just completed and the second test (circle-plane-clw) is pending.

2) PreBacklash: for the case where the second continuous motion test (circle-plane-clw) has just completed and a backlash test is to be performed.

3) WaitForAtEOP: for the case where the second continuous motion test has just completed and a backlash test is not to be performed.

4) TestProblem: for the case where the state has persisted in WaitForTestCompl for a period of time longer than expected.

Additional discussions regarding this state have to do with the actions taken during a successful transition out of the state due to the condition $N_{SEQ} \geq N_{STOP}$. One of the actions of this transition can be to extract data-arc data from trigger-to-trigger data contained in the resamp_pipe_buffer. The raw data can then be manipulated to obtain a representation of circle radius. Discussions of these topics are provided later herein.

The PreBacklash state provides a state between the end of a continuous motion test and the beginning of a backlash test. It can also provide a mechanism to enable the system to perform backlash measurements along both the counter-clockwise and clockwise arcs. In an exemplary embodiment, however, measurements are only taken along the counter-clockwise-arc. The state transitions out of PreBacklash when the sequence number of the active block is greater than or equal to the sequence number of the first block of the pending backlash arc (e.g., run_arc[Nrun].first_seqnum$\geq N_{SEQ}$). In response to this condition, the state transitions to BacklashIdle.

At entry of BacklashIdle, the current or upcoming test point and measurement objects can be identified, and the start and stop sequence numbers to identify the program bracket where these objects are applicable can be extracted. The state activity compares the most recent sequence number of the currently executing block to the start and stop sequence numbers for the measurement and test point, and initiates a state transition when appropriate. At-entry actions associated with the BacklashIdle state can include:

1) identify context: The run number $N_{run}$ is known when the state is BacklashIdle. The test_point index $N_{testpoint}$ can be determined by checking $N_{first\_seqnum}$ and $N_{last\_seqnum}$ for the current test_point structure and comparing this to the most recent value for the program active block sequence number $N_{SEQ}$. If $N_{SEQ}$ is greater than or equal to $N_{last\_seqnum}$, then the test point index $N_{testpoint}$ can be incremented by one, the current test point structure can be re-assigned, the test point's $N_{first\_seqnum}$ and $N_{last\_seqnum}$ can be extracted from the new test point structure, and the measurement index $N_{meas}$ can be set to one. If the test point had not changed, then the measurement index $N_{meas}$ can be incremented by one. The measurement start and stop sequence numbers $N_{STOP}$ and $N_{START}$ can be extracted from the measurement structure identified by $N_{testpoint}$ and $N_{meas}$.

2) compute_backlash(testpt): If the test point index had been incremented during the identify context at-entry action, then the backlash parameter for the previous test point can be computed and stored in that test-point's data structure. The backlash can simply be measurement[3].mean—measurement[1].mean. State activity associated with the BacklashIdle state can include poll $N_{SEQ}$. The sequence number of the active part program block can be tested to determine whether it is within the expected range for the current test point and measurement. It can also be tested to determine whether the active block is the block in which the measurement should take place. There are no at-exit actions associated with BacklashIdle Transitions from BacklashIdle can include:

1) invalid $N_{SEQ}$: The sequence number of the actively executing part program block can be considered invalid if it is not within the range from the current test point's first sequence number to the current measurement's stop sequence number (inclusive). That is, the current sequence number is invalid if the following inequality is false: test_point[$N_{testpoint}$].first_seqnum$\geq N_{SEQ} \geq$ test_point[$N_{testpoint}$].meas[Nmeas].stop_seqnum. This situation is most likely to occur for the case where $N_{SEQ}$ is too large, which could occur if the FSM is "starved" for resources and falls behind the part program execution. The invalid $N_{SEQ}$ stimulus would likely be superseded by the data discontiguous error initiated from the parent-state's activity of testing for ballbar errors. The case of $N_{SEQ}$ being too small should never occur, but can be included for the sake of robustness (e.g., to help identify a design or implementation error). In any case, if the inequality evaluates to false, the state transitions to TestProblem where the following alert message can be displayed: "There has been a problem with the synchronization between the part program and the backlash measurements: please try the test again. If the problem persists contact your service representative." This stimulus is not expected to occur if the waitinloop approach described with respect to the autogeneration of a backlash test program is employed.

2) $N_{SEQ}==N_{START}$: If the sequence number is within the expected range identified above, then it can be tested to determine whether the part program block associated with the measurement is currently the active block. If it is the active block ($N_{SEQ}==N_{START}$), then the state transitions to BacklashMeasuring.

3) $N_{SEQ} \geq N_{SEQLAST}$: When the part program sequence number is greater than or equal the current run's sequence number, run[$N_{run}$].last_seqnum, then the state transitions to WaitForAtEOP where the FSM waits for the test part program to perform the clockwise move (to unwind the cord) and for write access to be gained to the MDI buffer. The transition in the FSM shows how this can be accomplished by incrementing Nrun and then testing it for greater than 1. This can be included in the FSM to enable additional measurements for multiple run's to accommodate extended application of the FSM beyond the scope of the design discussed by example herein.

A purpose of a BacklashMeasuring state can be to copy data from the ballbar pipe to the data buffer area in the measurement structure while the part program is executing the dwell associated with the measurement. There are no at-entry actions associated with the BacklashMeasuring state. The following can be state activities associated with the BacklashMeasuring state:

1) buffer data: Data from the FSM's copy of the ballbar pipe is appended to the end of the backlash measurement's data area. When the measurement's data array is filled to maximum capacity, this action ceases but the state remains BacklashMeasuring.

2) poll $N_{SEQ}$: Check for the sequence number of the active part program block to increase thereby indicating that the measurement should end.

Meanwhile, the at-exit actions associated with the BacklashMeasuring state can include check data. In an exemplary embodiment, the backlash measurement contains at least a specified minimum number of samples representing a steady-state constant axis position. The standard deviation of the measurement data can be computed and compared to a minimum acceptable value. If the standard deviation exceeds the minimum acceptable value, then the measurement can be considered invalid. In an exemplary embodiment, the minimum acceptable value considers the effects of axis vibrations and measurement noise (e.g., a good starting value might be 0.10 microns). If the machine axis has large vibration levels, then this value may need to be increased. A purpose of the test can be to discard measurements that take place when the axis has not yet reached steady-state. For axes with high levels of servo-induced vibration, the value for the standard deviation threshold may involve adjustment.

Transitions from the BacklashMeasuring state can include $N_{SEQ} \geq N_{STOP}$. When the sequence number of the active part program block increases to beyond the stop sequence number for the current measurement (e.g., the sequence number of the dwell following the measurement dwell) then the state attempts to transition back to BacklashIdle in preparation for the next measurement. If the data collected during the recent measurement is found to be invalid as described above, then the state transitions to TestProblem The WaitForAtEOP state waits for the part program execution to complete after the final backlash measurement has been successful. According to an exemplary embodiment, when the ateop condition is encountered, the MDI part program will have completed execution and write access will have been obtained to the MDI buffer. This condition stimulates a transition of the parent RTC FSM state from the TestInProgress to TestComplete.

When the ateop condition is encountered, prior to exiting the in-state action, the backlash for the horizontal and vertical axes can be computed. The backlash value for the horizontal axis can be obtained by averaging together the valid backlash measurements for the test points associated with the horizontal axis and copying the result to the first element of the array in the bck_test structure's backlash field. If there are no valid measurements, then the first array element of the valid field in the bck_test structure can be set false; otherwise, it is set true. Similarly the second elements of the valid and backlash arrays in the bck structure can be populated with vertical axis testpoints.

The TestProblem state serves as a location where the TIP FSM waits for the user to acknowledge an alert generated by some error condition from within the TIP FSM. The text of the alert can be specified during the transition into the TestProblem state. The callback method for this instance of the reusable AlertMessage can be a call of the RTC FSM method to transition to the instance of W indicated in the FSM diagram.

Data processing that can take place for each transition out of the TIP FSM's WaitForTestCompl state is described below. For example, a description will be given on how a segment within a continuous motion test's data buffer that corresponds to a data arc can be identified.

Each continuous motion test result (ccw and clw) contains the contiguous ballbar data from the feed-in trigger to the feedout trigger. Since the feedrate for the data arc is constant, the segment of the buffer that corresponds to the data arc has a length (in samples) that is equal to the effective sampling frequency multiplied by the arc-length in mm divided by the programmed feedrate.

$$L_{data\_arc} = \frac{R_{circle} \cdot \frac{\pi}{180} \cdot \theta_{data\_arc\_length}}{\frac{1}{60}F} \cdot \frac{f_s}{N_{resamp}} \quad (125)$$

The start point for the segment of data to extract can be determined by considering the phase distortion effect of the position controller and the difference between the estimated trigger to trigger time and the actual trigger to trigger time.

The conversion of raw data measurement to a circle radius adjusts the measurement based on ballbar length and takes into account the possibility that the ballbar length may be greater than the circle radius. When the ballbar is powered on, the calibration offset and the ballbar scale factor can be specified such that the measurement data placed in the pipe by the ballbar driver contains adjustments for these factors. If the data indicates that the ballbar is not length calibrated, then zero can be passed as the calibration offset. The absolute ballbar length measurement can be obtained by adding the nominal ballbar length to the data from the pipe.

If the ballbar is length calibrated, the resultant sum represents the true ballbar length for the measurement. Otherwise, it represents an approximate length. This value (true or approximate length) can then be adjusted to account for the possibility of a non-zero cone angle by, for example, multiplying the raw measurement of ballbar Displacement D, by the cosine of the cone angle—the ratio of programmed circle radius to nominal ballbar length.

$$r(t) = \frac{R_{circle}}{L_{ballbar}} \cdot D(t) \quad (126)$$

Yet another capability of, for example, a run-test page such as run-test page 30 could be ballbar length calibration. Ballbar length calibration is implemented within the scope of the exemplary RTC FSM described herein, but may take place in an exemplary embodiment regardless of the RTC state as long as there is no actively executing part program and as long as the ballbar is turned off (i.e. the ballbar state is uninitialized).

Figure 30:
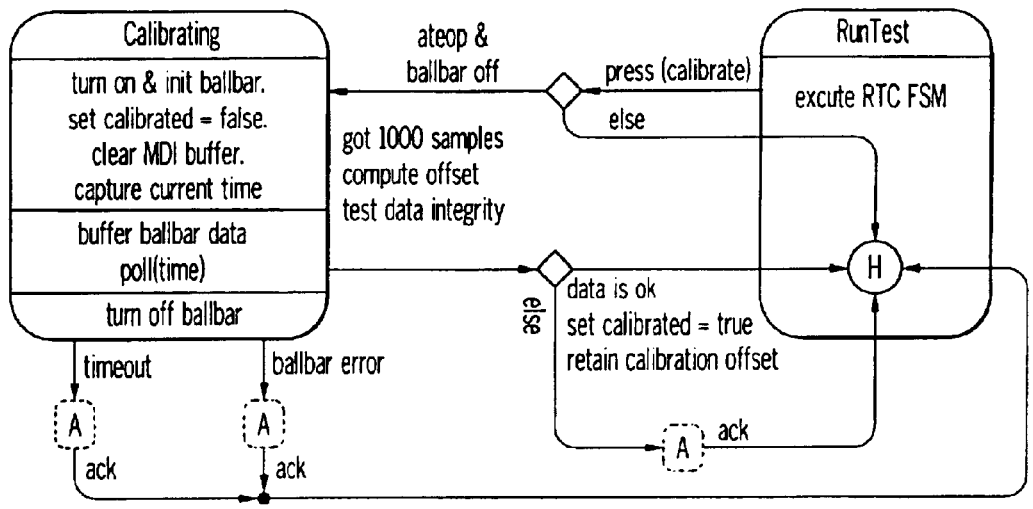
FIG. 30 is a finite state machine diagram for a ballbar length calibration algorithm according to an exemplary embodiment of the present invention.

An exemplary mechanism for accomplishing ballbar length calibration is shown in the FSM diagram in FIG. 30. The "H" surrounded by a circle represents the historic state of the RTC FSM (i.e., the state that was active when the FSM was interrupted to perform a calibration). Transitions into the historic state result in the performance of the at-entry actions for the specific state.

A calibrate button can, for example, be disabled at entry of various states within the RTC FSM and the press (calibrate) stimulus cannot occur. In cases where the calibrate button is enabled, a user press of the calibrate button can cause the evaluation of a test to see whether the MDI part program is in an ateop state and whether the ballbar is off. If the MDI part program is not in an ateop state or if the ballbar is not off, then the press(calibrate) action can be ignored (as indicated by returning to the historic state of the RTC FSM).

If the state of the MDI program is ateop and the ballbar is turned off, then the RTC state can transition to calibrating state. The historic state of the RTC FSM can be retained during the transition. Upon entry of the calibrating state, the ballbar can be initialized, powered on, and configured with the correct scale factor and a calibration offset of 0. The ballbar can then be commanded to begin collecting data to its data pipe.

Also upon entry of calibrating state, the timeout time can be set to some value that corresponds to somewhat more than the amount of time to collect, for example, 1000 ballbar measurement samples at the full sampling rate $f_s$. The state activity of the calibrating state can be invoked for each subsequent recurrent invocation of the RTC FSM from the run-test thread. The state transitions out of calibrating state and into an alert state if a timeout condition or ballbar error occurs. The timeout condition occurs when the state has persisted as calibrating for a time period that exceeds the expected maximum.

The possibility of a ballbar error condition can be tested prior to each interrogation of the ballbar pipe. The alert state can transition to the historic RTC FSM state when the alert acknowledge is received. The state transition out of calibrating that represents a successful calibration measurement takes place after, for example, 1000 ballbar measurements have been collected. During this transition, the ballbar offset can be computed and a data integrity check performed.

If the data is found to be okay, then a length-calibrated status can be set to true and the state transitions to the historic state of the RTC FSM. If the data integrity test fails, then the state transitions to an AlertMessage state and the length-calibrated status can be set to false. Acknowledgement of the alert causes a transition into the historic state of the RTC FSM.

A data validity test can involve computation of the standard deviation of the 1000 measurement samples. If the standard deviation is less than, for example, 0.01 microns, the data can be considered valid; otherwise, it can be considered invalid. The length calibration offset is the value that can be added to the raw data measurements to obtain an absolute ballbar length measurement. The calibration offset can be computed by subtracting the average of the thousand points from the user-entered value for the calibration fixture length.

$$L_{calib\_offset} = L_{calib\_fixture} - \left(\frac{1}{1000}\sum_{i=1}^{1000} D_i\right) - L_{nominal} \quad (127)$$

Software, such as ATB software capable of running on, for example, Acramatic Release 4 and/or Release 5 software, can be written using, for example, the Matlab programming language and employing capabilities of the Matlab math and graphics libraries. Standalone versions that do not require an installation of Matlab software can also be created, such as by using a Matlab Compiler to convert the M-code to C-code. Workstation services layer capabilities can be accessed through Matlab Mex Files that act as an interface between the Matlab source code and the C-code calling conventions of the services functions. Other software implementations could use other languages and graphics libraries. In an exemplary embodiment, mathematical analysis, thread handling, machine configuration data management, and/or finite state machines can, for example, be written in C or C++ and employ, for example, Win32 API. Meanwhile, and also in an exemplary embodiment, graphical user interfaces can be written in Visual Basic and re-use, where possible, objects from existing set of controls (e.g., A2100 ActiveX controls).

One advantage associated with certain ones of the described exemplary embodiments of the present invention involves providing a quick and easy to use method of determining machine compensation values. This capability is expected to be useful to, among others, machine tool OEM's, control retrofitters, and machine tool end users. For example, and with respect to ballbar testing, a technician at an OEM runoff line might utilize an embodiment of the present invention to use a series of standard test setups that are present at initial invocation (e.g., of an applet) or are loaded in (e.g., from files from the disk of a control). Accuracy statistics derived from the measurement data could be recorded to a file that may be permanently stored in the OEM's database. The technician could indicate that the control should update its compensation parameters to correct for any errors present.

Meanwhile, a higher level technician or engineer might utilize such an embodiment to design standard setups to use during runoff. The higher level technician could also design and perform non-standard tests to assess overall machine performance or to diagnose manufacturing problems. In both cases, it can be desirable if a test is easy to perform with minimal expertise and take a minimal amount of time to complete.

In one embodiment, the total time to perform tasks for a major plane calibration using a ballbar should be less than three minutes. These tasks include fixturing setups, test execution, update of compensation, and second test execution to verify the compensation. Auto tuning of compensation may be also very useful to OEM's of lower cost machines who do not perform a full laser calibration on their machines because of the additional cost due to the length of time involved.

A control retrofitter might similarly benefit from the ease of use and quick test times. For example, a retrofitter could benefit from auto-tuning aspects of certain embodiment of the present invention in that a machine can be compensated with a minimal amount of effort. For the sake of comparison with an embodiment of the present invention involving a ballbar test, it is noted that using a laser interferometer to develop data tables for bidirectional axis compensation and cross axis compensation could take as long as several days of effort.

Still further, an end user might benefit from embodiments of the present invention involving ballbar testing in several ways. For example, the ease with which a ballbar measurement can be obtained might encourage maintenance teams to perform tests at regular intervals in order to develop a record of the machine performance. This record could be used, for example, as part of a predictive maintenance program. Moreover, a machine tool operator could perform a ballbar test prior to the machining process. In this scenario, the machine could be compensated for its existing errors due to the thermal conditions at that point in time. Additionally, the range of test could be limited to the machining envelope of the job about to be performed such that the compensation is optimized for a limited-range machining envelope. This could enable an end-user to produce parts with accuracy that surpasses the accuracy specifications of the machine.

The foregoing descriptions of exemplary embodiments of the invention have been presented for purposes of illustration and description only. They are not intended to be exhaustive or to limit the invention to the precise forms disclosed, and modifications and variations are possible and contemplated in light of the above teachings. While a number of exemplary and alternate embodiments, methods, systems, configurations, and potential applications have been described, it should be understood that many variations and alternatives could be utilized without departing from the scope of the invention. Moreover, although a variety of potential configurations and components have been described, it should be understood that a number of other configurations and components could be utilized without departing from the scope of the invention.

For example, several aspects of exemplary embodiments discussed herein are based on a constraint that the data from a particular ballbar cannot be directly synchronized to internal control data. If direct synchronization is possible then this data could, for example, be employed directly to allow for a potentially more powerful and robust analysis of data. For example, the axis feedback positions could be used to compute an exact angle for each ballbar measurement (as opposed to, e.g., a technique of estimating the angle based on elapsed time and an emulation of the interpolator). The axis feedback measurement could also be used to obtain parameters for a more precise lost motion model that accounts for the exact nature of a windup/backlash transient. Such capabilities might also simplify the exemplary RTC and TIP Finite State Machines embodiments previously discussed by example herein.

Moreover, although certain ones of the exemplary embodiments previously discussed herein were based around an existing Renishaw ballbar product, other embodiments of the present invention can be adapted with respect to, for example, other types of sensors, including other displacement sensors and other communication interfaces. For example, ballbars that output data such as A quad B encoder signals could potentially provide exact synchronization between the ballbar and internal control data to provide advantages such as those described above.

In addition, capabilities such as automatic derivation of proposals for adjustments of friction feedforward parameters can be included. Such a capability might address performance problems that arise due to the difference between a friction transient and an ideal Coulomb friction model assumed (e.g., by feedforward auto tuning). An iterative approach for friction compensation adjustments has been outlined in this application that identifies a basis for an algorithm that could be employed to address such issues. Still further, the techniques and approaches laid out in this application are expected to be largely adaptable to other product lines of controllers, such as the Siemens 840 and Sinumeric CNC controller product lines, for example.

One potential limitation of exemplary embodiments as described herein can be that the compensation parameters derived from a ballbar measurement are only reliably applicable to regions of the machining envelope that are contained within the envelope of the ballbar tests used to derive the parameters. Typically, the results from three measurements (one for each of the XY, XZ, YZ plane) are used to develop machine compensation parameters. The range of motion associated with these tests identifies a volume within the machine envelope where the parametric compensation is known to be applicable.

The entire machine envelope could be accurately represented by the compensation parameters if the parameters could be derived based on multiple measurements in each plane, where the combined area for each measurement spans the entire machine envelope for the plane. For example, this could be done by simultaneously analyzing multiple measurements or by computing a weighted average of results from individual measurements. Such a capability might also involve modification to the overall exemplary test environment previously described herein that is designed around the idea that a single (bidirectional) ballbar test is used to derive the compensation parameters for the test plane.

Axis angular errors (roll pitch yaw) may cause linear motion that may be interpreted as squareness and straightness errors by the curve fitting used in certain exemplary embodiments disclosed herein. In an alternative embodiment, for example, the affect of each angular error type on the ballbar measurement could be quantified, and an expanded set of tests and analyses determined, to enable angular errors to be distinguished from displacement errors and extract parameters for both error types. For example, compensation software that compensates the displacement error effects of angular errors could be included. Compensation of this type would likely involve compensating an axis position based on the position of the multiple linear axes (e.g., all three).

The tasks performed by a user with respect to certain embodiment disclosed herein may also be further automated by, for example, locating the physical ballbar test setup on a pallet that can be automatically loaded into the machine. A public interface (such as that of the A2100) could be used to generate any required "cycle start" presses. The tool holder containing the magnetic cup could be placed in the machine's tool magazine.

A ballbar fixture on the pallet can contain the ballbar already attached to the center ball at a pre-determined location on the pallet. The test setup data can contain the parameters for this predetermined test location. The ballbar can be resting on a support post from which it can be picked up by the tool. A hook can be used to drop the ballbar off back onto its support post once the testing is complete. One associated advantage of such an embodiment could involve facilitating the automatic scheduling of machine recalibration in a fully automated environment.

A ballbar also has potential for use as a sensor to enable automated estimation of a machine's structural dynamics parameters. Such a capability might be required with, for example, auto-tuning parameters of a feedforward controller taking into account the deflection and oscillation of machine tool members whose positions are not directly measured by the position feedback sensor. For example, a ballbar could be used to estimate the stiffness and damping parameters of a machine's structural modes by employing it to measure the relative motion between the machine tool's spindle nose and the workholding table. These measurements can be synchronized to measurements of the axis positions and torques.

Figure 31:
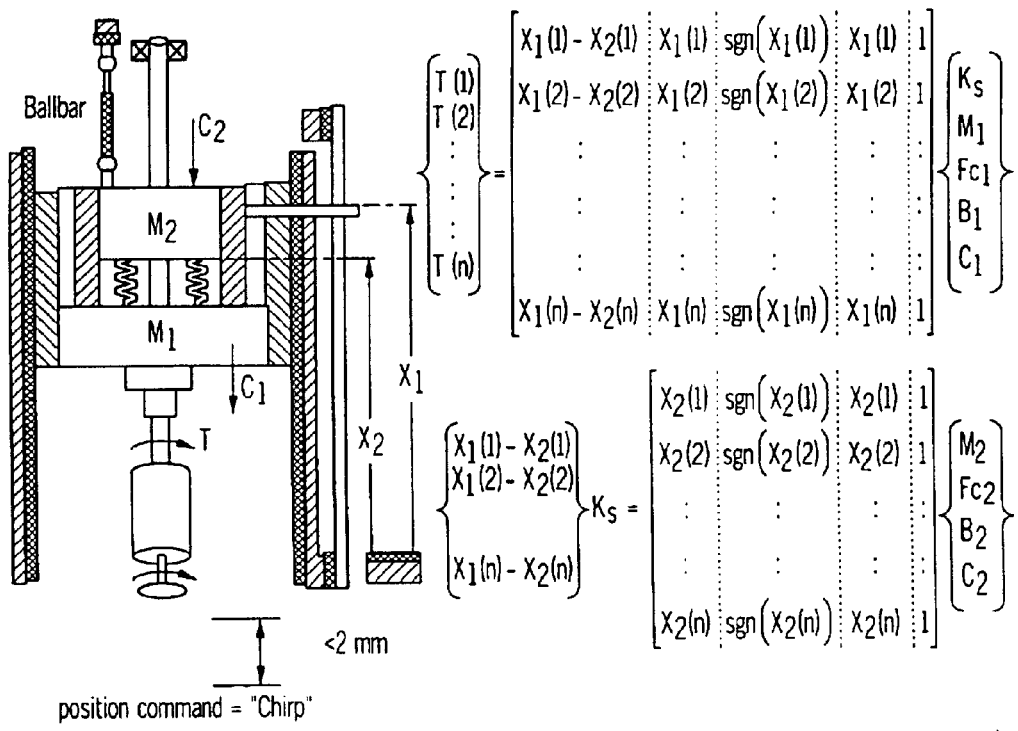
FIG. 31 is a diagram illustrating structural dynamics parameter estimation using a ballbar according to an exemplary embodiment of the present invention.

Modal parameters can be obtained by correlating the ballbar measurements to the axis measurements taken under conditions of applied excitation signals that contain energy of a wide frequency range. The excitation signals can be generated by, for example, developing a part program that outputs a position command "chirp" that specifies interpolation of a small diameter circle with successively increasing feedrate. The diameter of the circle can be set to be somewhat smaller than the range of the ballbar. This situation can be summarized by FIG. 31. Matrix equations for estimating the axis parameters for an axis with a single dominant mode of vibration are also shown in FIG. 31.

Accordingly, in an exemplary embodiment, ballbar measurements are synchronized to axis position and torque measurements. Synchronization can be accomplished by, for example, using a ballbar device whose output can be synchronized directly. For cases such as a serial ballbar interface, synchronization might be accomplished during data analysis by matching axis feedback and ballbar measurement data for the chirp time slice that contains only low frequency energy.

The overall method employed by the exemplary embodiments disclosed herein to generate motion, collect data, and analyze data is also applicable to other auto-tuning applications. For example, referring now to FIG. 32, one embodiment of the present invention involves providing a graphical user interface (GUI) that enables a user to specify test parameters, manually change configuration data, view and analyze measurement/analysis results, and initiate a test sequence. One exemplary approach to accomplishing this involves an interface that can contain test-specific objects such as those listed below:

1) GUI for providing the user access to the capabilities specific to the test type
2) Program Generation Object to construct part program commands to effect a desired machine motion
3) Setup Data Container for storing test parameters and checking their validity.
4) Sensor Interface to manage any auxiliary sensors—such as a ballbar device
5) Data Integration Object to merge and synchronize data from multiple sources such as NC kernel data acquisition data, data from axis drives, and data from auxiliary sensors.
6) Parameter Estimation Curve Fitting Object to provide case-specific requirements for data analysis and parameter extraction.
7) Test Execution Coordinator FSM to manage and respond to inputs originating from a user, a RealTime kernel, and sensor objects.

Figure 32:
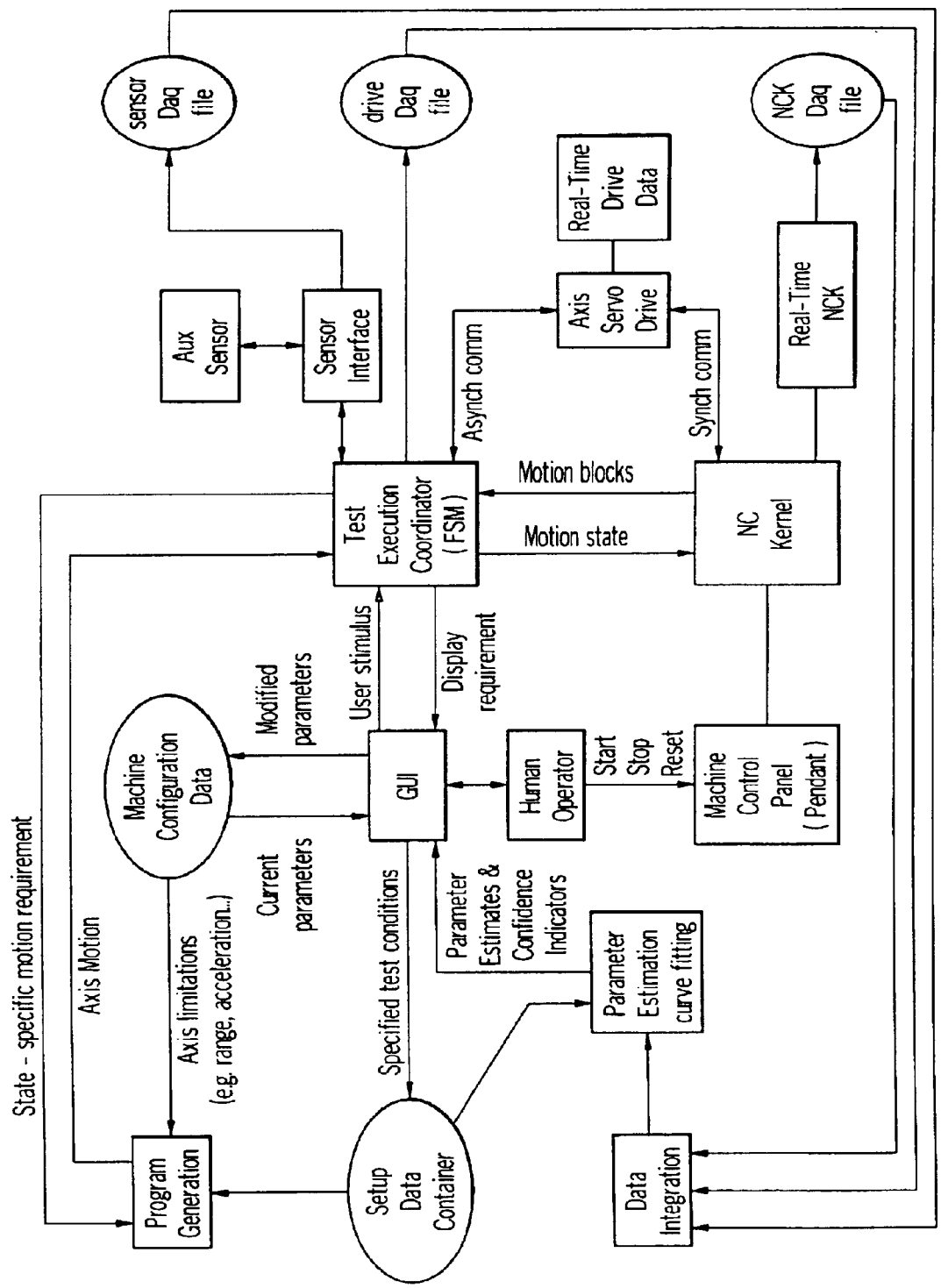
FIG. 32 is an abstract framework for auto tuning on a CNC according to an exemplary embodiment of the present invention.

These objects can be arranged in one embodiment with the relationships roughly defined by FIG. 32.

Thus, it should be understood that the embodiments and examples have been chosen and described in order to best illustrate the principals of the invention and its practical applications to thereby enable one of ordinary skill in the art to best utilize the invention in various embodiments and with various modifications as are suited for particular uses contemplated. Accordingly, it is intended that the scope of the invention be defined by the claims appended hereto.

What is claimed is:

1. A computer readable medium comprising instructions capable of implementing a method of self-calibrating a motion control system, the method comprising:

receiving a test parameter;

ensuring a reasonable test can be executed based on the test parameter;

generating a part program based upon the test parameter;

instructing a user of the motion control system regarding set up of a device capable of acquiring data associated with the test; and executing the test, wherein the part program is executed as part of the test; and wherein the act of ensuring a reasonable test can be executed comprises ensuring a reasonable ballbar circle test can be executed.

2. A machine tool, comprising:

a) an actuator having an attached mechanical member;

b) a motion command generator adapted to produce motion commands capable of controlling the actuator;

c) a compensator adapted to compensate the motion commands based upon at least one compensation parameter; and d) a controller in communication with the actuator, the motion command generator, and the compensator, and adapted to:

i) receive a test parameter;

ii) ensure a reasonable test can be executed based on the test parameter;

iii) generate a part program based upon the test parameter;

iv) instruct a user of the motion control system regarding set up of a device capable of acquiring data associated with the test; and v) execute the test, wherein the part program is executed part of the test; and wherein the act of ensuring a reasonable test can be executed comprises ensuring a reasonable ballbar circle test can be executed.

3. A method of self-calibrating a motion control system comprising:

receiving a test parameter;

ensuring a reasonable test can be executed based on the test parameter;

generating a part program based upon the test parameter;

instructing a user of the motion control system regarding set up of a device capable of acquiring data associated with the test; and executing the test, wherein the part program is executed as part of the test; wherein the act of ensuring a reasonable test can be executed comprises ensuring a reasonable ballbar circle test can be executed.

4. A method of self-calibrating a motion control system comprising:

receiving a test parameter;

ensuring a reasonable test can be executed based on the test parameter;

generating a part program based upon the test parameter;

instructing a user of the motion control system regarding set up of a device capable of acquiring data associated with the test; and executing the test, wherein the part program is executed as part of the test; wherein at least one of the act of instructing a user and the act of executing the test comprises using a finite state machine to coordinate progression through tasks associated with the at least one of the acts.

5. The method of claim 3, further comprising the act of indicating a problem if a reasonable test cannot be executed.

6. The method of claim 3, further comprising requiring a change in the test parameter if a reasonable test cannot be executed.

7. The method of claim 3, wherein the act of instructing a user comprises providing a test interface capable of instructing a user regarding setting up and executing the test.

8. The method of claim 7, wherein the act of providing a test interface further comprises indicating progress in each of a series of tasks comprising test.

9. The method of claim 8, wherein the act of indicating progress further comprises returning to a previous one in the series of tasks when a current one in the series of tasks fails to be completed.

10. The method of claim 9, wherein the act of providing a test interface further comprises providing a description of which one in the series of tasks to perform next.

11. The method of claim 3, further comprising analyzing the test.

12. The method of claim 11, further comprising displaying analysis of the test.

13. The method of claim 11, further comprising analyzing an affect of manipulating a parameter of the motion control system that is configured to compensate for a condition to which the test is related.

14. The method of claim 3, further comprising changing a parameter of the motion control system that is configured to compensate for a condition to which the test is related.

15. The method of claim 14, wherein the act of changing a parameter comprises:

providing an adjustment interface capable of receiving a change to the parameter; and if received, implementing the change to the parameter.

16. The method of claim 15, wherein the act of changing a parameter further comprises suggesting the change to the parameter.

17. The method of claim 15, wherein the act of changing a parameter further comprises displaying a significance of the parameter.

18. The method of claim 3, wherein the act of ensuring a reasonable test can be executed comprises ensuring the part program is within the capabilities of machine controlled by the motion control system and is capable of providing results that can be used to tune a compensation parameter.

19. The method of claim 3, wherein the act of ensuring a reasonable test can be executed comprises emulating execution of at least a portion of the part program.

20. The method of claim 19, wherein the act of emulating execution comprises running portions of the part program through motion algorithms of the motion control system, wherein a machine controlled by the motion control system does not have to be actuated to ensure a reasonable test can be executed.

21. The method of claim 19, wherein the act of emulating execution comprises running the emulation as a callable function in a non-real time environment associated with the motion control system.

22. The method of claim 3, wherein the act of instructing a user further comprises instructing a user with respect to executing the test.

23. The method of claim 4, further comprising the act of indicating a problem if a reasonable test cannot be executed.

24. The method of claim 4, further comprising requiring a change in the test parameter if a reasonable test cannot be executed.

25. The method of claim 4, wherein the act of instructing a user comprises providing a test interface capable of instructing a user regarding setting up and executing the test.

26. The method of claim 25, wherein the act of providing a test interface further comprises indicating progress in each of a series of tasks comprising the test.

27. The method of claim 26, wherein the act of indicating progress further comprises returning to a previous one in the series of tasks when a current one in the series of tasks fails to be completed.

28. The method of claim 27, wherein the act of providing a test interface further comprises providing a description of which one in the series of tasks to perform next.

29. The method of claim 4, further comprising analyzing the test.

30. The method of claim 29, further comprising displaying analysis of the test.

31. The method of claim 29, further comprising analyzing an affect of manipulating a parameter of the motion control system that is configured to compensate for a condition to which the test is related.

32. The method of claim 4, further comprising changing a parameter of the motion control system that is configured to compensate for a condition to which the test is related.

33. The method of claim 32, wherein the act of changing a parameter comprises:

providing an adjustment interface capable of receiving a change to the parameter; and if received, implementing the change to the parameter.

34. The method of claim 33, wherein the act of changing a parameter further comprises suggesting the change to the parameter.

35. The method of claim 33, wherein the act of changing a parameter further comprises displaying a significance of the parameter.

36. The method of claim 4, wherein the act of ensuring a reasonable test can be executed comprises ensuring the part program is within the capabilities of a machine controlled by the motion control system and is capable of providing results that can be used to tune a compensation parameter.

37. The method of claim 4, wherein the act of ensuring a reasonable test can be executed comprises emulating execution of at least a portion of the part program.

38. The method of claim 37, wherein the act of emulating execution comprises running portions of the part program through motion algorithms of the motion control system, wherein a machine controlled by the motion control system does not have to be actuated to ensure a reasonable test can be executed.

39. The method of claim 37, wherein the act of emulating execution comprises running the emulation as a callable function in a non-real time environment associated with the motion control system.

40. The method of claim 4, wherein the act of instructing a user further comprises instructing a user with respect to executing the test.

41. The method of claim 4, wherein the finite state machine recurrently polls control and measured data associated with the test to determine when a requirement for a transition to a next state in the act of executing the test has been fulfilled.

42. The method of claim 41, wherein the finite state machine controls execution of the part program through the user of messages.

43. The method of claim 3, wherein the act of receiving a test parameter comprises the act of providing a setup interface capable of allowing a user to select a test parameter.

44. The method of claim 4, wherein the act of receiving a test parameter comprises the act of providing a setup interface capable of allowing a user to select a test parameter.

45. A computer readable medium comprising instructions capable of implementing a method of self-calibrating a motion control system, the method comprising:

receiving a test parameter;

ensuring a reasonable test can be executed based on the test parameter;

generating a part program based upon the test parameter;

instructing a user of the motion control system regarding set up of a device capable of acquiring data associated with the test; and executing the test, wherein the part program is executed as part of the test; wherein at least one of the act of instructing a user and the act of executing the test comprises using a finite state machine to coordinate progression through tasks associated with the at least one of the acts.

46. A machine tool, comprising:

a) an actuator having an attached mechanical member;

b) a motion command generator adapted to produce motion commands capable of controlling the actuator;

c) a compensator adapted to compensate the motion commands based upon at least one compensation parameter; and d) a controller in communication with the actuator, the motion command generator, and the compensator, and adapted to:

i) receive a test parameter;

ii) ensure a reasonable test can be executed based on the test parameter;

iii) generate a part program based upon the test parameter;

iv) instruct a user of the motion control system regarding set up of a device capable of acquiring data associated with the test; and v) execute the test, wherein the part program is executed part of the test; wherein at least one of the act of instructing a user and the act of executing the test comprises using a finite state machine to coordinate progression through tasks associated with the at least one of the acts.

* * * * *

UNITED STATES PATENT AND TRADEMARK OFFICE
CERTIFICATE OF CORRECTION

PATENT NO. : 6,859,747 B2
DATED : February 22, 2005
INVENTOR(S) : Stephen J. Yutkowitz It is certified that error appears in the above-identified patent and that said Letters Patent is hereby corrected as shown below:

Column 97,
Line 44, change "executed part" to -- executed as part --

Column 98,
Line 21, change "comprising test" to -- comprising the test --

Column 99,
Line 25, change "displaying analysis" to -- displaying an analysis --

Column 100,
Line 11, change "user" to -- use --
Line 55, change "executed part" to -- executed as part --

Signed and Sealed this

Seventeenth Day of May, 2005

JON W. DUDAS
*Director of the United States Patent and Trademark Office*